(12) United States Patent
    Breidenbach

(10) Patent No.: US 9,764,782 B2
(45) Date of Patent: *Sep. 19, 2017

(54) AERODYNAMIC DRAG REDUCING APPARATUS

(71) Applicant: Thomas Scott Breidenbach, Maple Grove, MN (US)

(72) Inventor: Thomas Scott Breidenbach, Maple Grove, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,684

(22) Filed: Nov. 10, 2015

(65) Prior Publication Data

US 2016/0185401 A1    Jun. 30, 2016

Related U.S. Application Data

(63) Continuation of application No. 14/308,707, filed on Jun. 18, 2014, now Pat. No. 9,180,919.

(60) Provisional application No. 61/836,660, filed on Jun. 18, 2013, provisional application No. 61/843,261, filed on Jul. 5, 2013, provisional application No. 61/858,598, filed on Jul. 25, 2013.

(51) Int. Cl.
    *B62D 35/00*    (2006.01)

(52) U.S. Cl.
    CPC ......... *B62D 35/002* (2013.01); *B62D 35/001* (2013.01); *B62D 35/007* (2013.01)

(58) Field of Classification Search
    CPC .. B62D 35/001; B62D 35/002; B62D 35/004; B62D 35/007; B62D 35/00
    USPC .......................................... 296/180.1, 180.4
    See application file for complete search history.

(56) References Cited

U.S. PATENT DOCUMENTS

| | | | | |
|---|---|---|---|---|
| 6,309,010 | B1* | 10/2001 | Whitten | B62D 35/001 296/180.1 |
| 6,485,087 | B1* | 11/2002 | Roberge | B62D 35/001 296/180.4 |
| 6,666,498 | B1* | 12/2003 | Whitten | B62D 35/004 296/180.1 |
| 6,799,791 | B2* | 10/2004 | Reiman | B62D 35/004 296/180.1 |
| 7,340,230 | B2* | 3/2008 | Khoini-Poorfard | H03D 3/006 348/E5.097 |

(Continued)

*Primary Examiner* — Gregory Blankenship
(74) *Attorney, Agent, or Firm* — Thomas Scott Breidenbach

(57) ABSTRACT

An aerodynamic drag reducing apparatus is adapted for mounting behind a vehicle. The aerodynamic drag reducing apparatus includes a side panel, an actuator arrangement, a top panel, and an interconnecting member. The side panel is adapted to move between a deployed position and a stowed position. The actuator is mounted between the side panel and the vehicle. The top panel is adapted to move between a deployed position and a stowed position. The interconnecting member is connected between the side panel and the top panel. The interconnecting member coordinates movement between the side and top panels such that they each move together between the deployed positions and the stowed positions, respectively. One or more of the panels may be mounted to a door of the vehicle via deformable hinges and/or deformably mounted hinges and thereby allow the door to open compactly against a side of the vehicle by deforming the panels, the hinges, and/or the mounts of the hinges.

20 Claims, 61 Drawing Sheets

(56) References Cited

U.S. PATENT DOCUMENTS

| | | | | |
|---|---|---|---|---|
| 7,380,868 B2* | 6/2008 | Breidenbach | B62D 35/001 296/180.1 |
| 7,618,086 B2* | 11/2009 | Breidenbach | B62D 35/001 296/180.1 |
| 7,740,304 B1* | 6/2010 | Breu | B62D 35/001 296/180.1 |
| 7,854,468 B2* | 12/2010 | Vogel | B62D 35/001 296/180.1 |
| 7,976,096 B2* | 7/2011 | Holubar | B62D 35/001 296/180.1 |
| 8,079,634 B2* | 12/2011 | Visser | B62D 35/004 296/180.1 |
| 8,100,461 B2* | 1/2012 | Smith | B62D 35/001 296/180.4 |
| 8,360,509 B2* | 1/2013 | Smith | B62D 35/001 296/180.4 |
| 8,590,961 B2* | 11/2013 | Breidenbach | B62D 35/001 296/180.1 |
| 9,180,919 B2* | 11/2015 | Breidenbach | B62D 35/001 |
| 9,333,933 B2* | 5/2016 | Kunkel | B60R 21/20 |
| 2008/0048468 A1* | 2/2008 | Holubar | B62D 35/001 296/180.4 |
| 2008/0164722 A1* | 7/2008 | Breidenbach | B62D 35/001 296/180.1 |
| 2009/0212594 A1* | 8/2009 | Breidenbach | B62D 35/001 296/180.1 |
| 2011/0084517 A1* | 4/2011 | Vogel | B62D 35/001 296/180.4 |
| 2012/0104792 A1* | 5/2012 | Smith | B62D 35/001 296/180.4 |
| 2013/0175824 A1* | 7/2013 | Smith | B62D 35/001 296/180.4 |
| 2014/0019010 A1* | 1/2014 | Smith | B62D 35/001 701/49 |
| 2014/0367993 A1* | 12/2014 | Breidenbach | B62D 35/001 296/180.4 |
| 2016/0068201 A1* | 3/2016 | Breidenbach | B62D 35/001 296/180.4 |

* cited by examiner

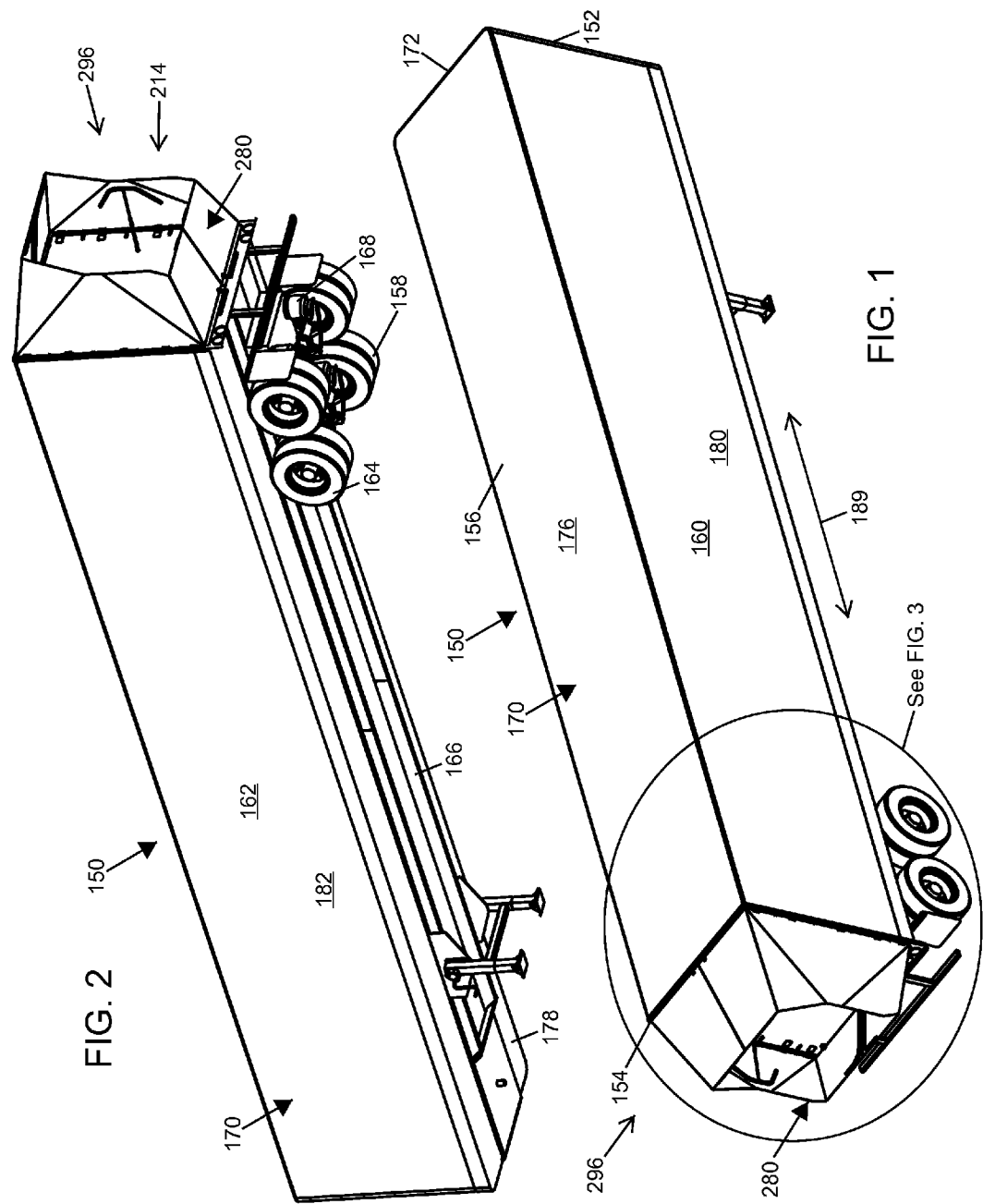

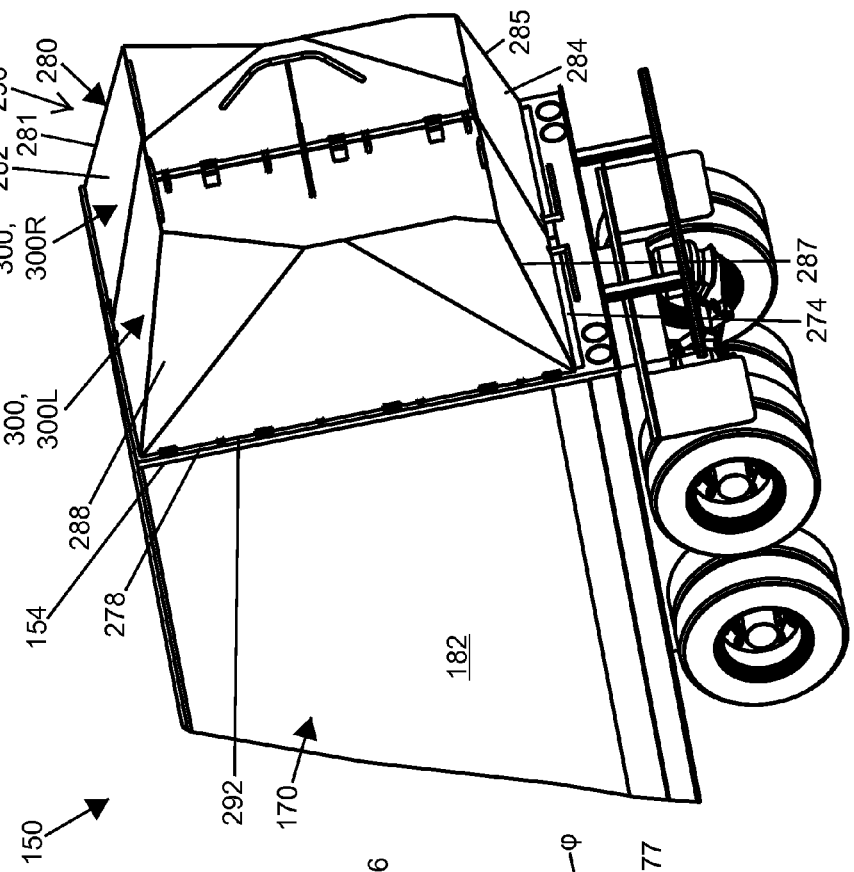
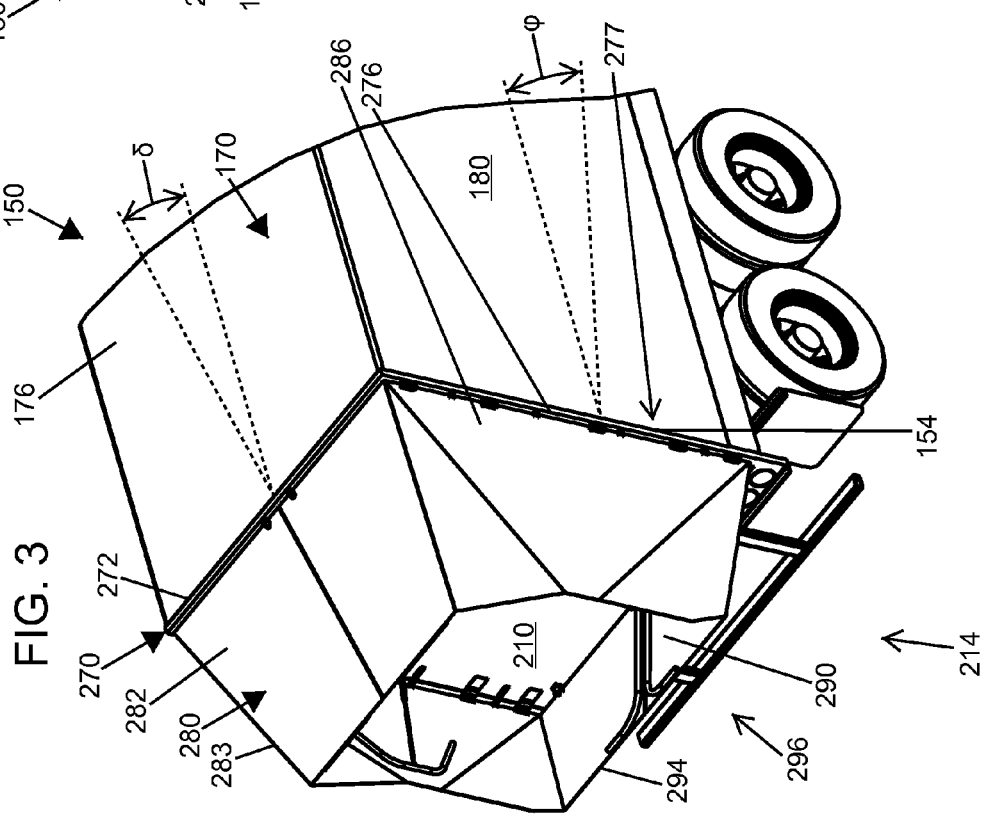

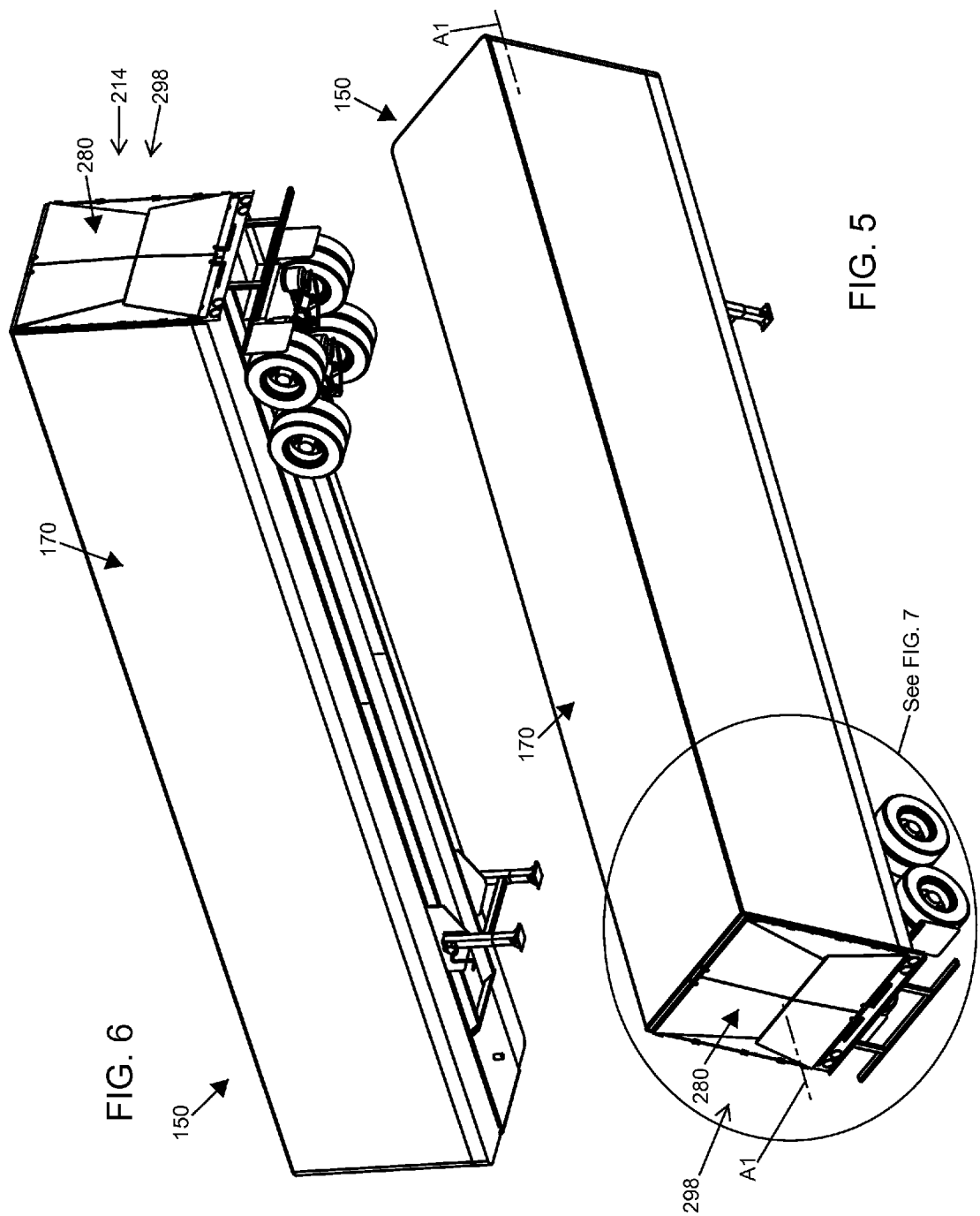

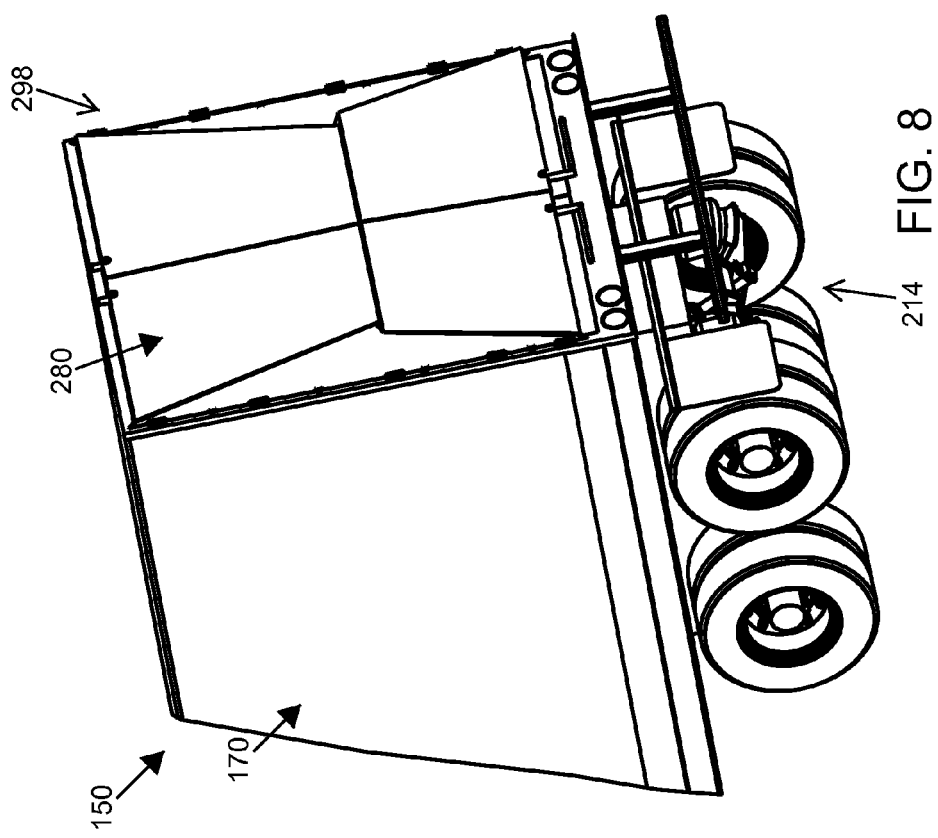
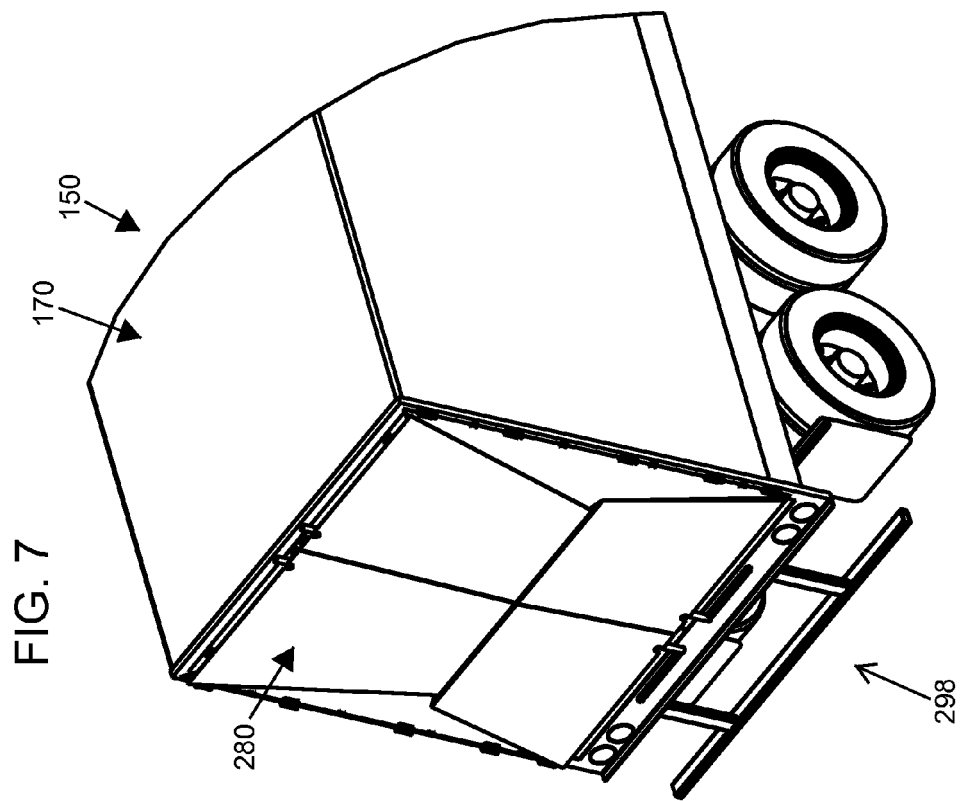

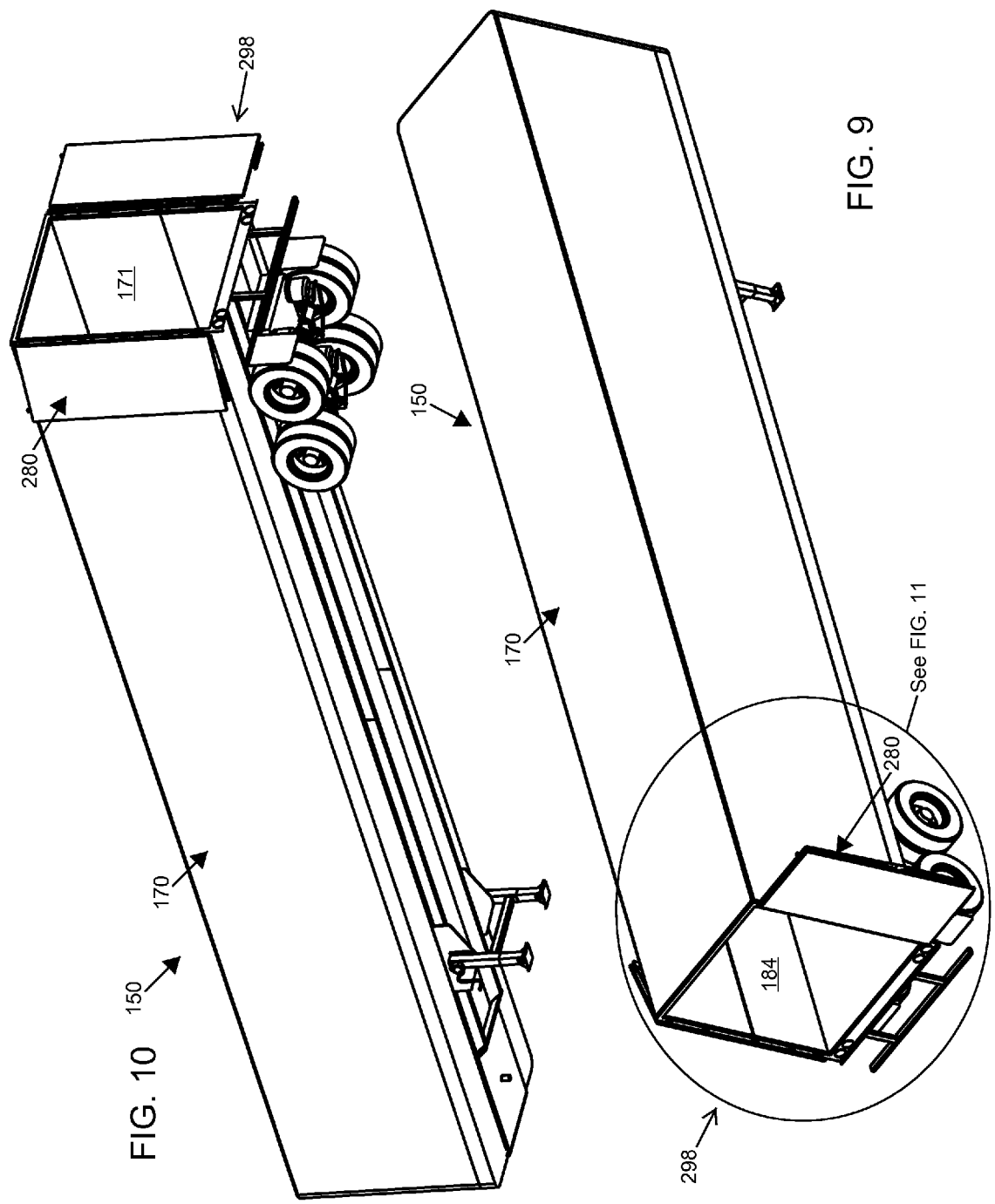

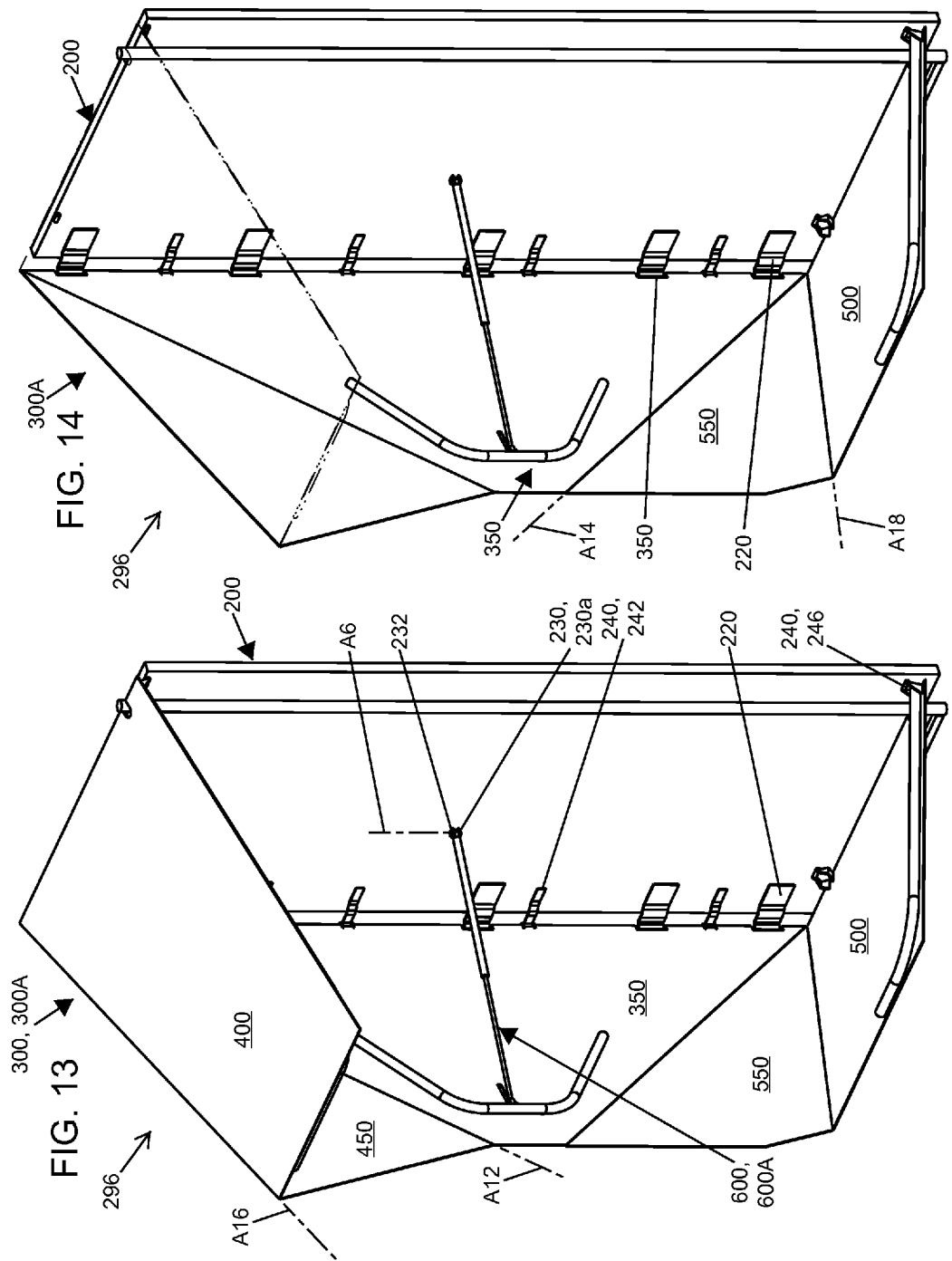

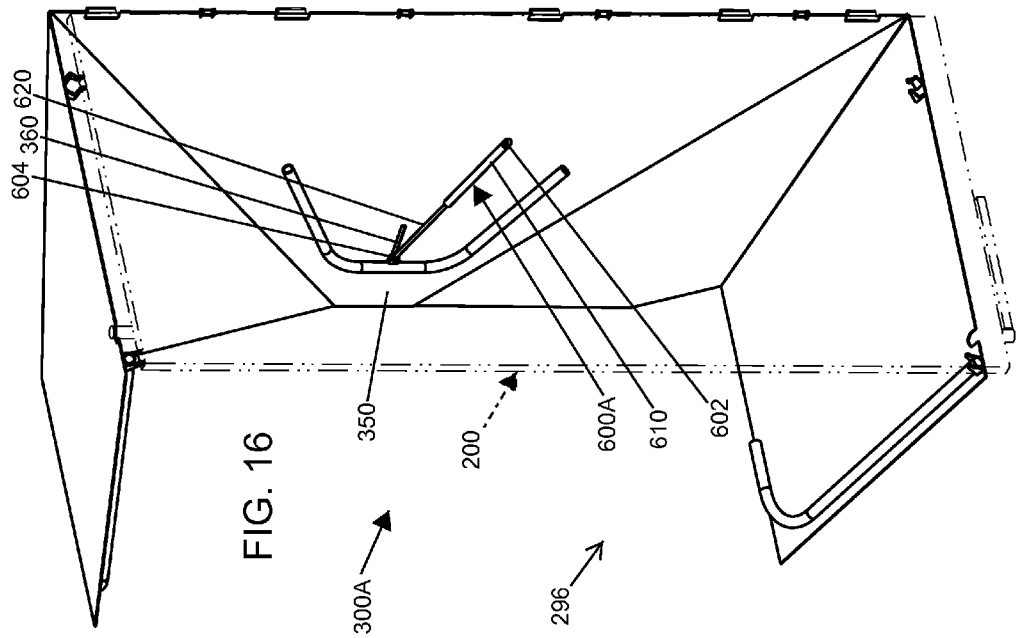
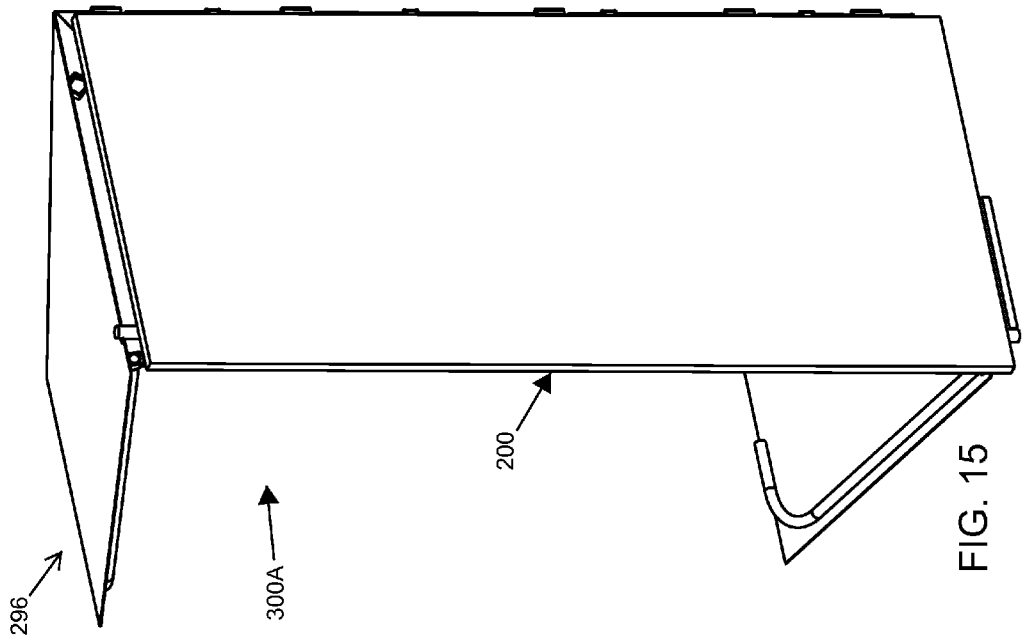

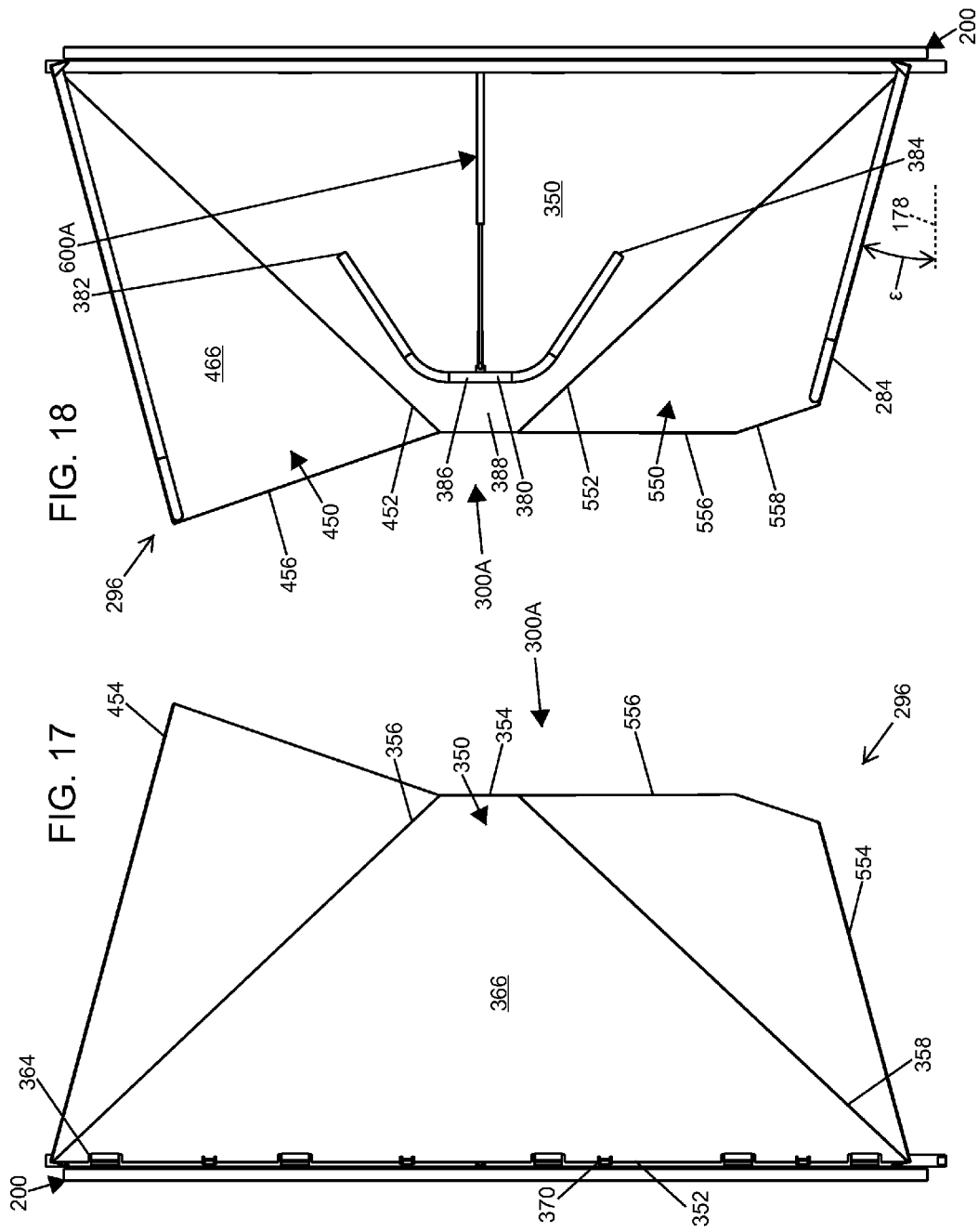

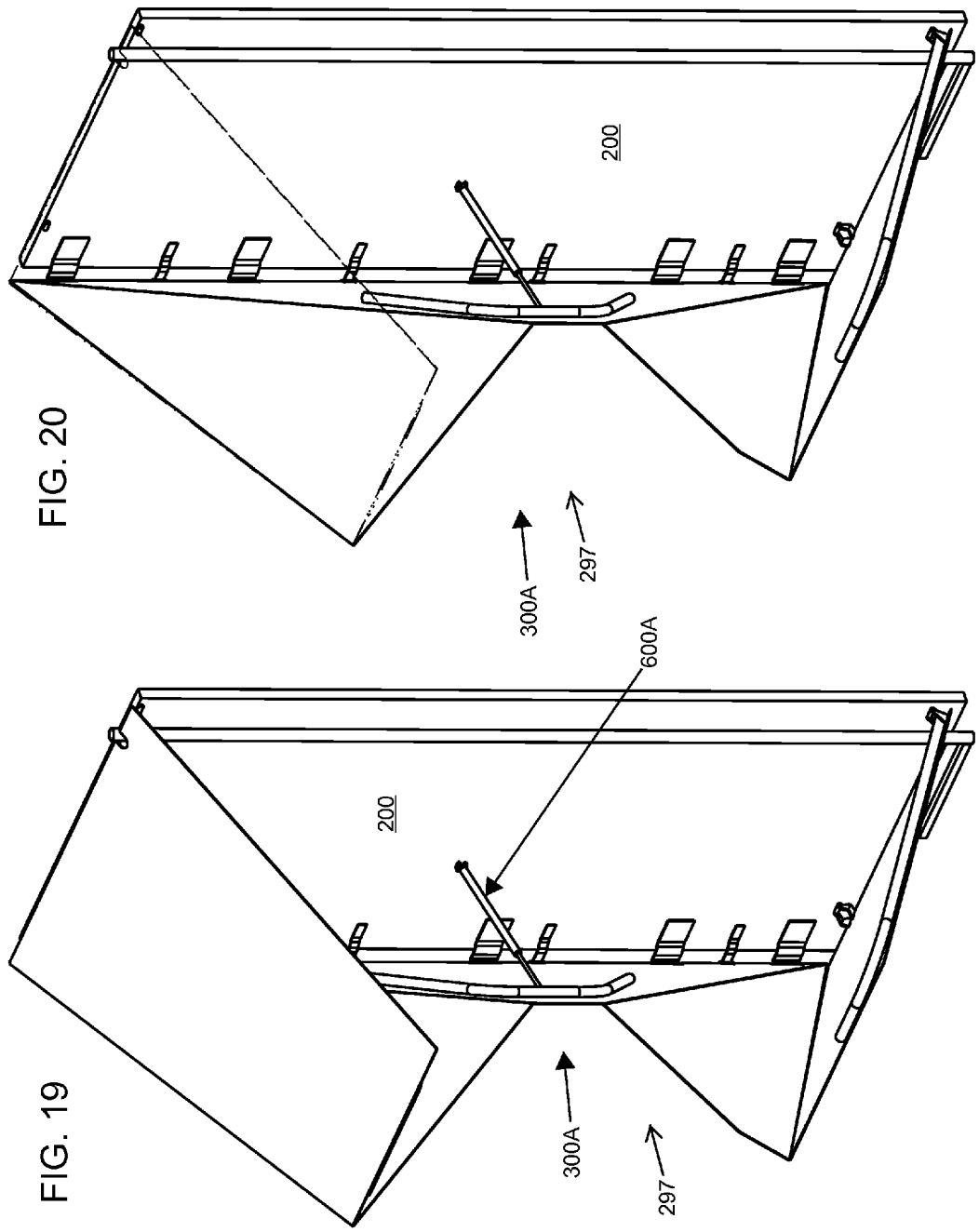

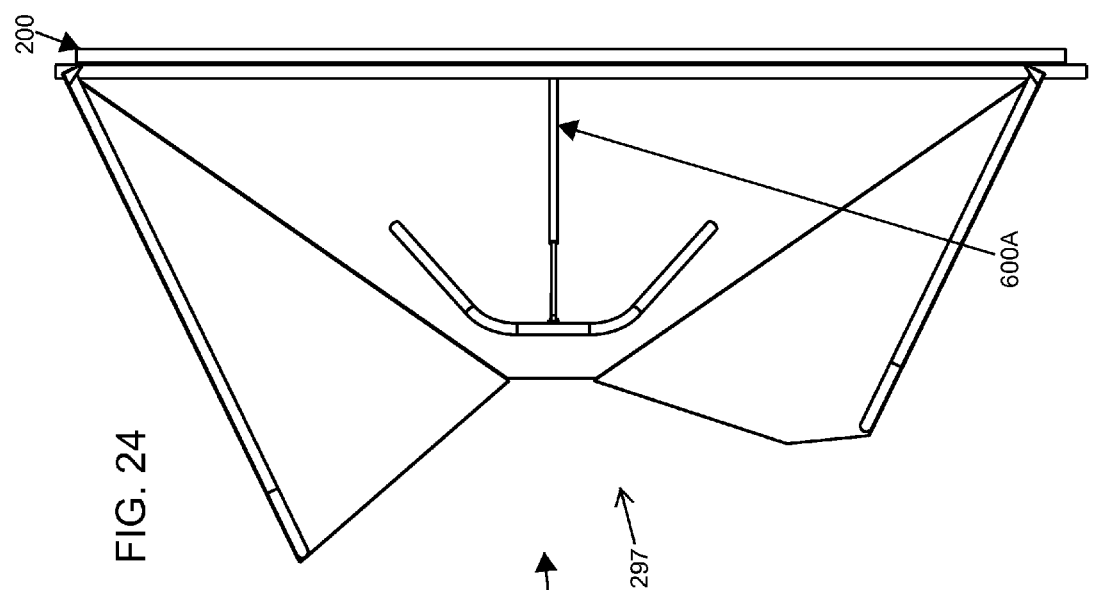
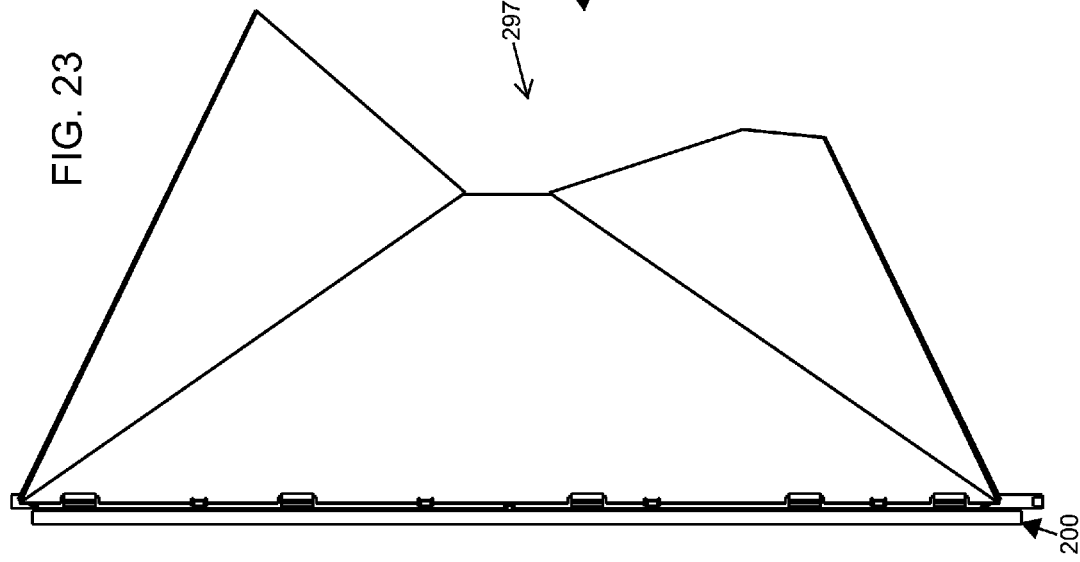

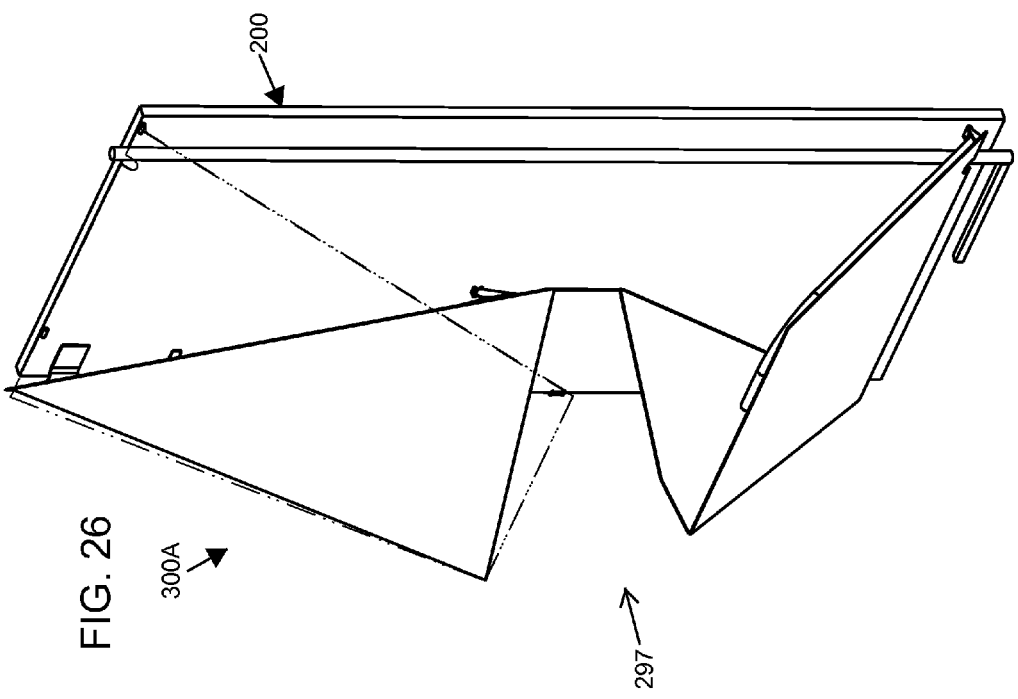
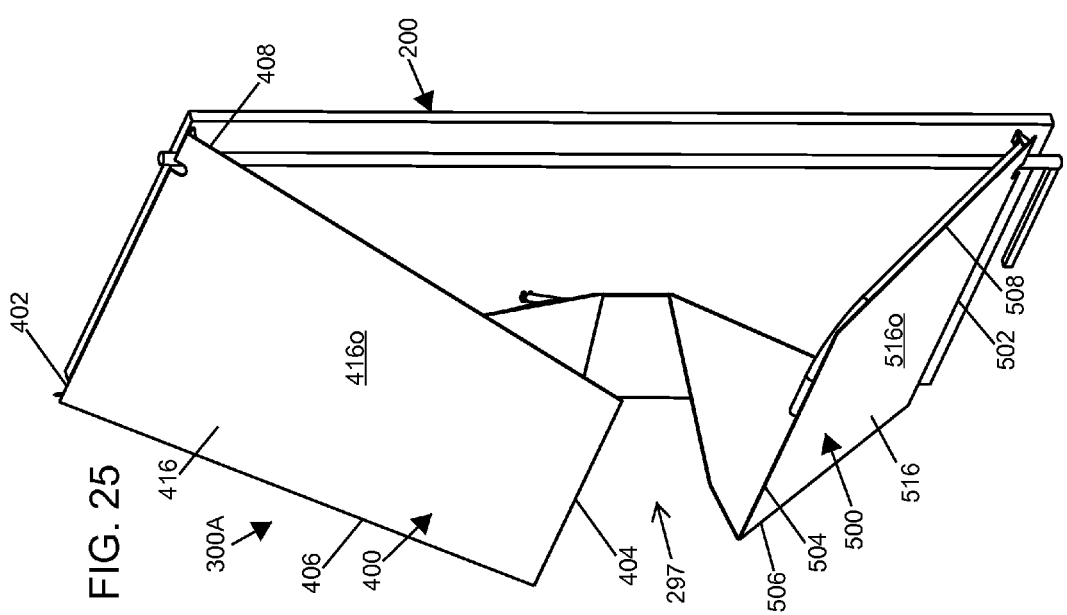

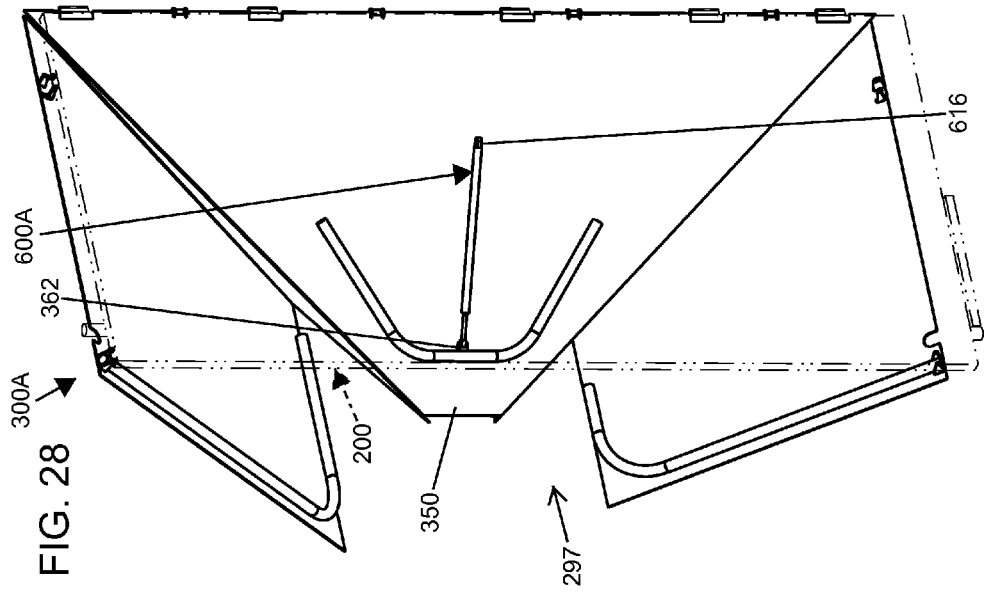
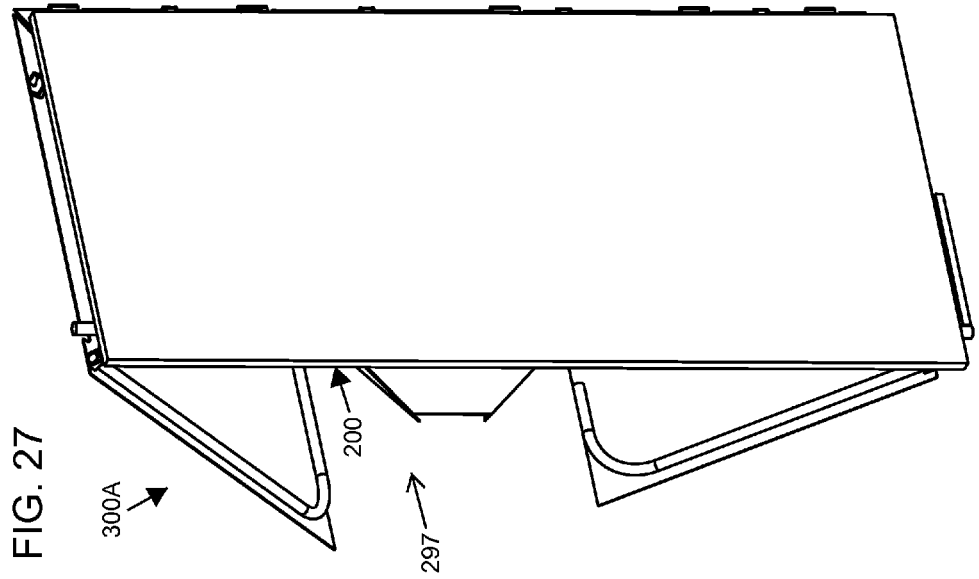

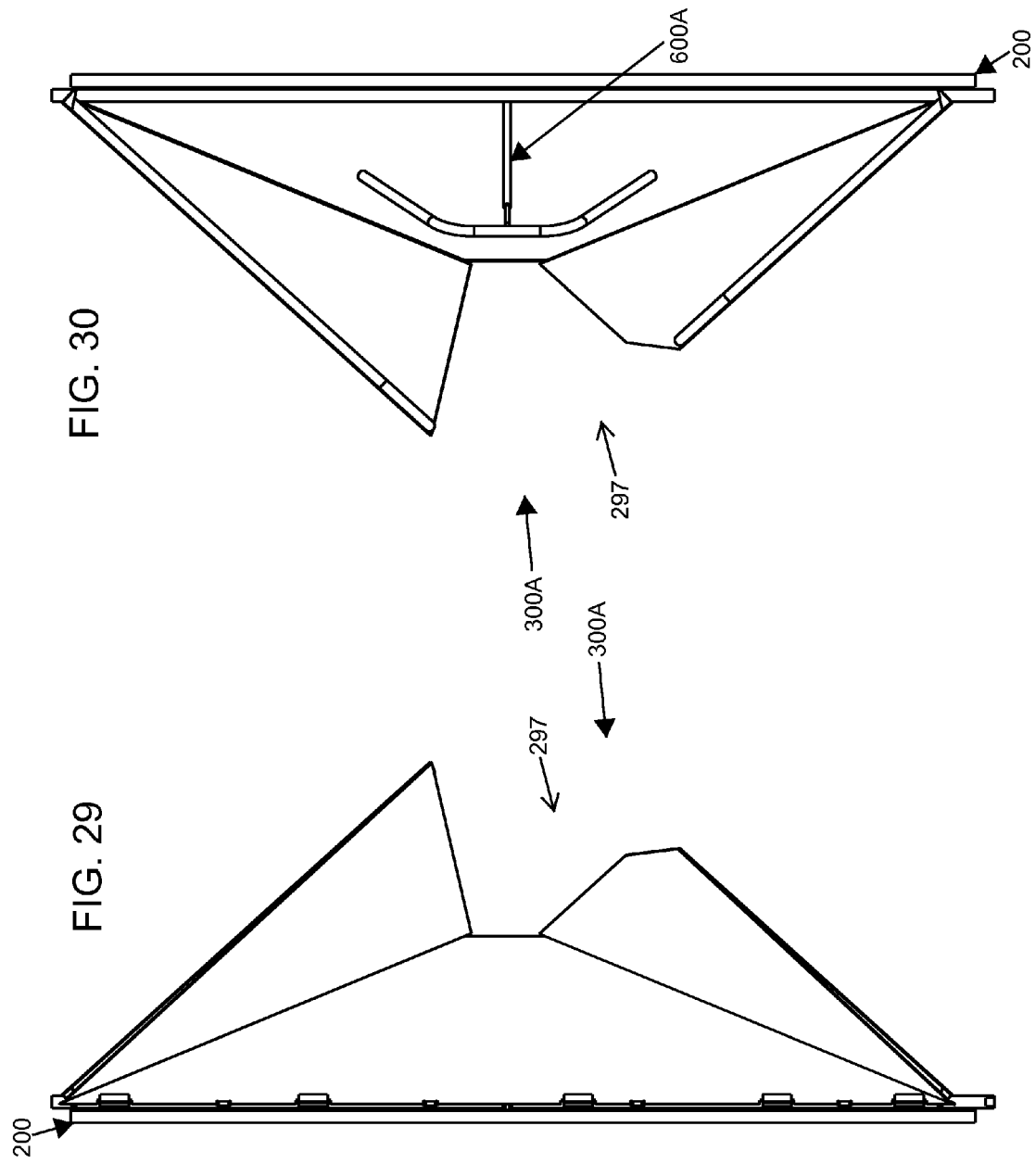

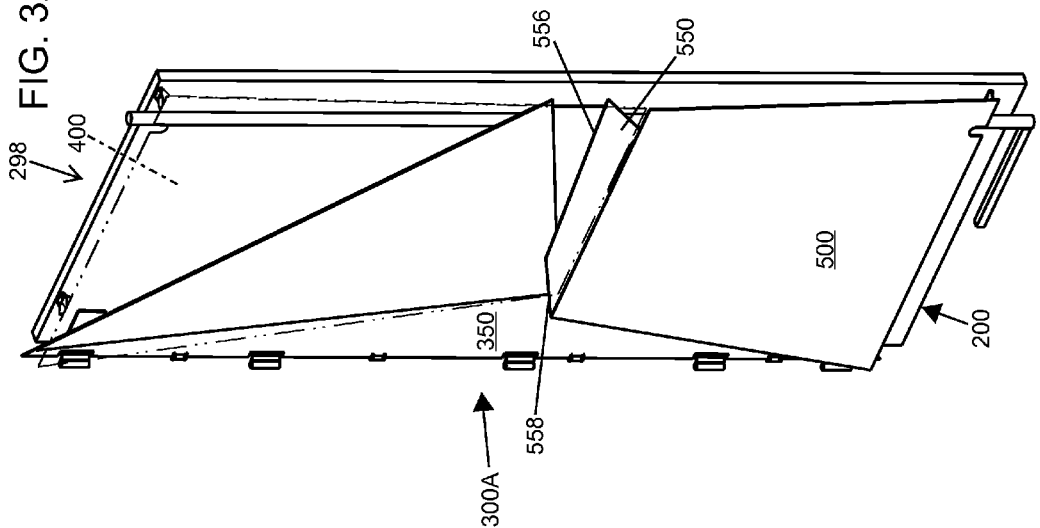
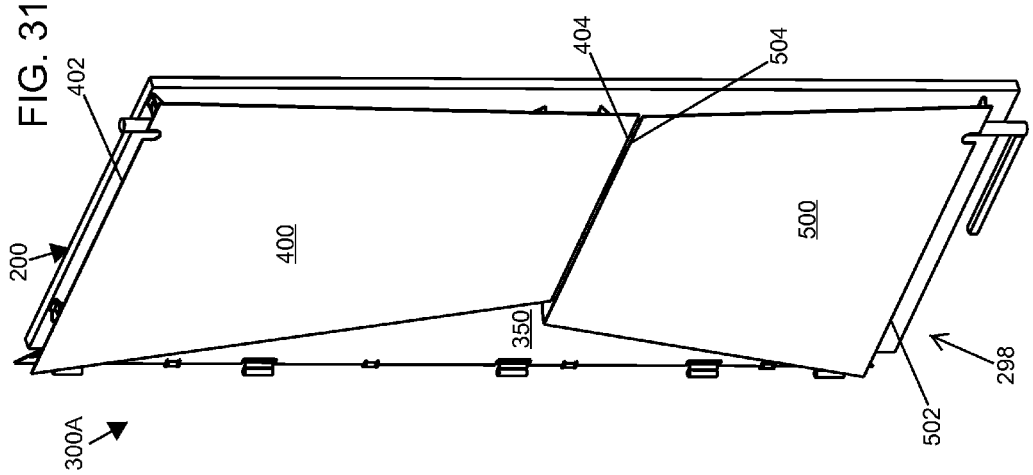

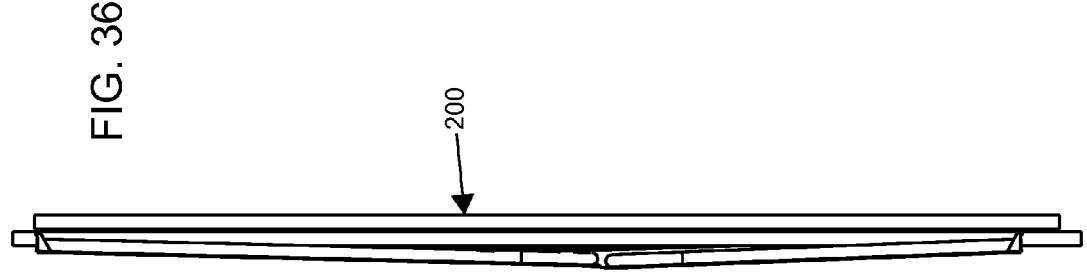
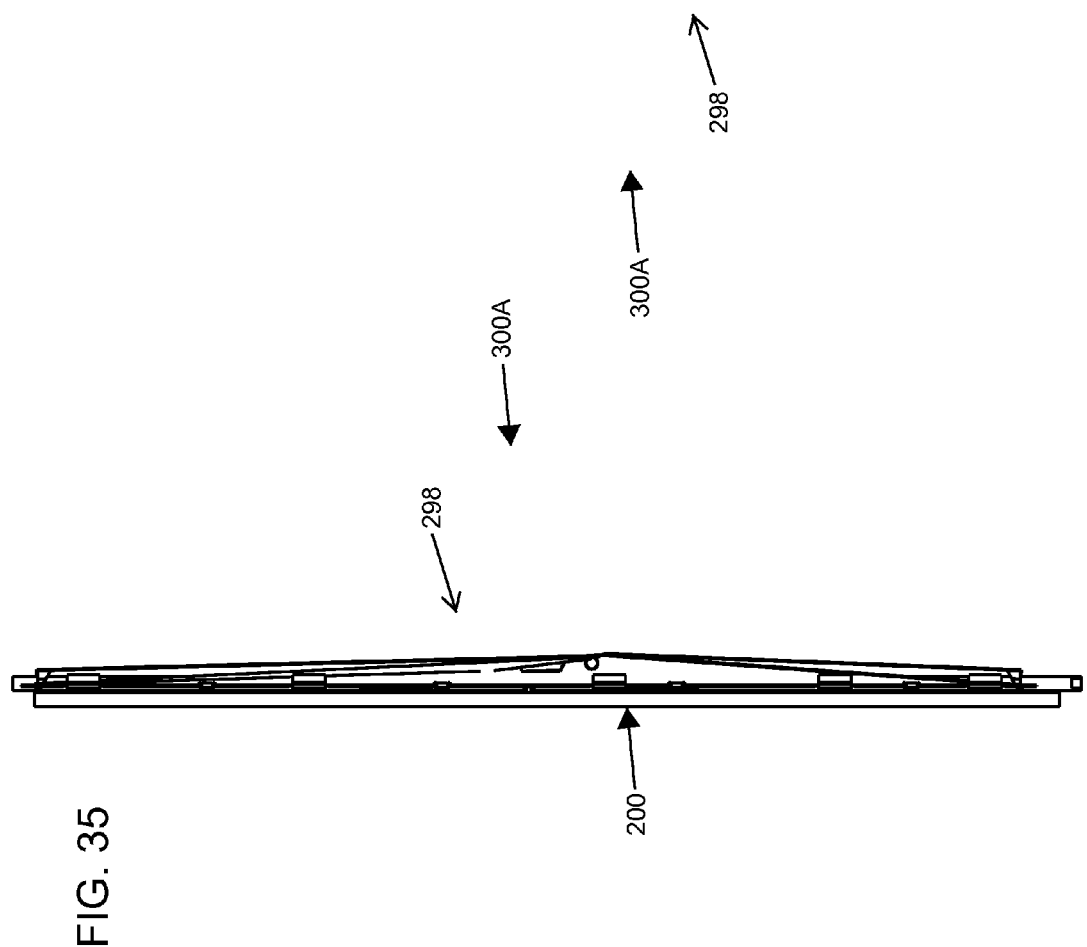

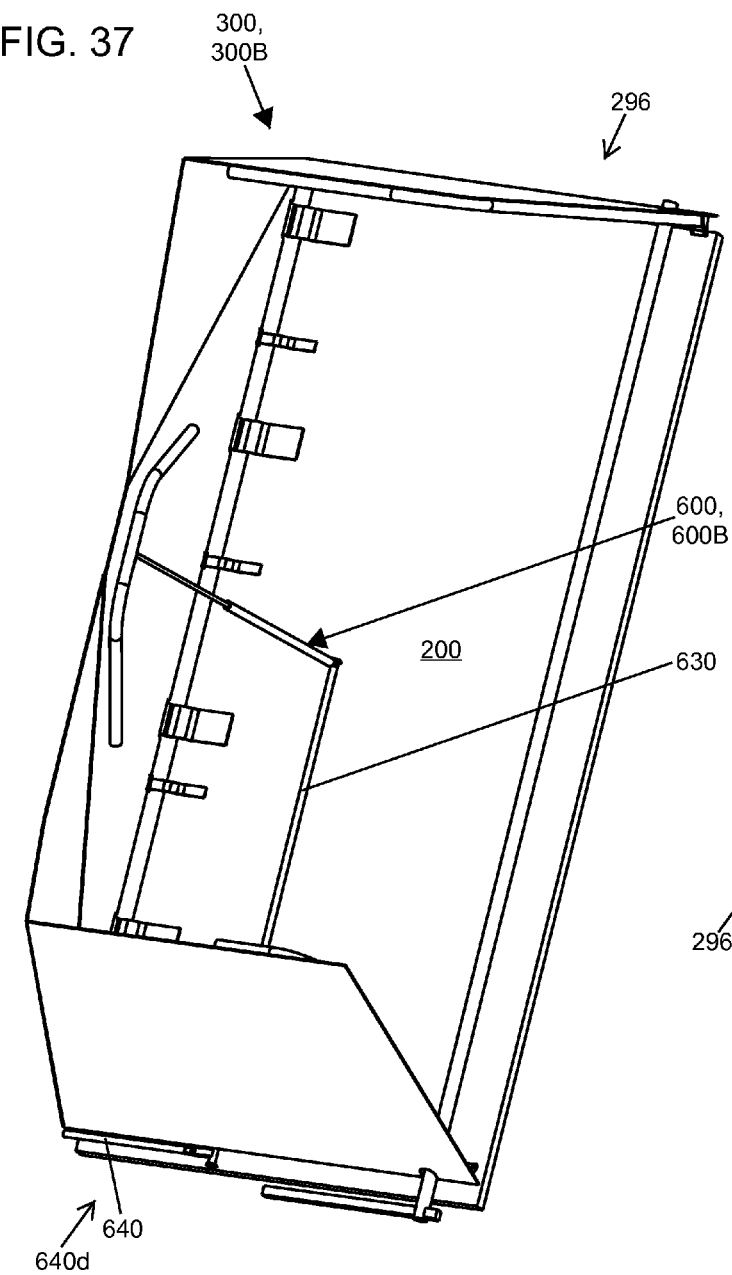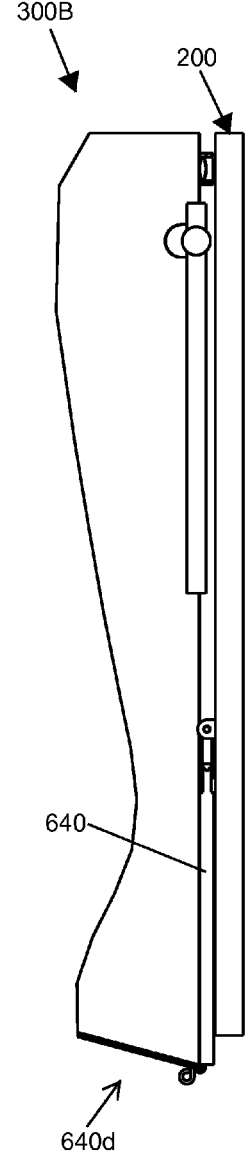

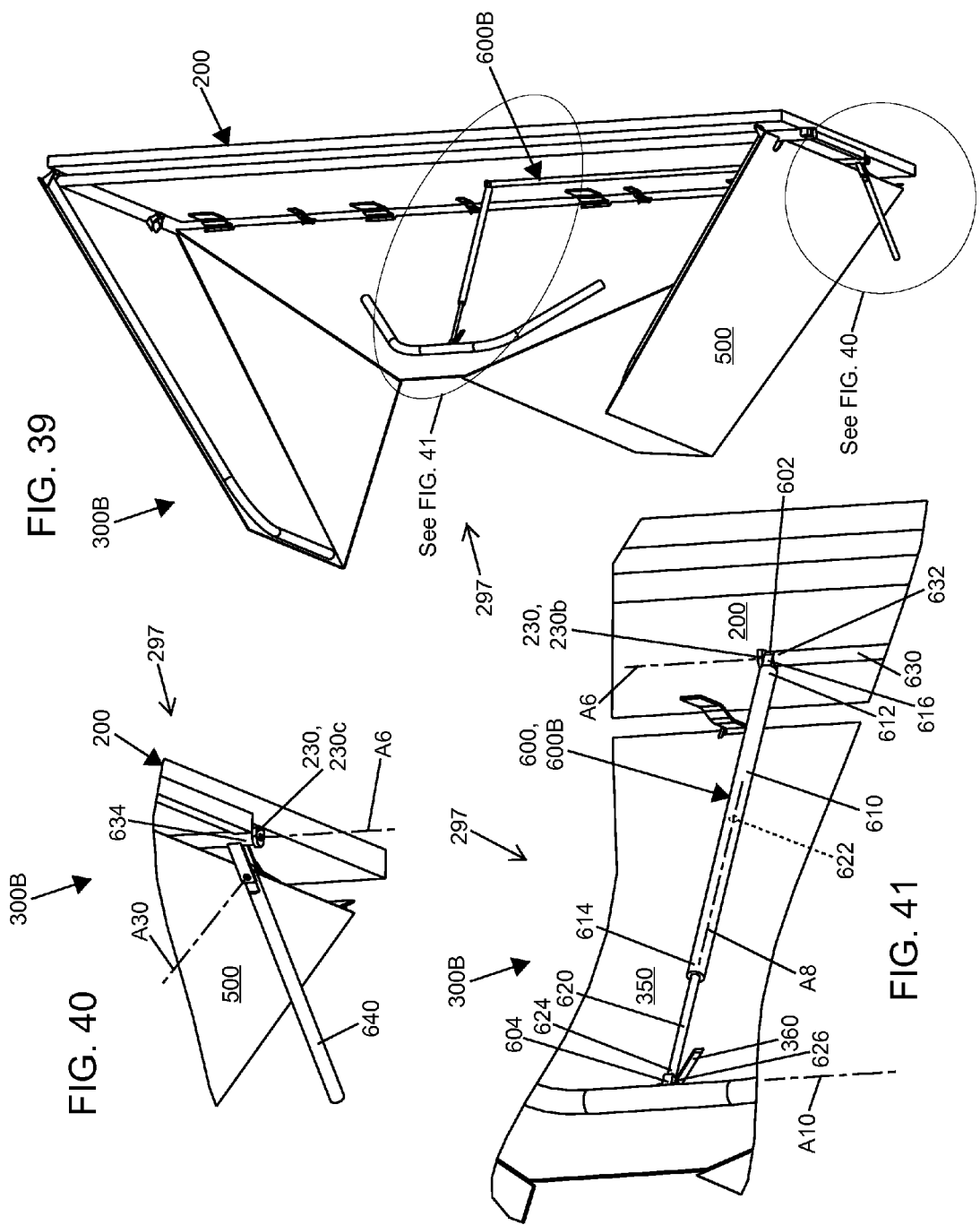

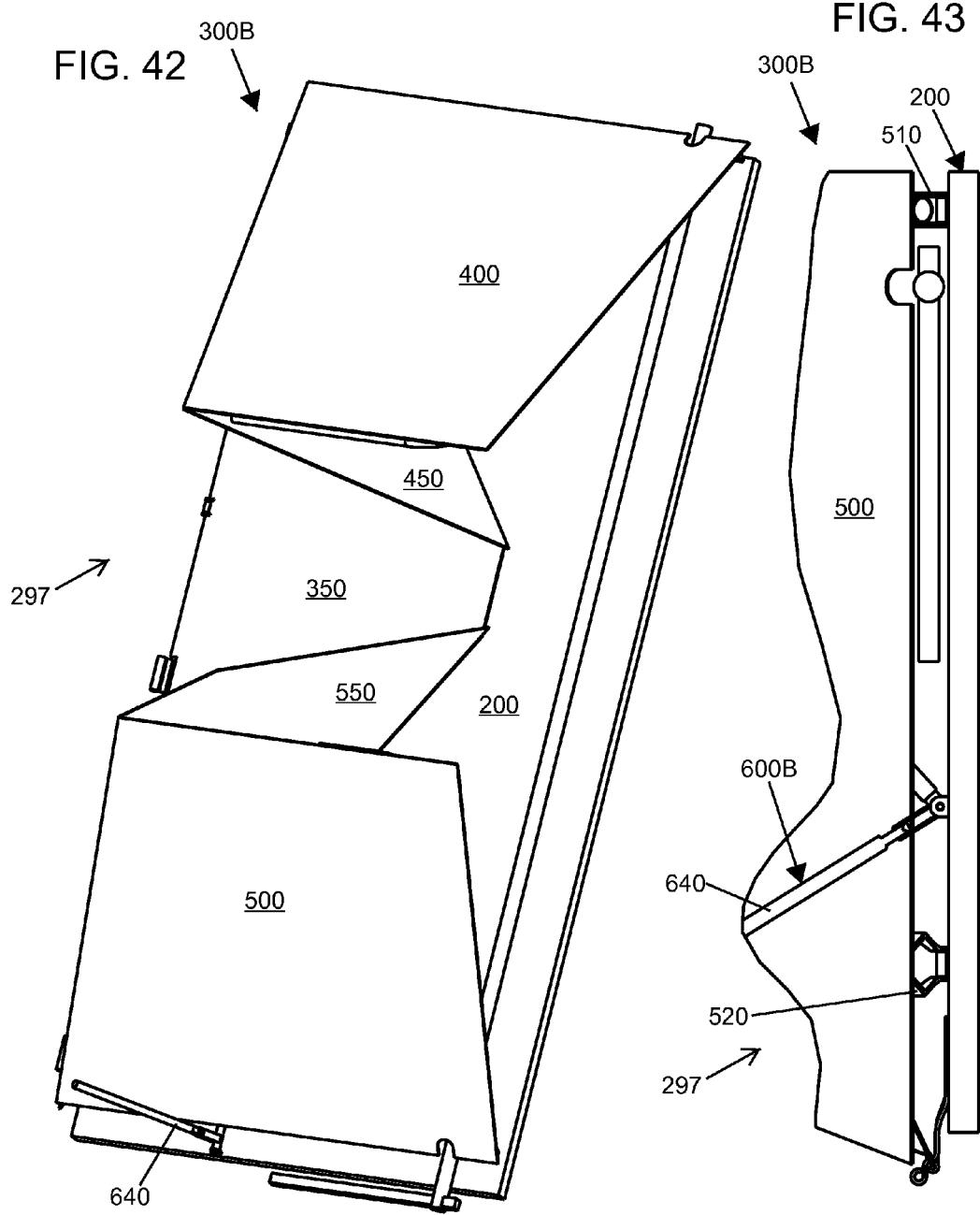

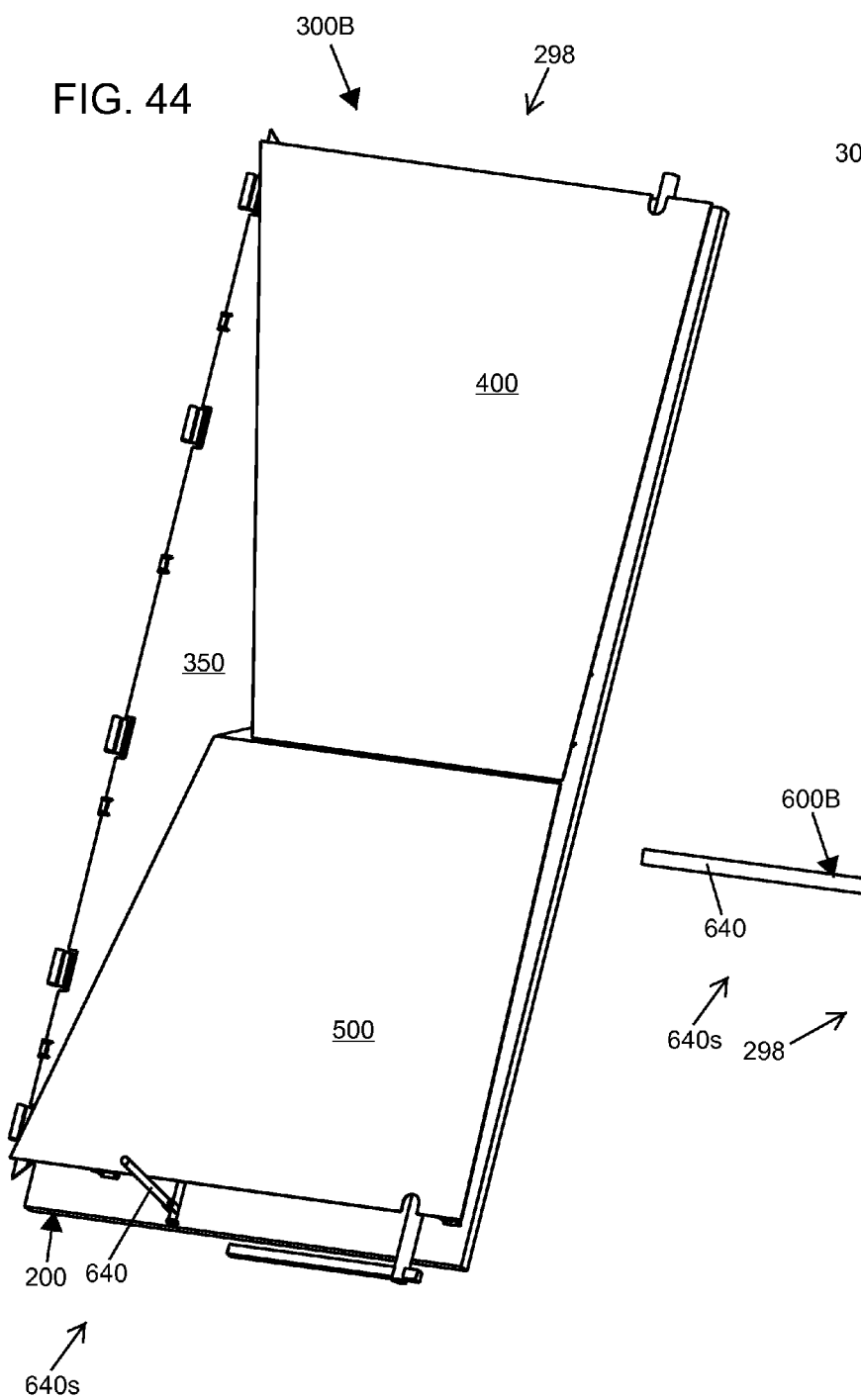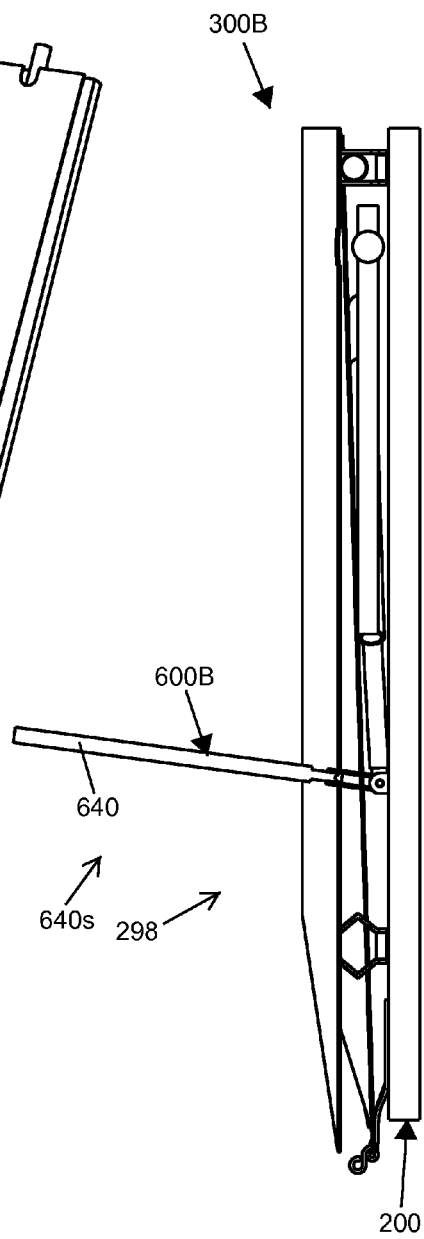

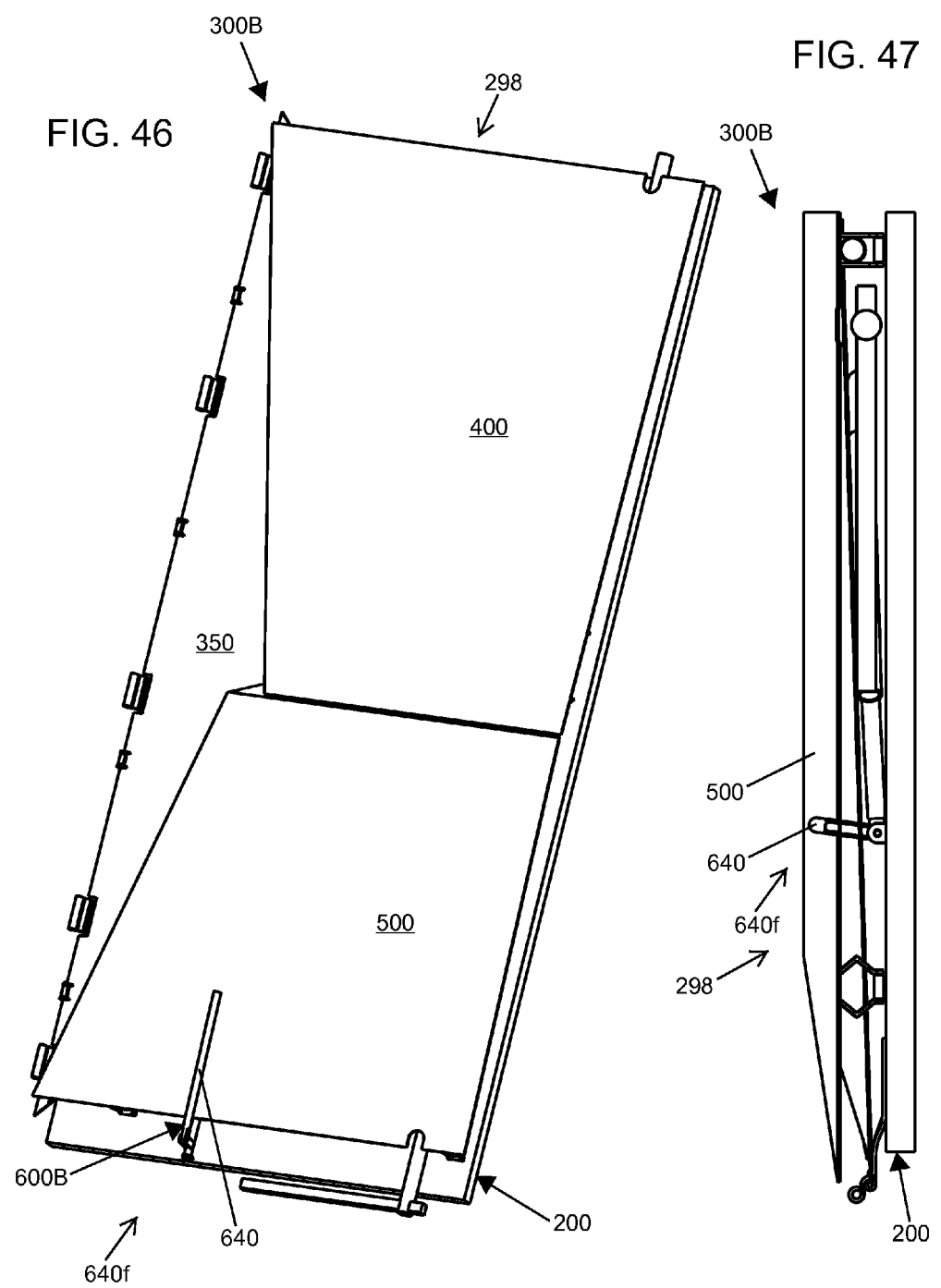

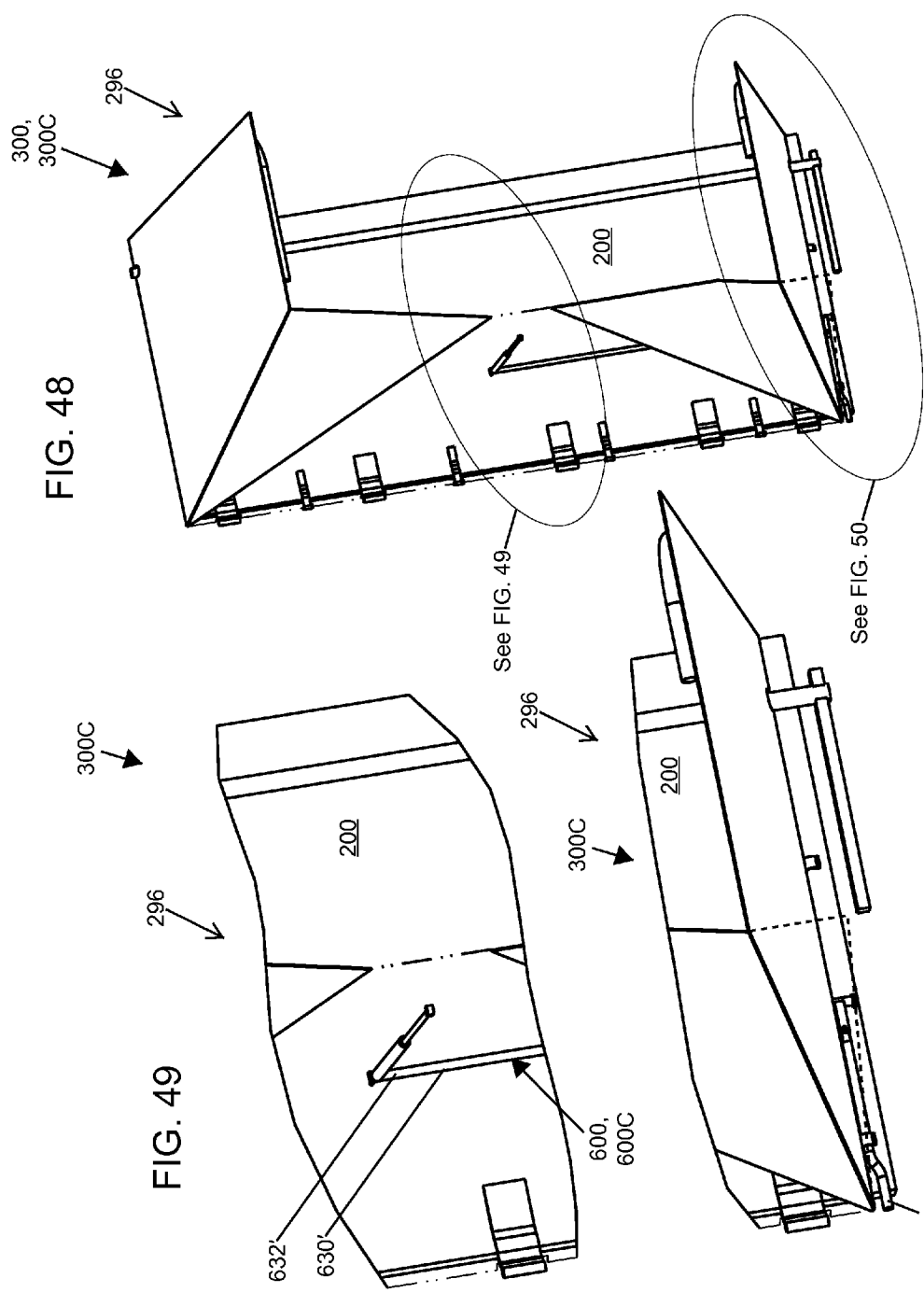

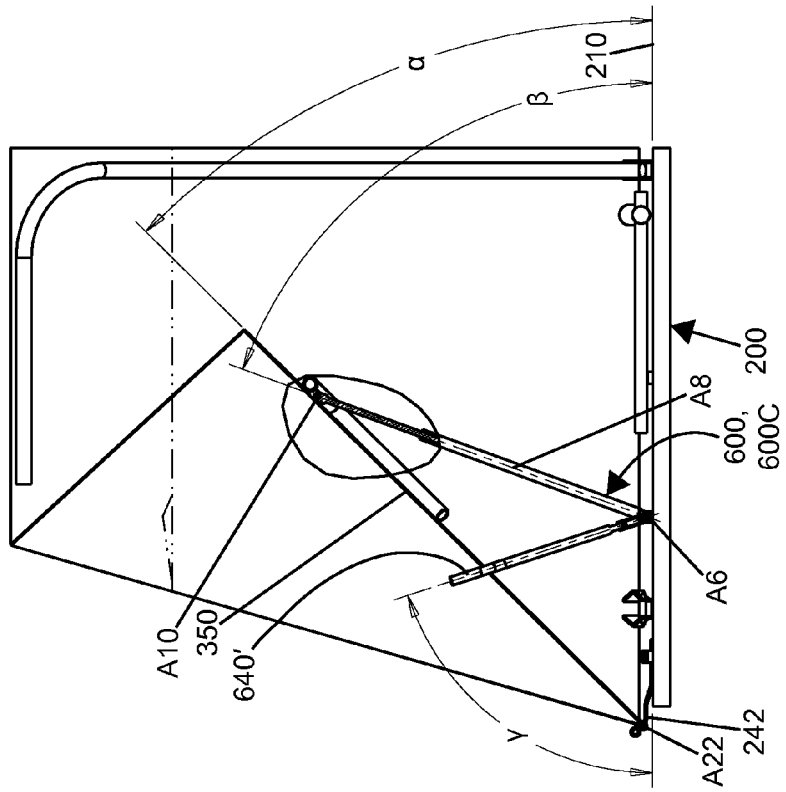
FIG. 51
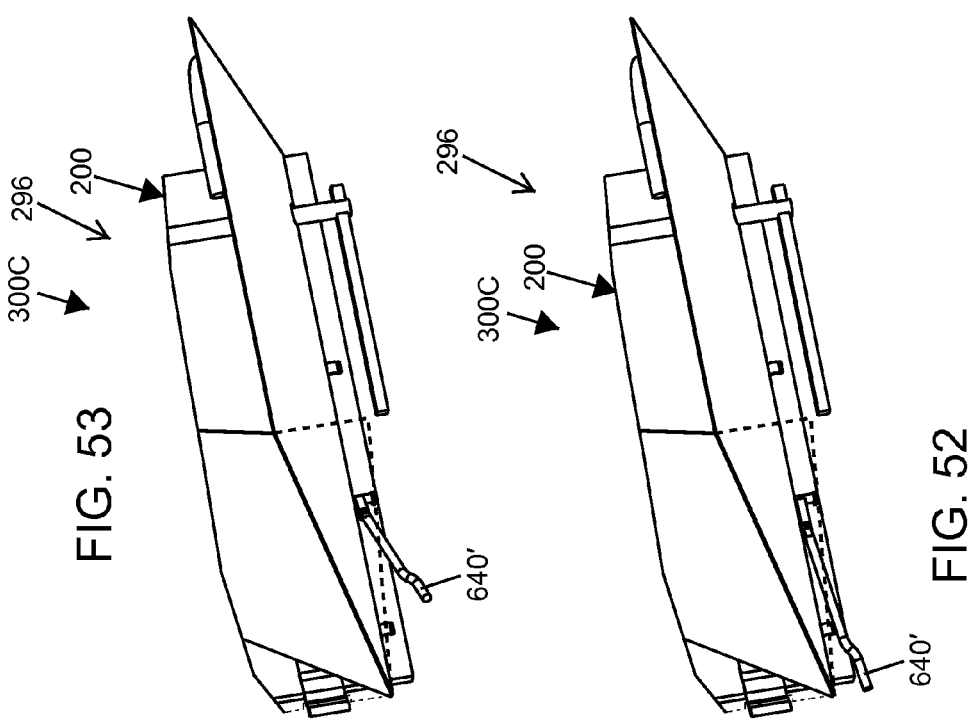
FIG. 52
FIG. 53

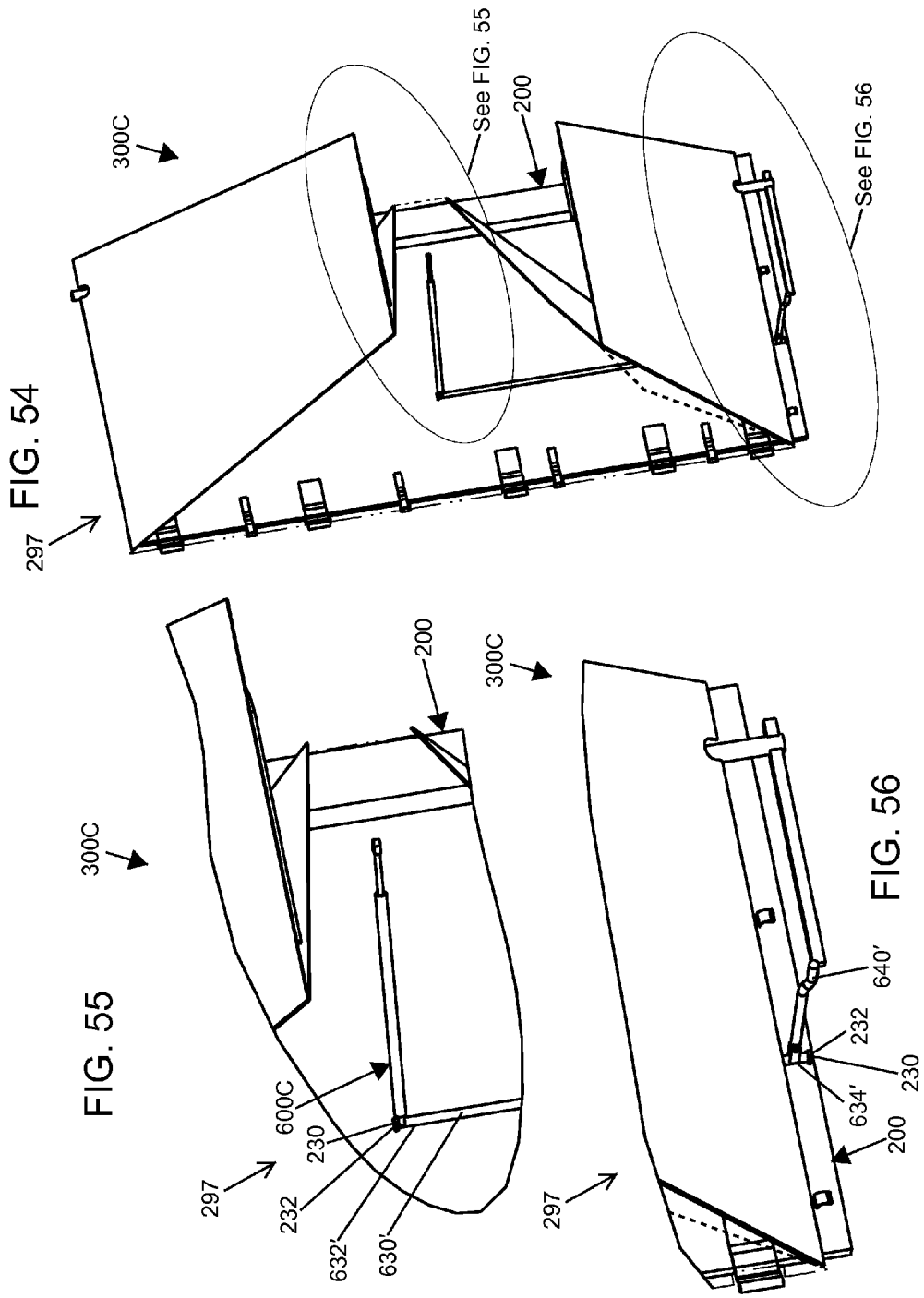

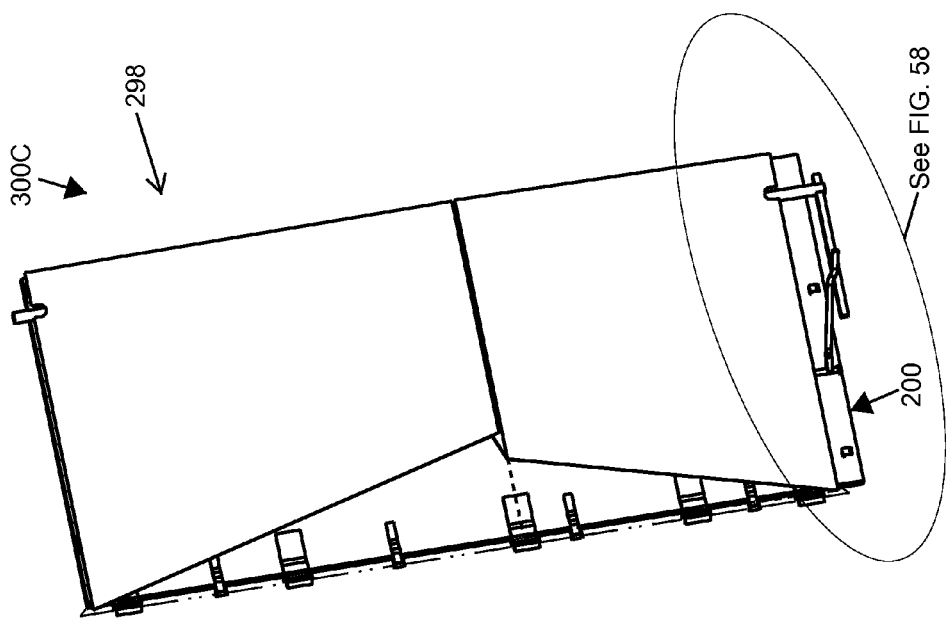
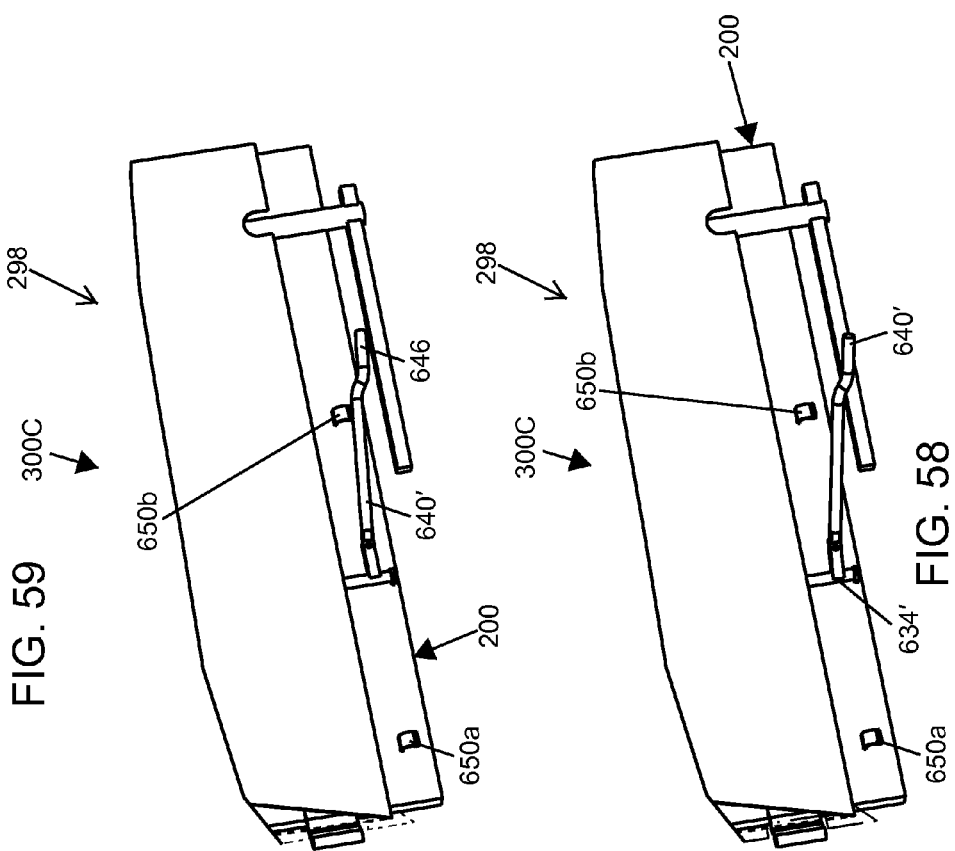

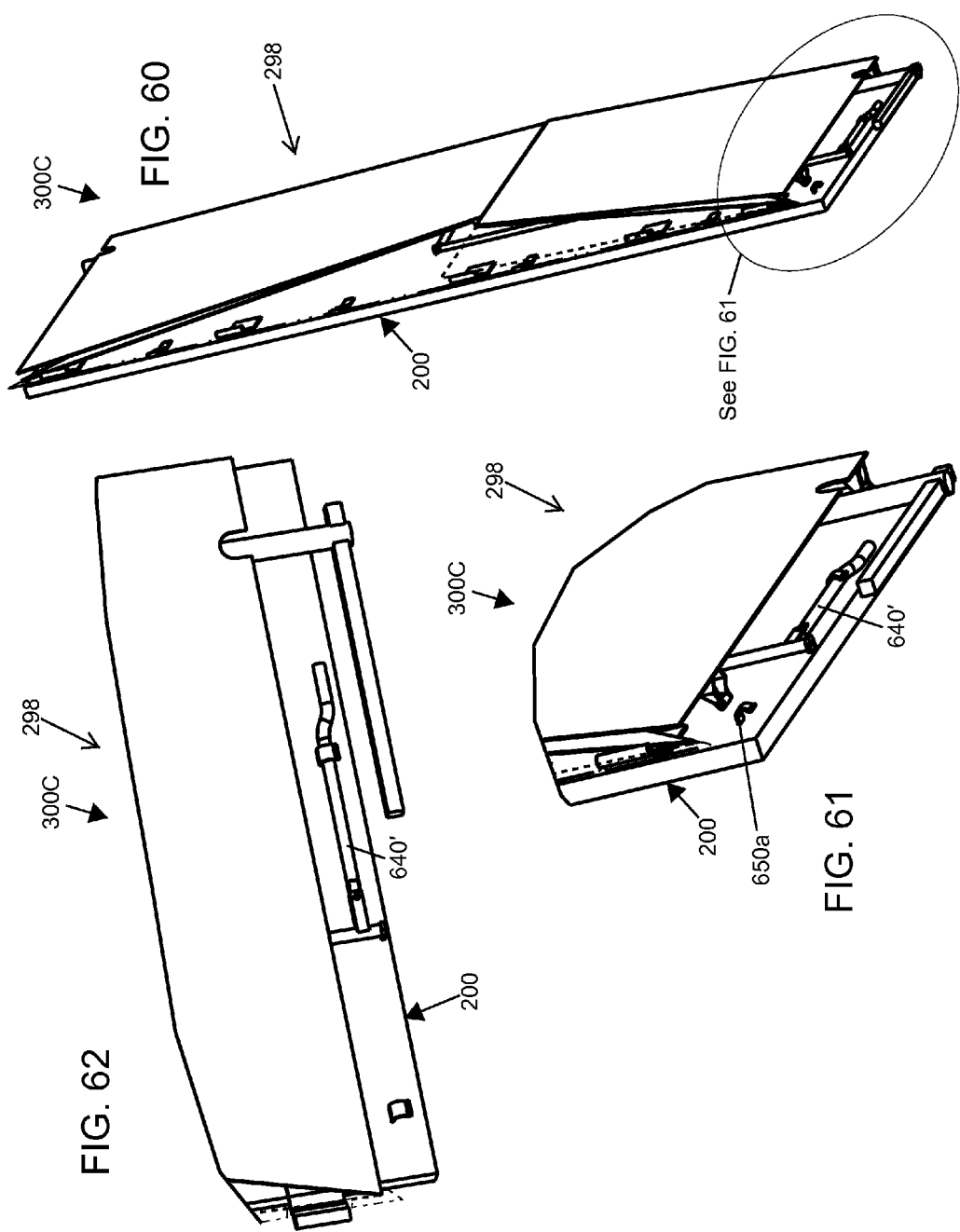

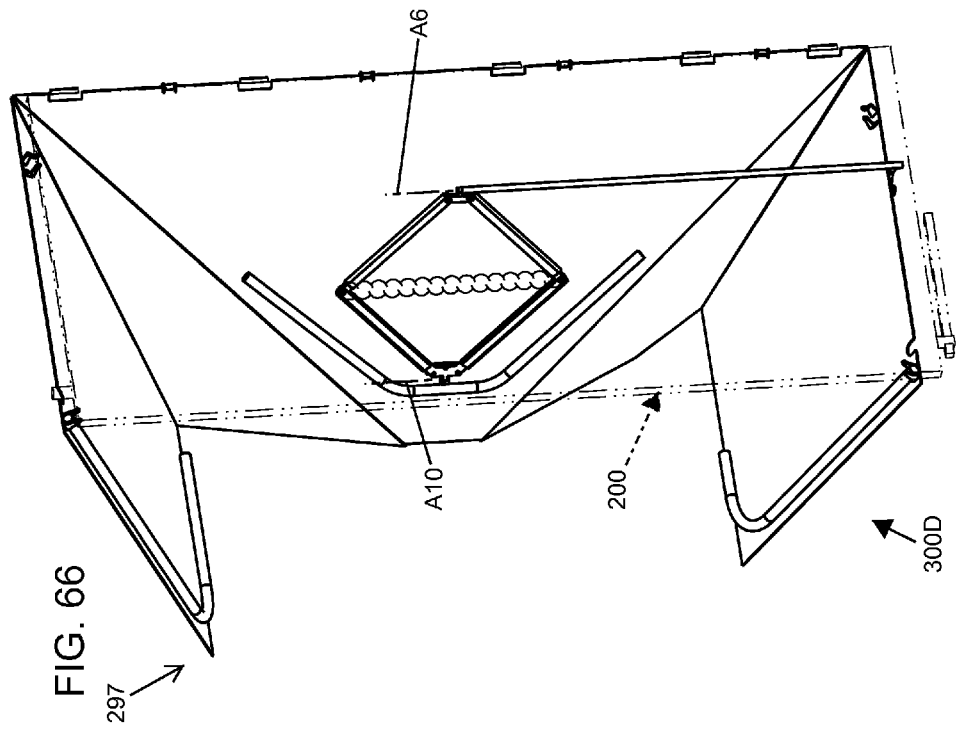
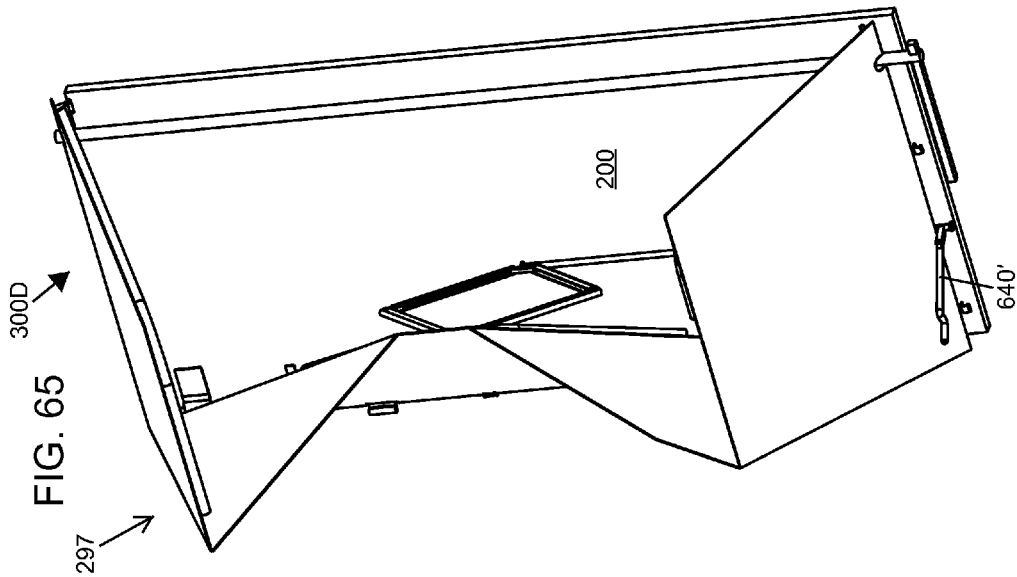

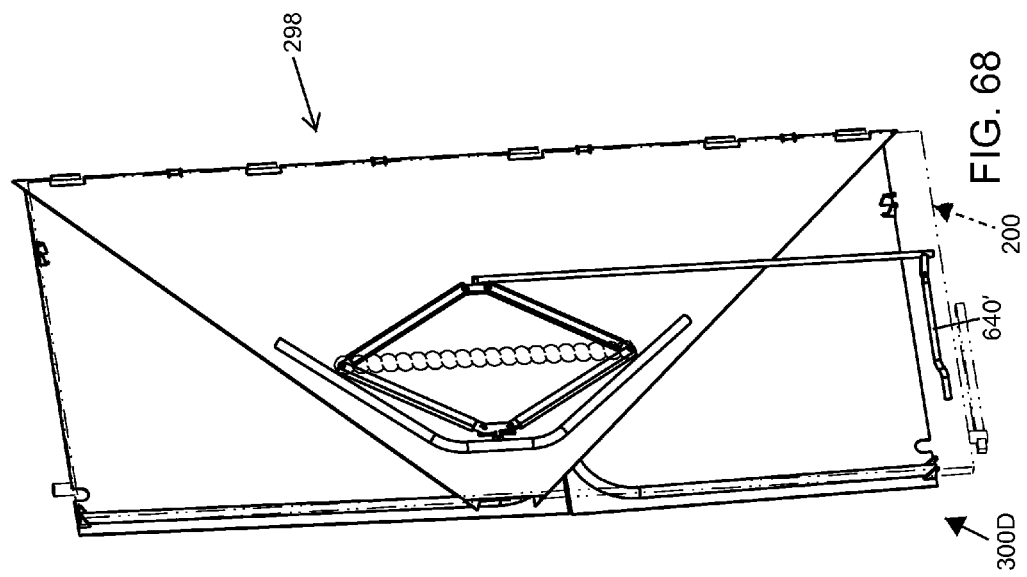
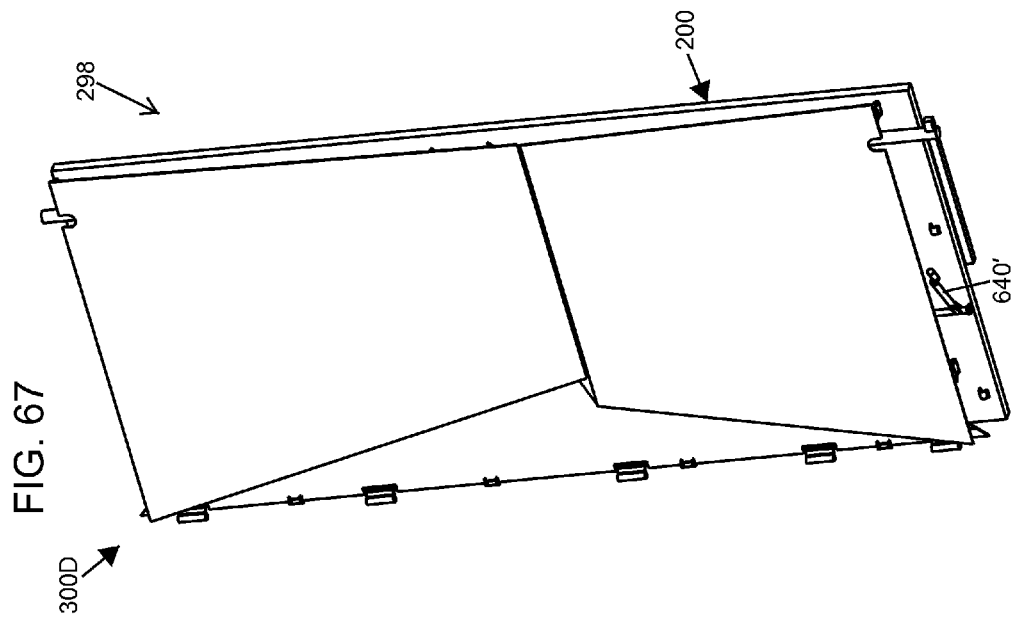

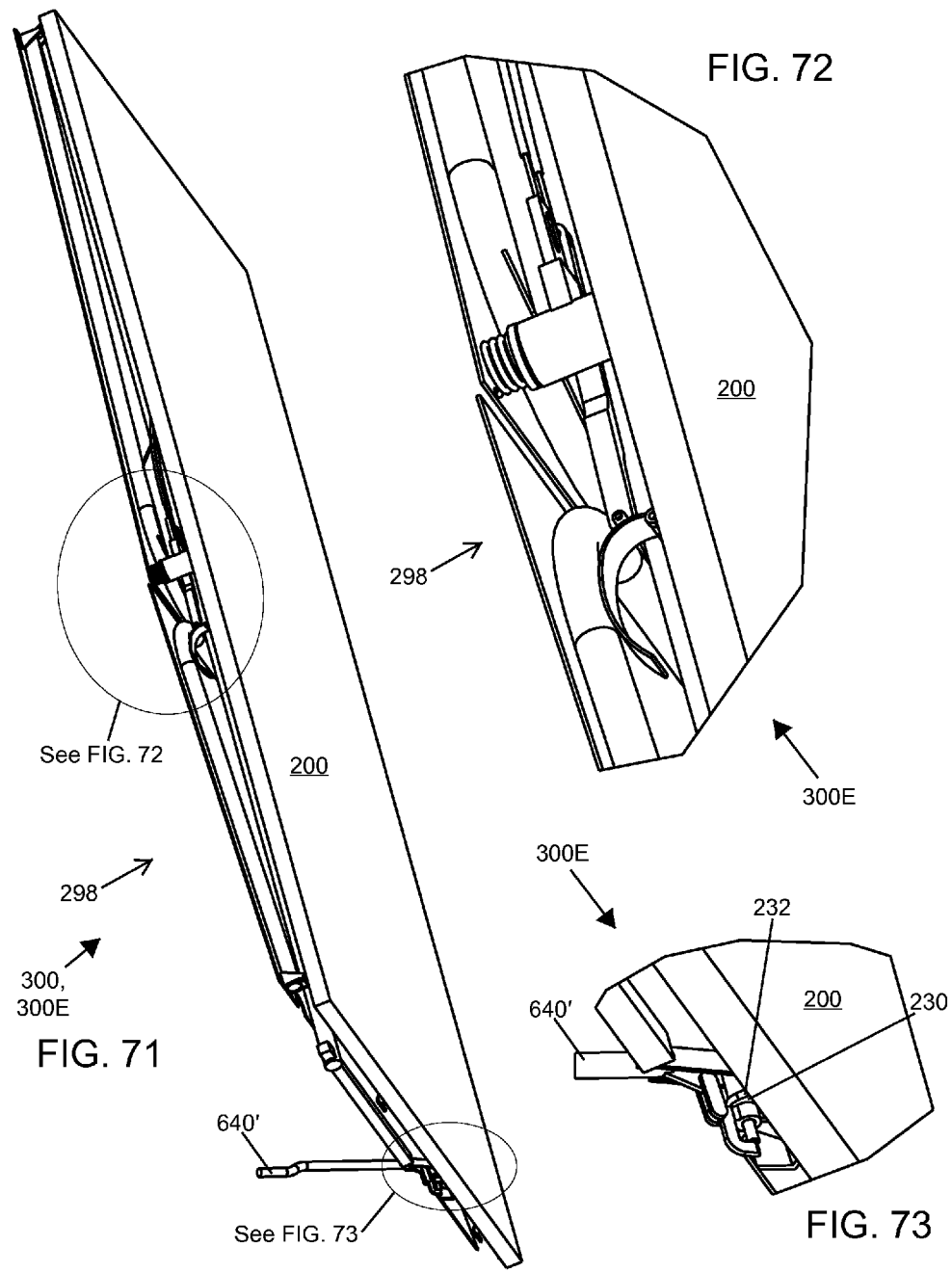

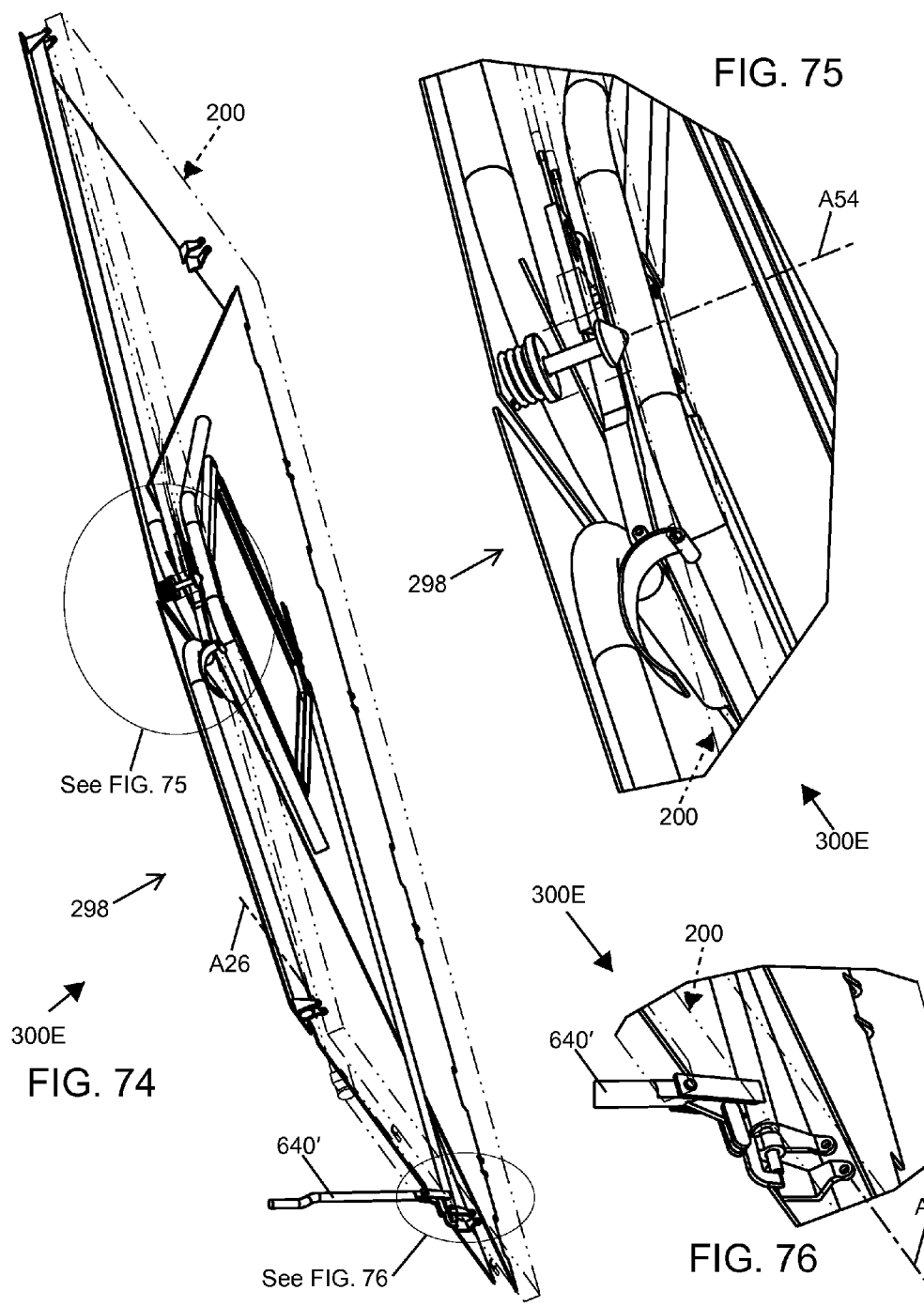

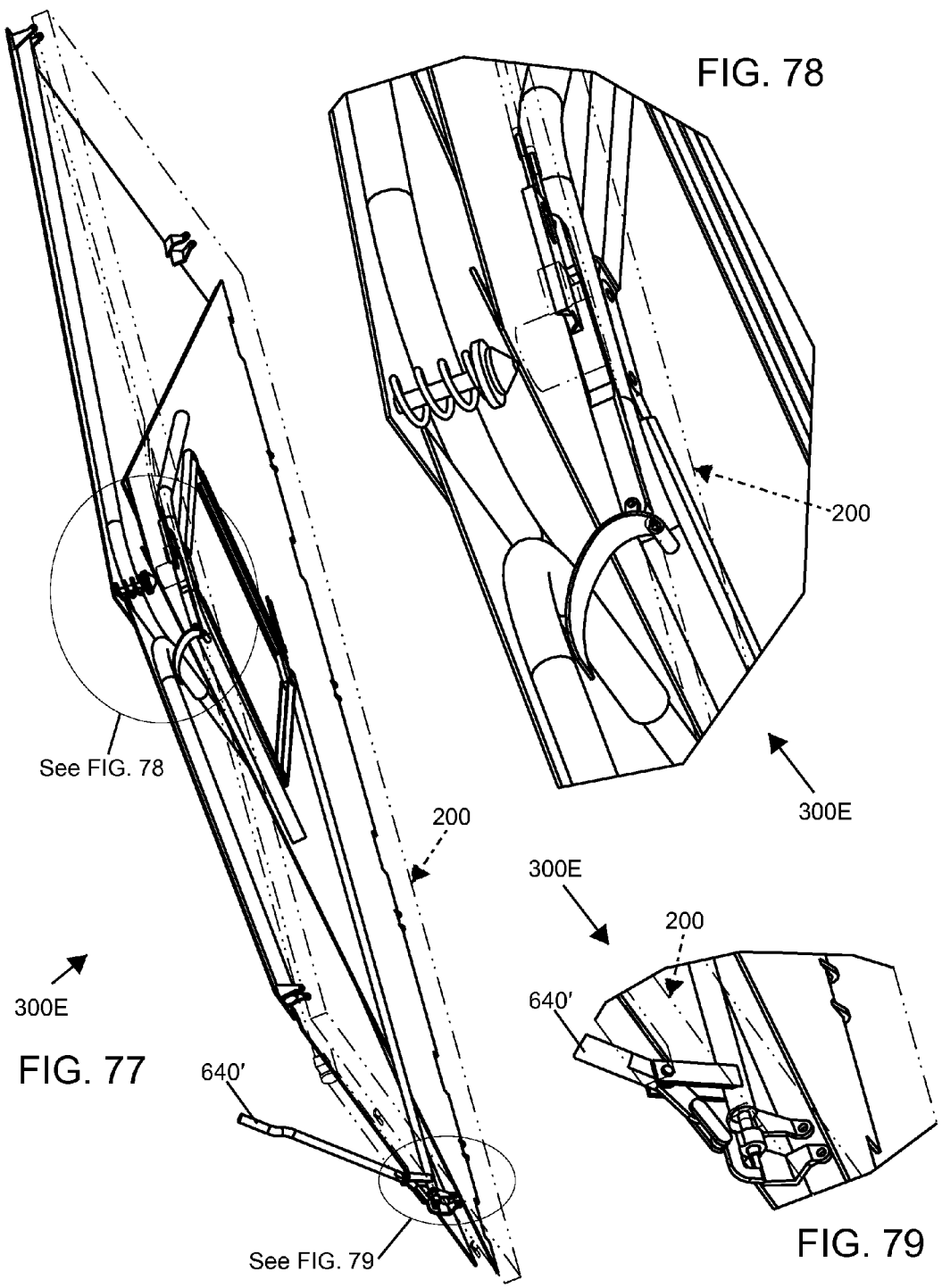

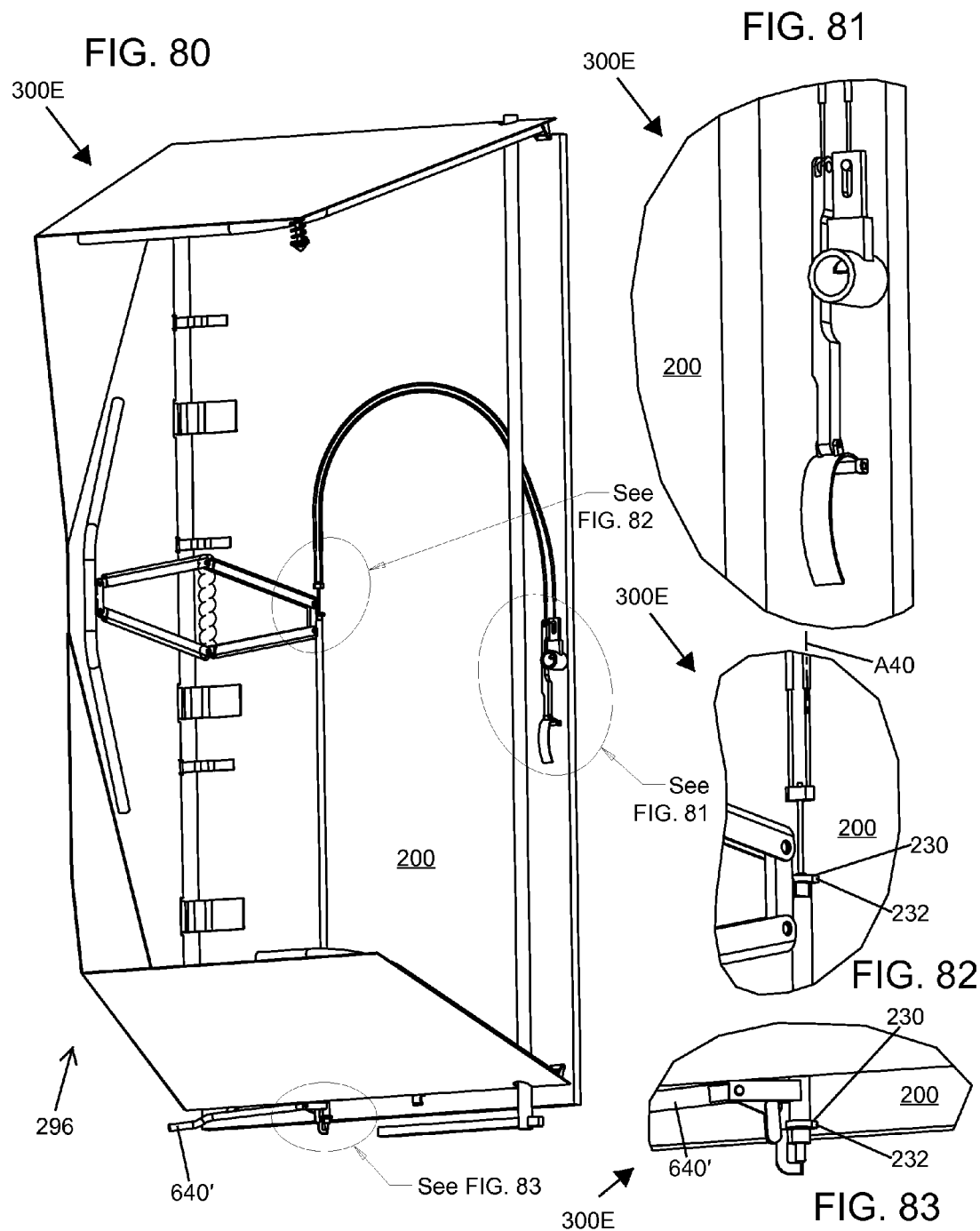

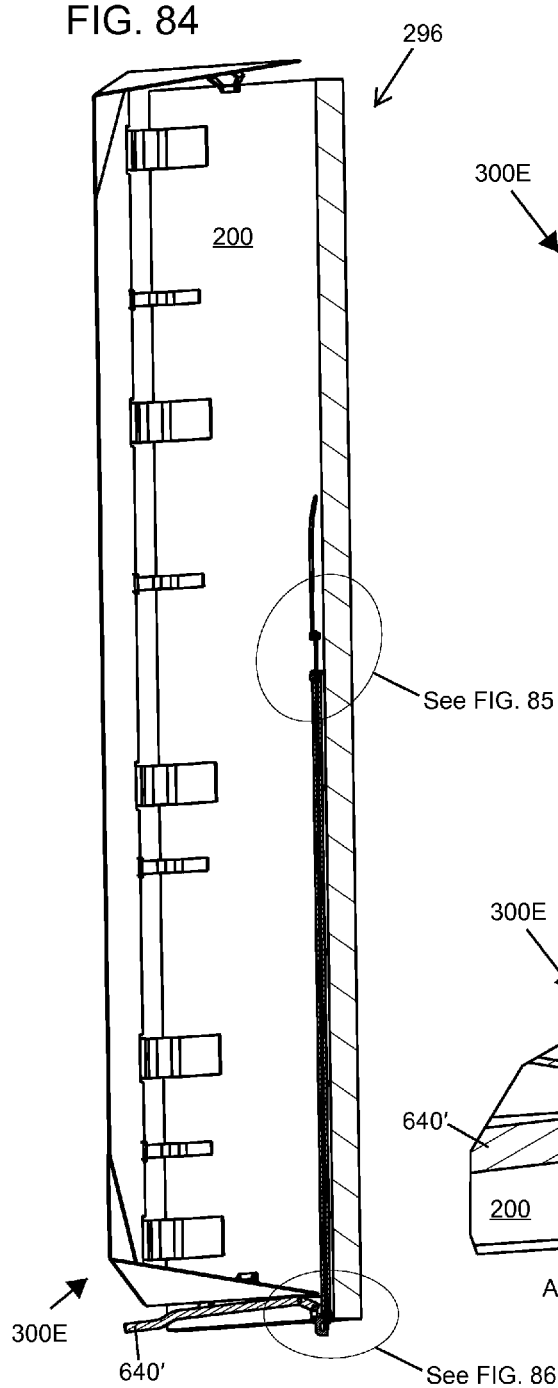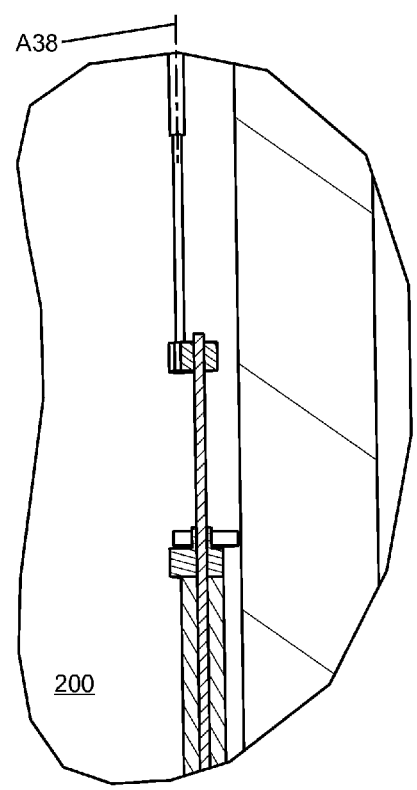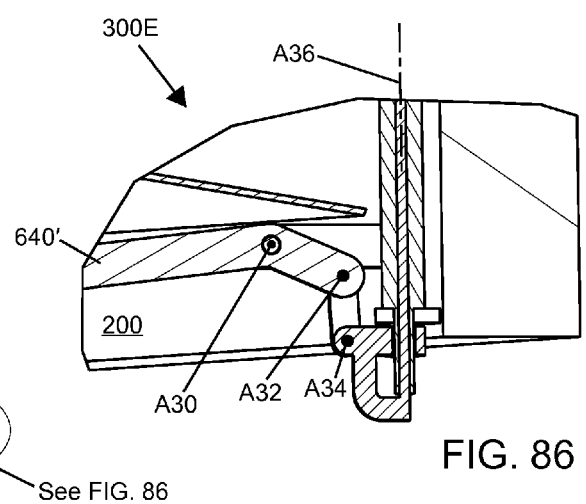

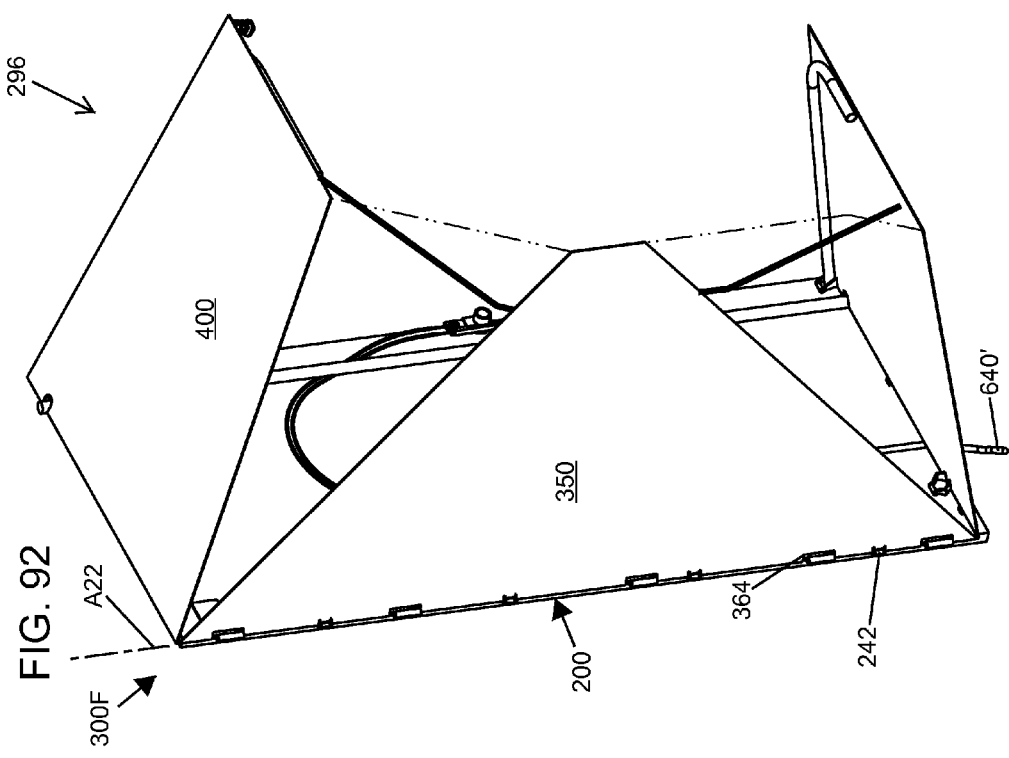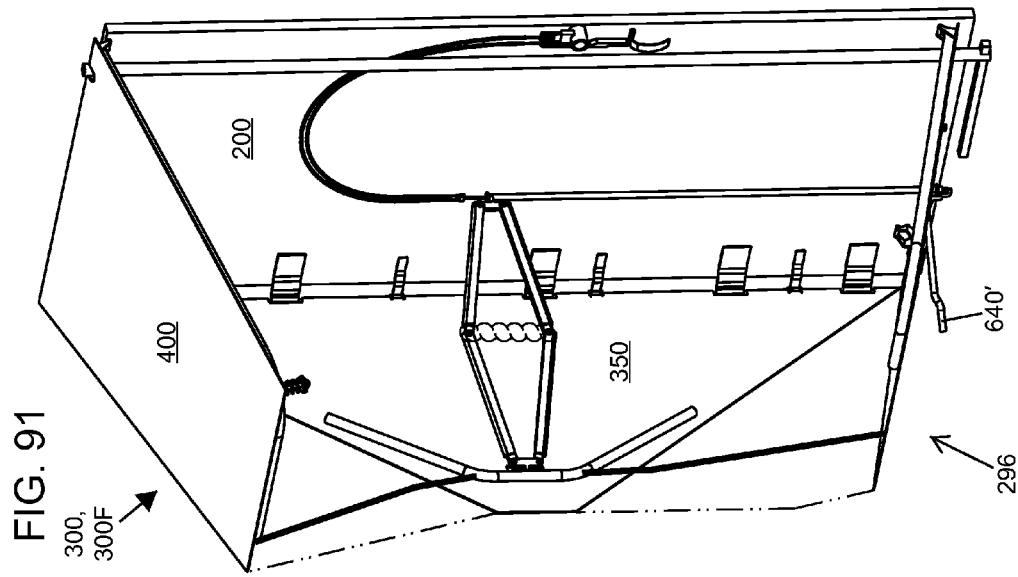

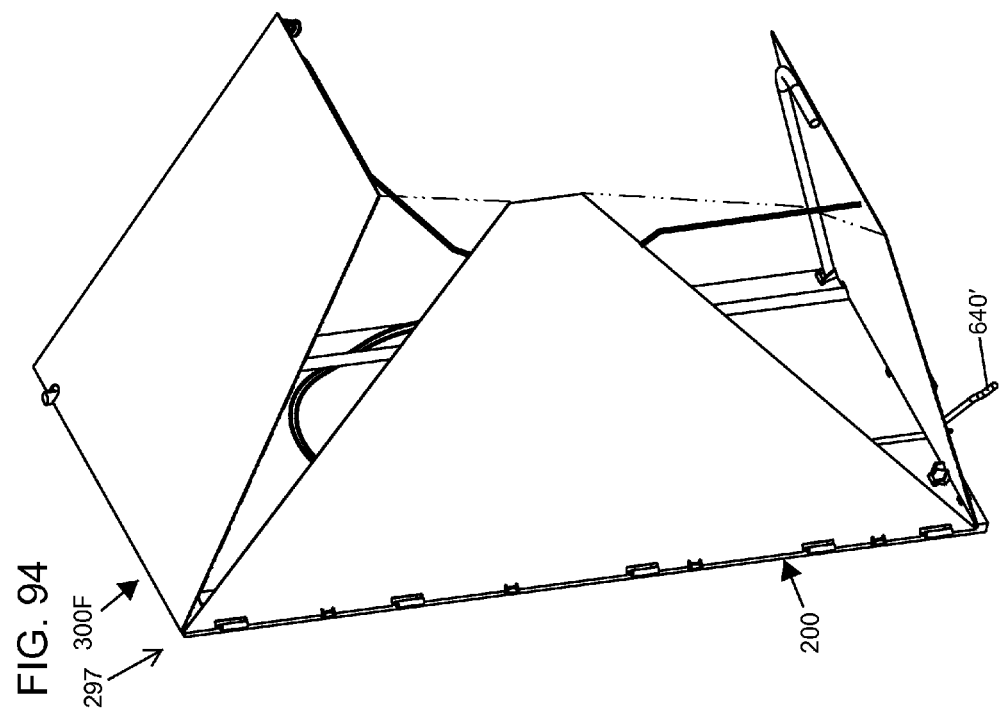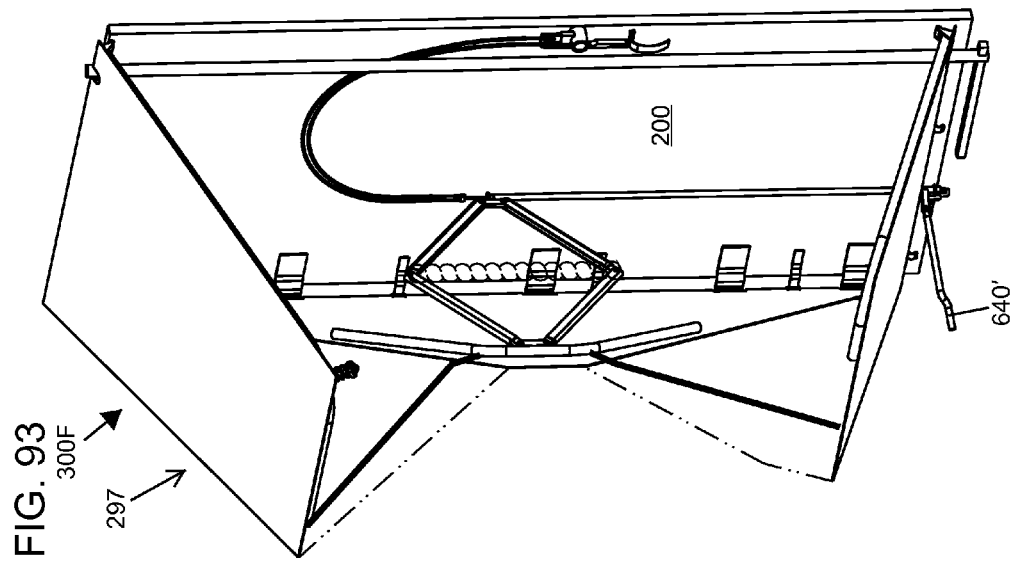

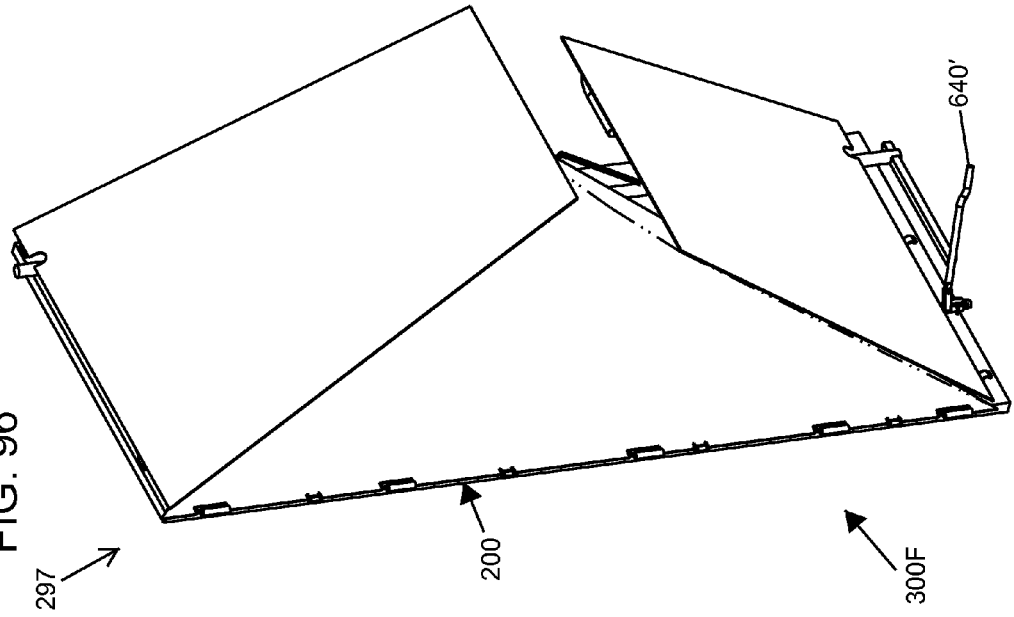
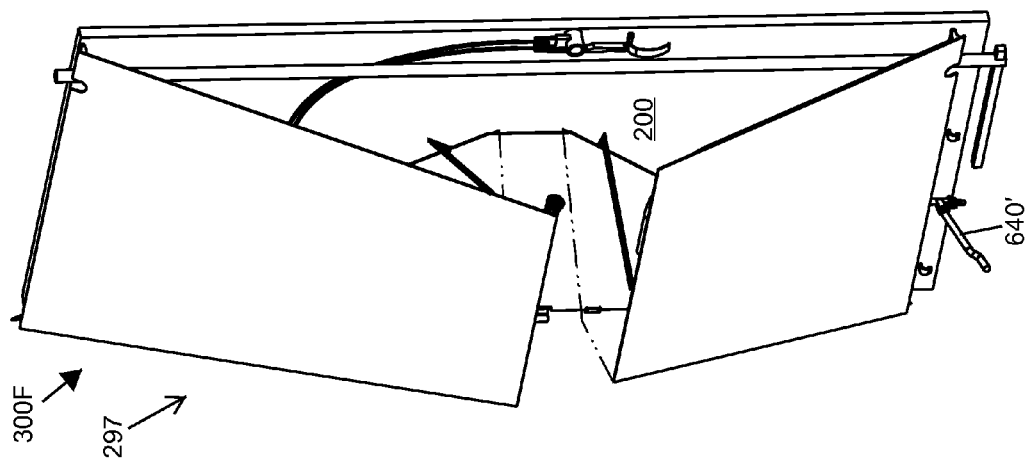

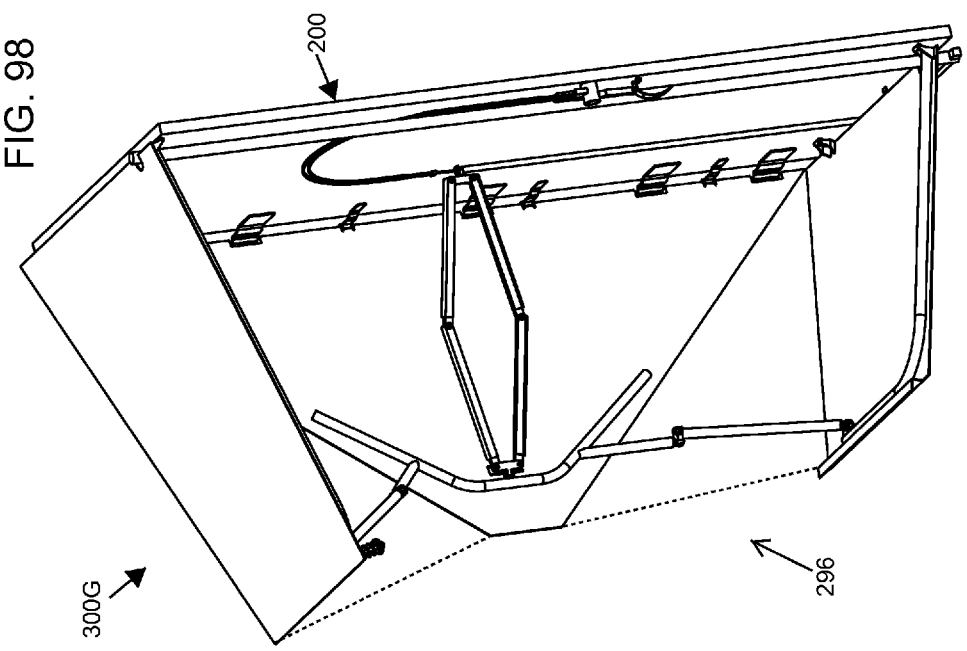
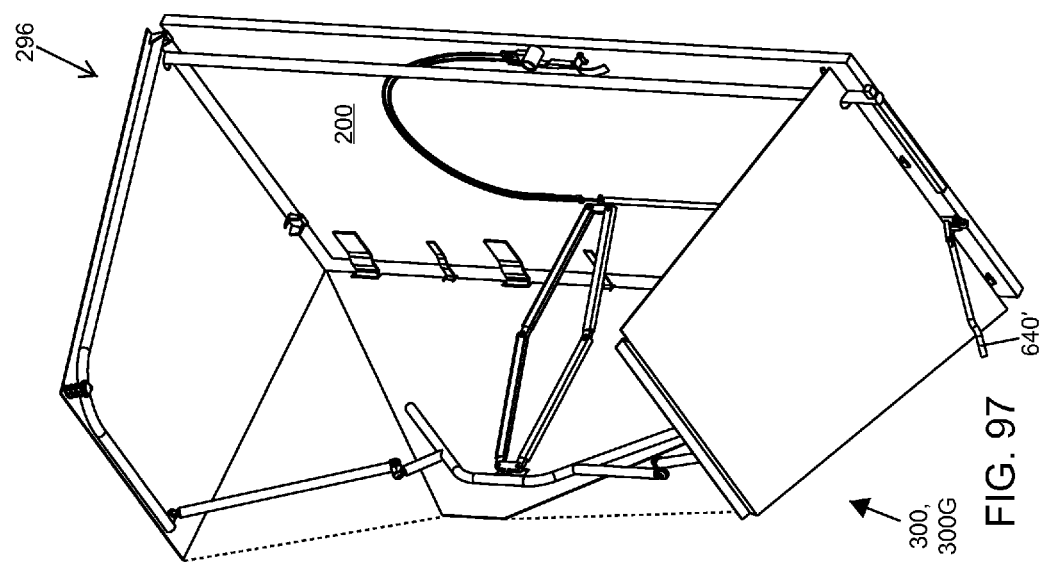

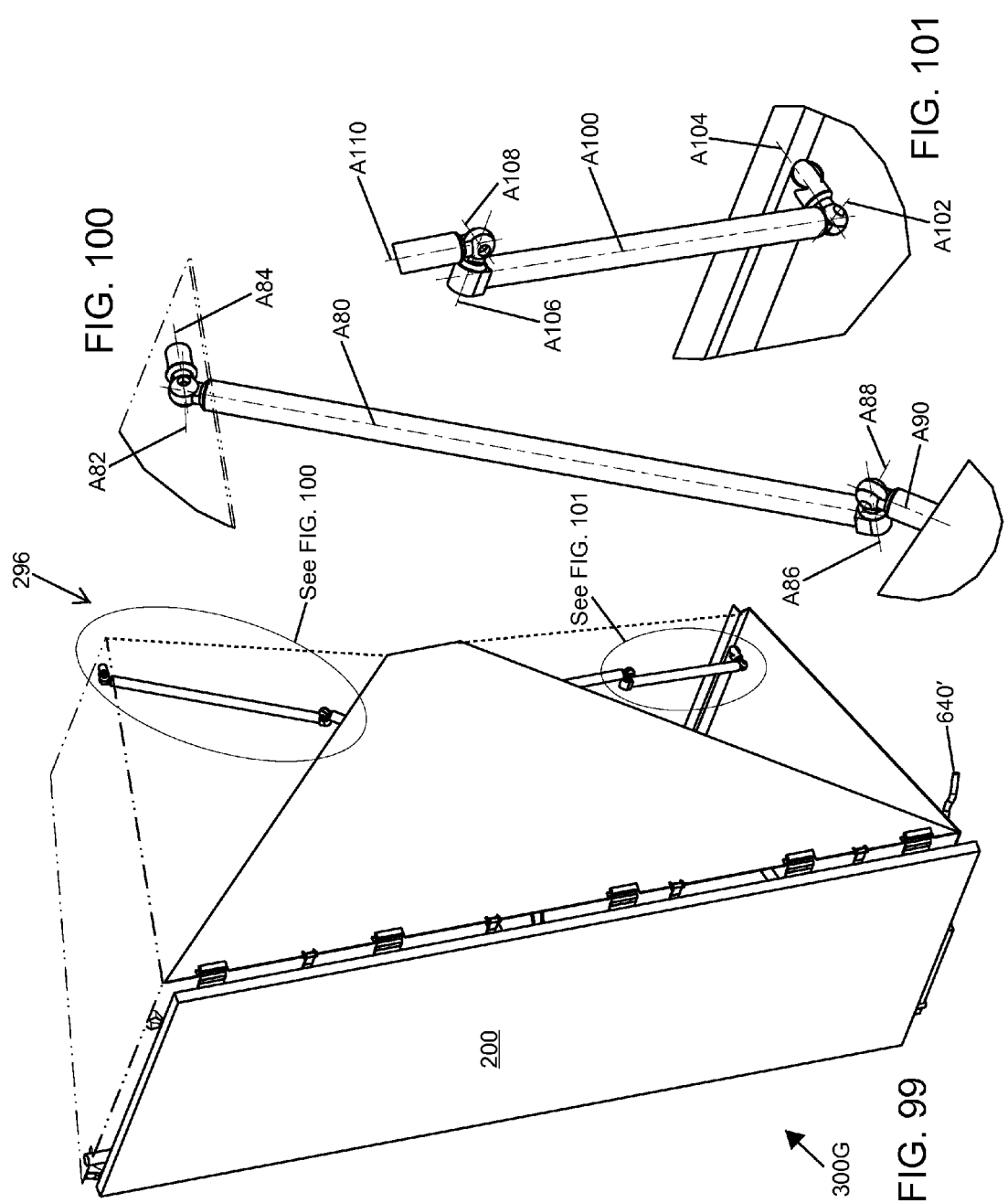

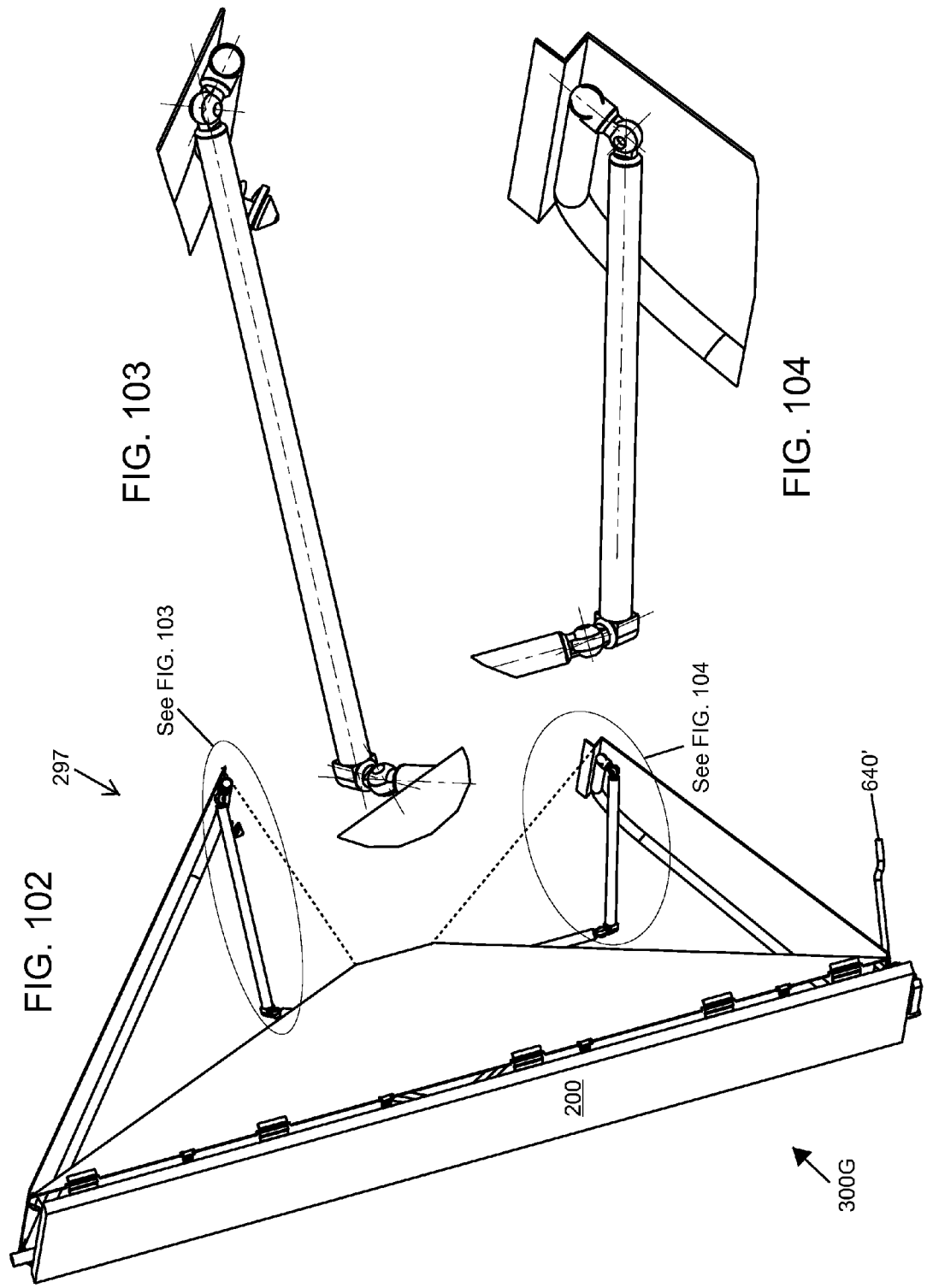

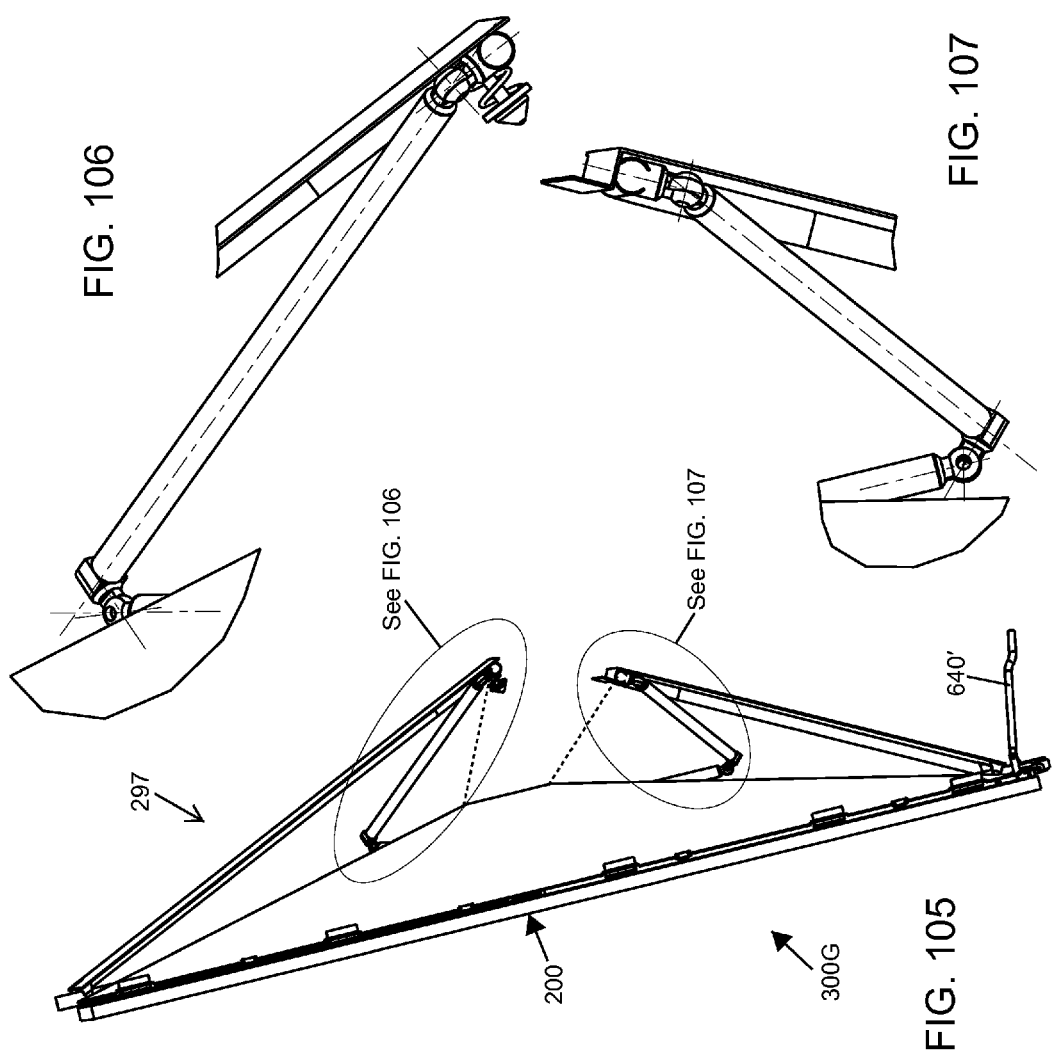

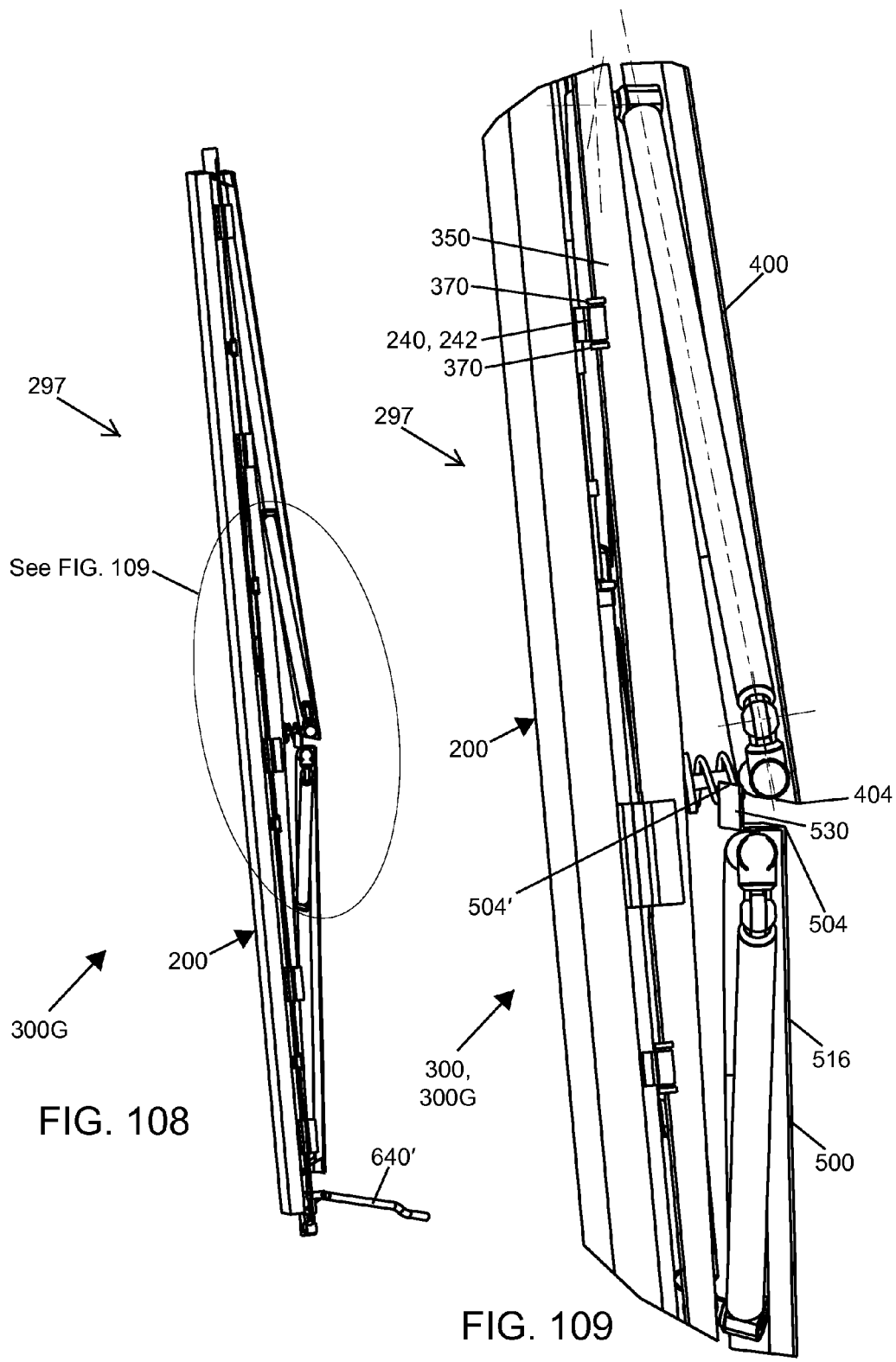

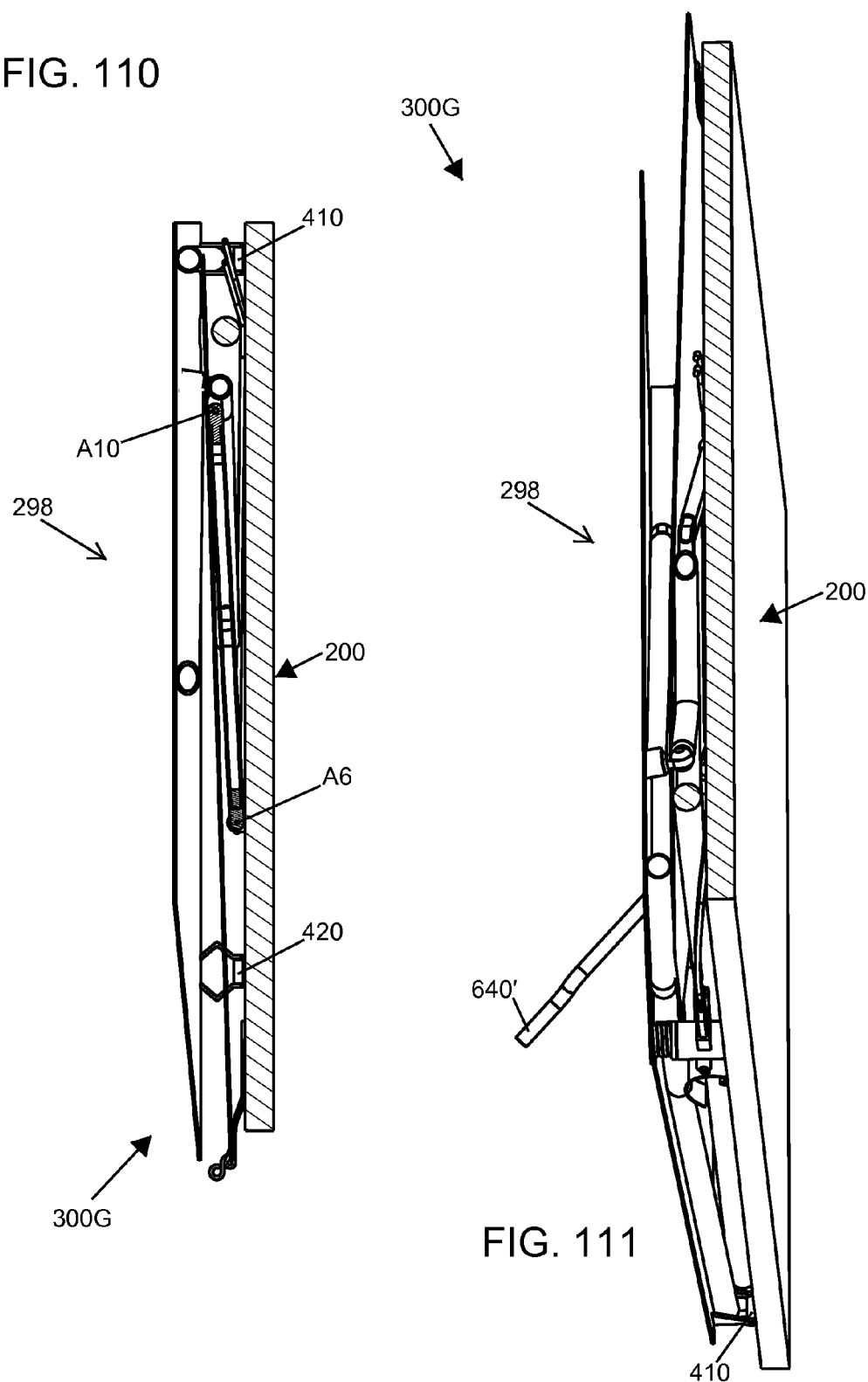

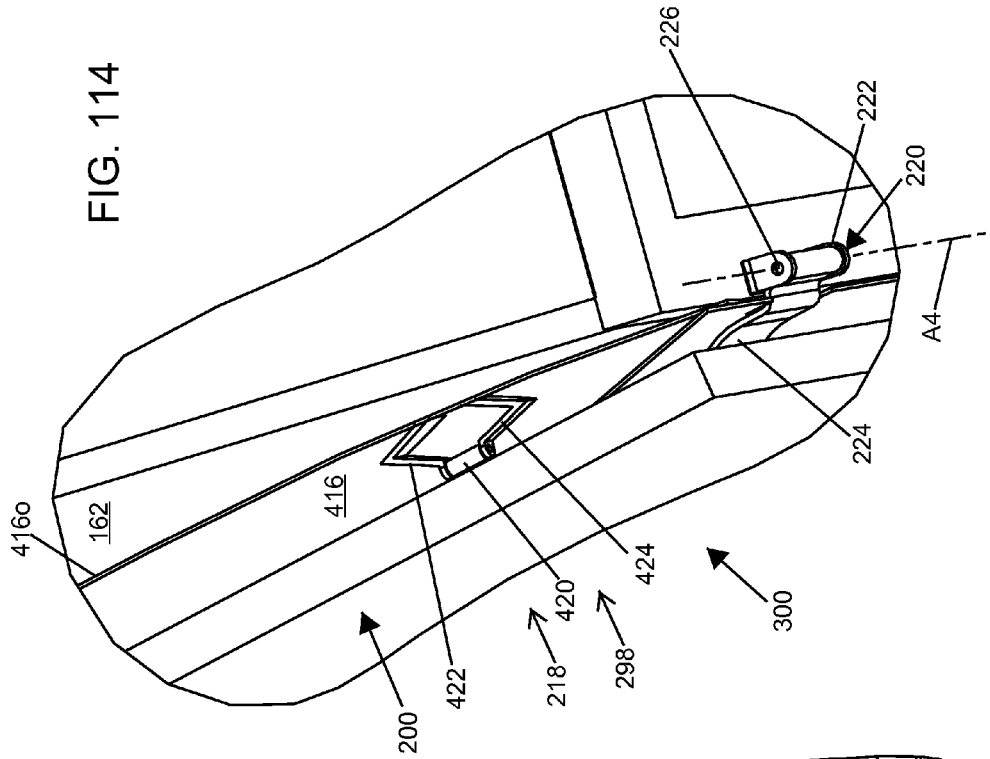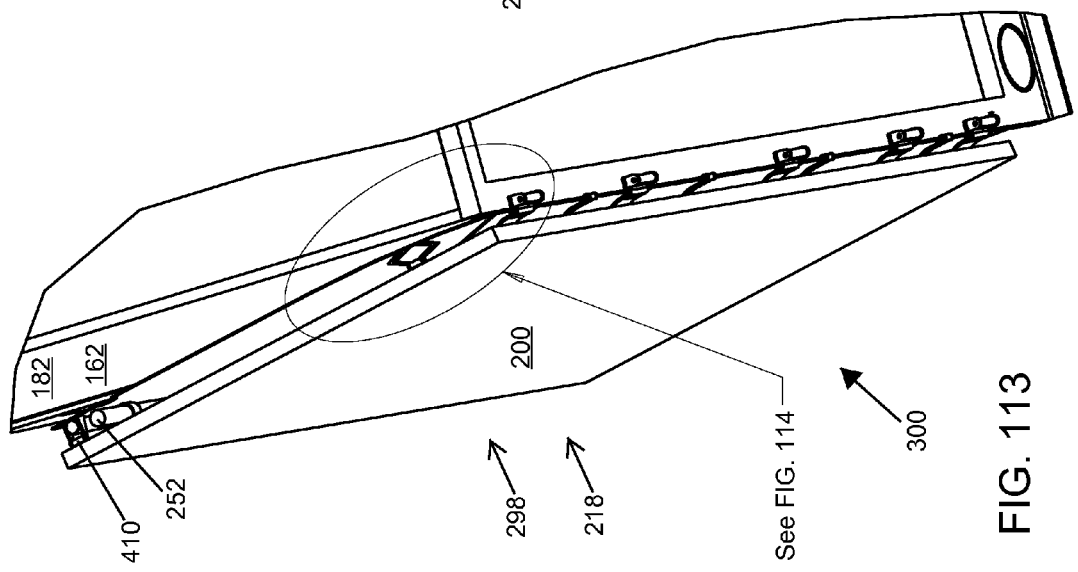

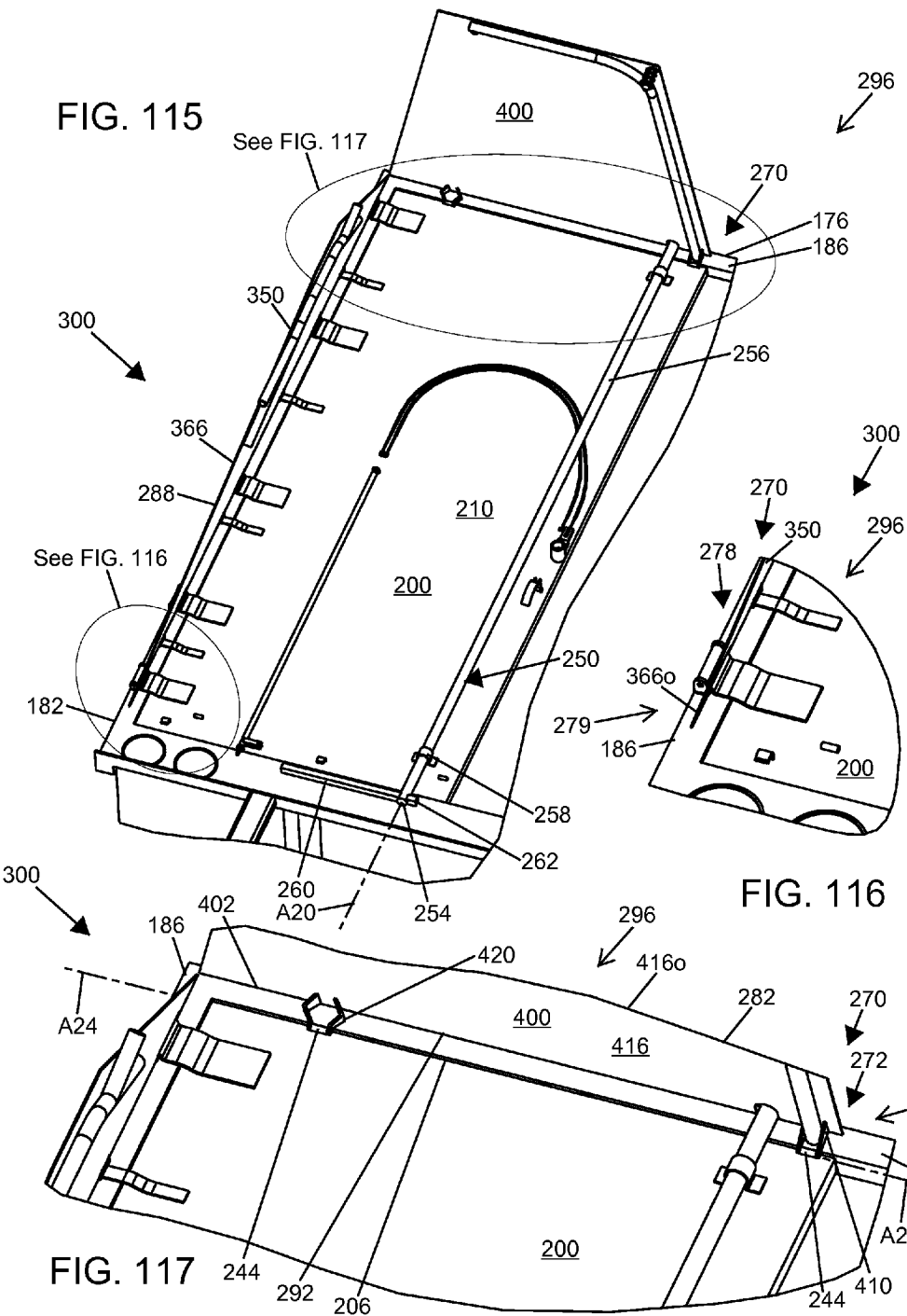

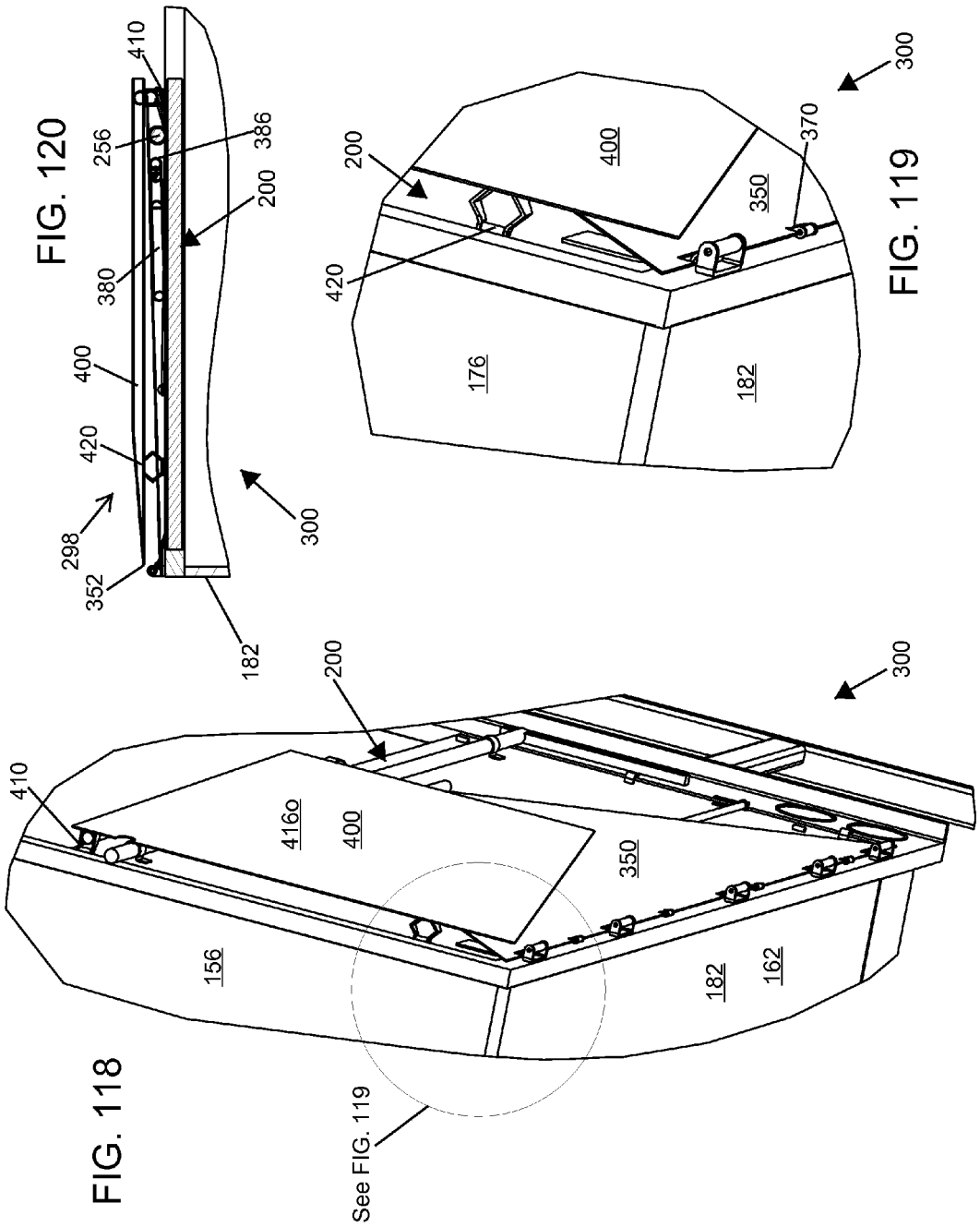

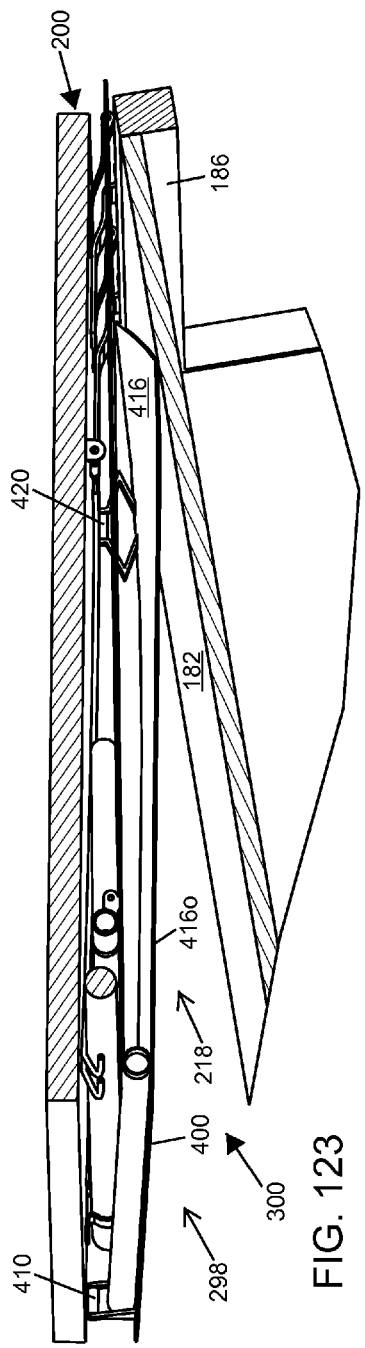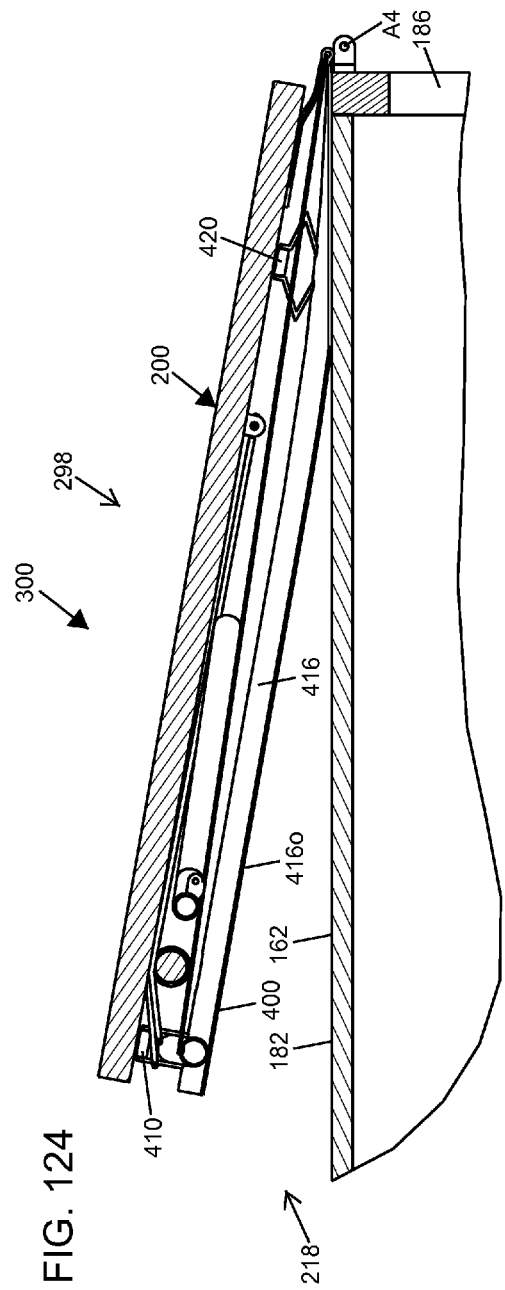
FIG. 123
FIG. 124

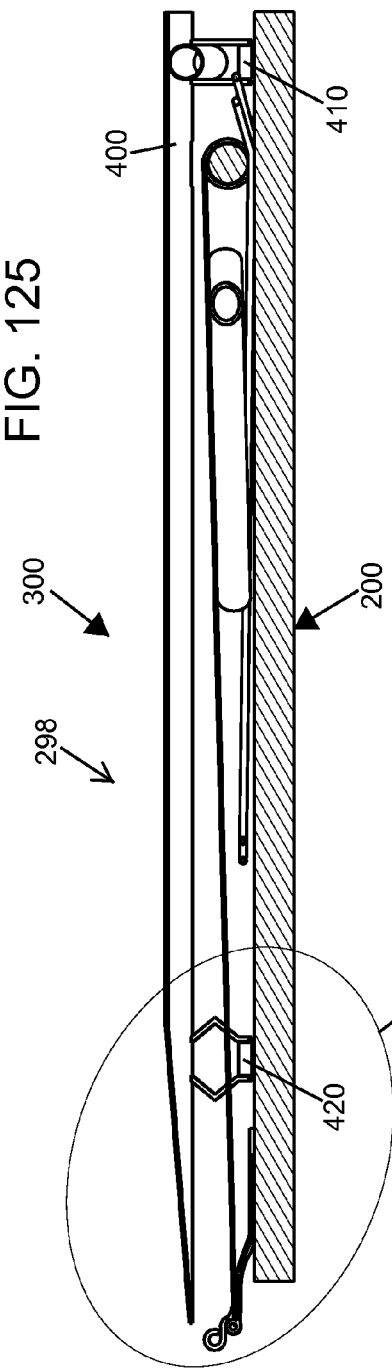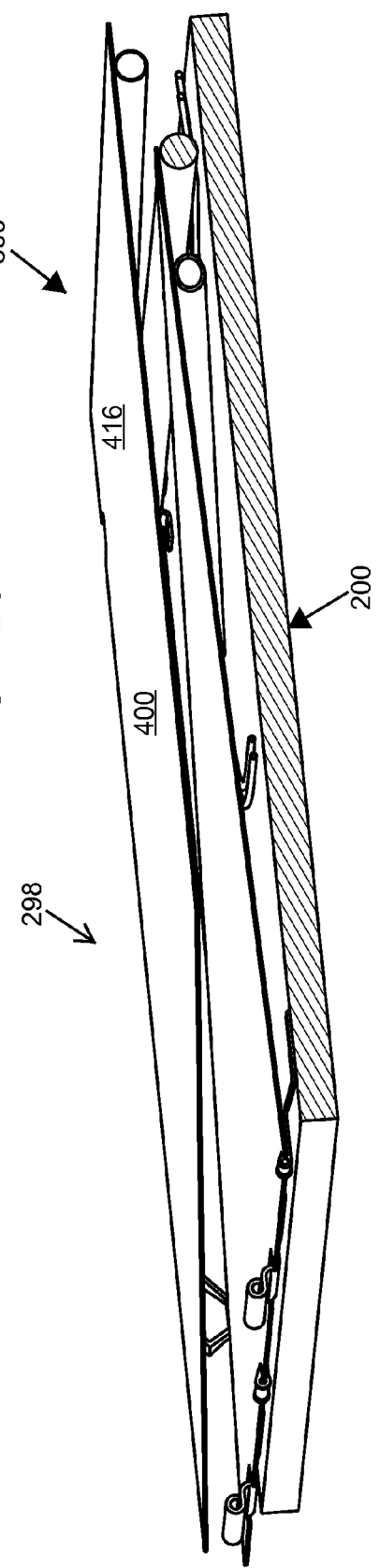

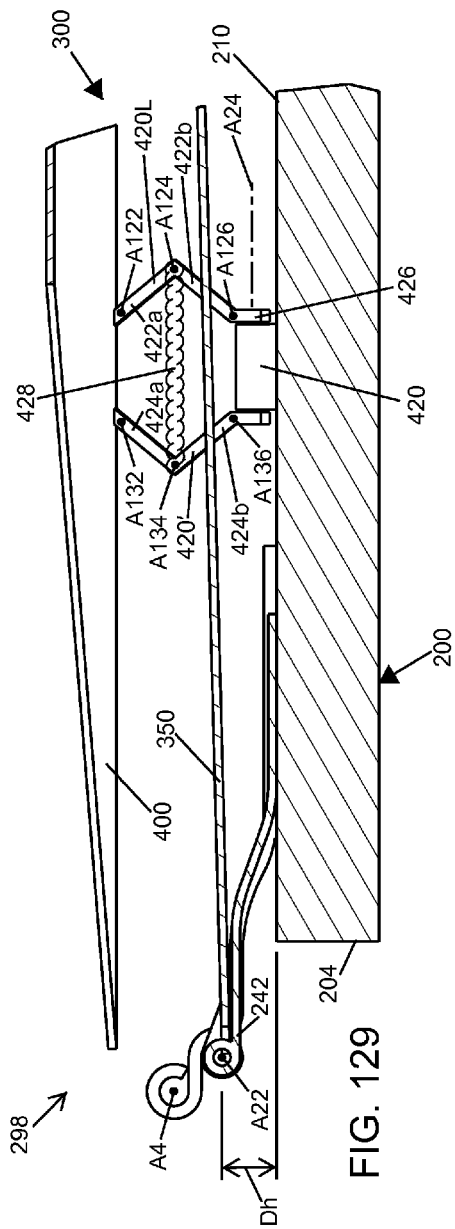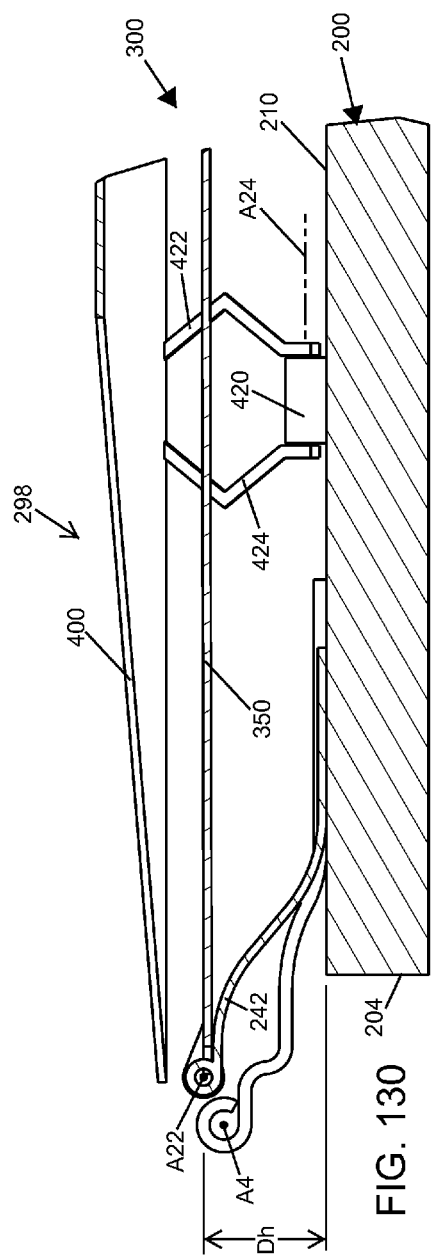

AERODYNAMIC DRAG REDUCING APPARATUS

CROSS REFERENCE TO RELATED APPLICATIONS

This application is a continuation of application Ser. No. 14/308,707, filed Jun. 18, 2014, now U.S. Pat. No. 9,180,919, which claims the benefit of U.S. Provisional Patent Application Ser. Nos. 61/836,660, entitled AERODYNAMIC DRAG REDUCING APPARATUS, and filed on Jun. 18, 2013; 61/843,261, entitled AERODYNAMIC DRAG REDUCING APPARATUS, and filed on Jul. 5, 2013; and 61/858,598, entitled AERODYNAMIC DRAG REDUCING APPARATUS, and filed on Jul. 25, 2013, all of the disclosures of which are hereby incorporated by reference in their entireties.

BACKGROUND

It is known that a significant amount of aerodynamic drag is created when a vehicle travels at velocities typical on a modern roadway. This, in large part, is due to areas of low pressure that act on rear surfaces of the vehicle. The low pressure becomes more pronounced as airflow over the vehicle separates from surfaces of the vehicle. The phenomenon of airflow separation is also well known in aircraft wing design and, in this case, causes the aircraft wing to stall.

Vehicles with blunt rear ends are especially affected by airflow separation starting at an abrupt transition to the near vertical rear end surfaces. The low pressure that the airflow separation causes is compounded by a relatively large area that the low pressure acts over compared with more streamlined vehicles.

The low pressure acting on the rear surfaces of the vehicle as it moves produces a force that resists forward motion of the vehicle. The force is opposed by the vehicle's engine and requires power that is typically produced by burning fuel. Any reduction in aerodynamic drag results in a reduction in fuel consumption.

In a period of high fuel prices, increasing fuel efficiency is a growing concern. Aerodynamic improvements are especially valuable since they can be combined with other improvements such as engine efficiency, reduced chassis weight, etc. Increasing the fuel efficiency also provides a valuable benefit of increasing a range that a given vehicle can travel between refueling stops.

SUMMARY

One aspect of the present disclosure relates to an aerodynamic drag reducing apparatus adapted for mounting behind a vehicle. The aerodynamic drag reducing apparatus may include a side panel, an actuator arrangement, a top panel, and an interconnecting member. The side panel may be adapted to move between a deployed position and a stowed position. The actuator arrangement may be connected between a first connection to the side panel and a second connection to the vehicle. The actuator arrangement may define an actuator extension axis between the first connection and the second connection. The top panel may be adapted to move between a deployed position and a stowed position. The interconnecting member may be connected between the side and top panels and may coordinate movement between the side and top panels such that they each move together between the deployed positions and the stowed positions, respectively.

Another aspect of the present disclosure relates to an aerodynamic drag reducing apparatus adapted for use adjacent a rear door of a vehicle. The aerodynamic drag reducing apparatus includes a panel mounting arrangement and an aerodynamic panel. The panel mounting arrangement includes a vehicle attachment and a panel attachment. The panel mounting arrangement is attached to the vehicle at the vehicle attachment. The panel mounting arrangement is configurable at a first configuration and a second configuration. The aerodynamic panel is attached to the panel mounting arrangement at the panel attachment and is moveable between a deployed position substantially behind a rear of the vehicle and a compact stowed position substantially alongside a side of the vehicle. The panel mounting arrangement is configured at the first configuration when the aerodynamic panel is at the deployed position. The panel mounting arrangement is configured at the second configuration when the aerodynamic panel is at the compact stowed position. A distance between the vehicle attachment and the panel attachment of the panel mounting arrangement is reduced when the panel mounting arrangement is reconfigured from the first configuration to the second configuration.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views, unless otherwise specified.

FIG. 1 is a perspective view of a vehicle with an aerodynamic drag reducing apparatus mounted on a rear end of the vehicle, the aerodynamic drag reducing apparatus illustrated in a deployed configuration, according to the principles of the present disclosure;

FIG. 2 is another perspective view of the vehicle and the aerodynamic drag reducing apparatus of FIG. 1;

FIG. 3 is an enlarged portion of FIG. 1;

FIG. 4 is a partial enlarged perspective view of the vehicle and the aerodynamic drag reducing apparatus of FIG. 1;

FIG. 5 is the perspective view of FIG. 1, but with the aerodynamic drag reducing apparatus illustrated in a stowed configuration;

FIG. 6 is the perspective view of FIG. 2, but with the aerodynamic drag reducing apparatus illustrated in the stowed configuration;

FIG. 7 is an enlarged portion of FIG. 5;

FIG. 8 is the partial enlarged perspective view of FIG. 4, but with the aerodynamic drag reducing apparatus illustrated in the stowed configuration;

FIG. 9 is the perspective view of FIG. 1, but with the aerodynamic drag reducing apparatus illustrated in the stowed configuration and doors of the vehicle open;

FIG. 10 is the perspective view of FIG. 2, but with the aerodynamic drag reducing apparatus illustrated in the stowed configuration and the doors of the vehicle open;

FIG. 13 is a perspective view of a first example embodiment of a drag reducing apparatus adapted for use with the vehicle of FIG. 1, illustrated in a deployed configuration, according to the principles of the present disclosure;

FIG. 14 is the perspective view of FIG. 13, but with a top panel of the drag reducing apparatus shown in phantom outline;

FIG. 15 is another perspective view of the drag reducing apparatus of FIG. 13;

FIG. 16 is the perspective view of FIG. 15, but with the door of the vehicle shown in phantom outline;

FIG. 17 is a side elevation view of the drag reducing apparatus of FIG. 13, the side elevation view illustrating an outside portion of the drag reducing apparatus;

FIG. 18 is a side elevation view of the drag reducing apparatus of FIG. 13, the side elevation view illustrating an inside portion of the drag reducing apparatus;

FIG. 19 is the perspective view of FIG. 13, but with the drag reducing apparatus illustrated in a transitional configuration;

FIG. 20 is the perspective view of FIG. 14, but with the drag reducing apparatus illustrated in the transitional configuration of FIG. 19;

FIG. 23 is the side elevation view of FIG. 17, but with the drag reducing apparatus illustrated in the transitional configuration of FIG. 19;

FIG. 24 is the side elevation view of FIG. 18, but with the drag reducing apparatus illustrated in the transitional configuration of FIG. 19;

FIG. 25 is the perspective view of FIG. 19, but with the drag reducing apparatus illustrated in a transitional configuration that is farther from the deployed configuration of FIG. 13 than the transitional configuration of FIG. 19;

FIG. 26 is the perspective view of FIG. 20, but with the aerodynamic drag reducing apparatus illustrated in the transitional configuration of FIG. 25;

FIG. 27 is the perspective view of FIG. 21, but with the aerodynamic drag reducing apparatus illustrated in the transitional configuration of FIG. 25;

FIG. 28 is the perspective view of FIG. 22, but with the aerodynamic drag reducing apparatus illustrated in the transitional configuration of FIG. 25;

FIG. 29 is the side elevation view of FIG. 23, but with the aerodynamic drag reducing apparatus illustrated in the transitional configuration of FIG. 25;

FIG. 30 is the side elevation view of FIG. 24, but with the aerodynamic drag reducing apparatus illustrated in the transitional configuration of FIG. 25;

FIG. 31 is the perspective view of FIG. 13, but with the aerodynamic drag reducing apparatus illustrated in a stowed configuration;

FIG. 32 is the perspective view of FIG. 14, but with the aerodynamic drag reducing apparatus illustrated in the stowed configuration of FIG. 31;

FIG. 35 is the side elevation view of FIG. 17, but with the aerodynamic drag reducing apparatus illustrated in the stowed configuration of FIG. 31;

FIG. 36 is the side elevation view of FIG. 18, but with the aerodynamic drag reducing apparatus illustrated in the stowed configuration of FIG. 31;

FIG. 37 is a perspective view of a second example embodiment of a drag reducing apparatus adapted for use with the vehicle of FIG. 1, illustrated in a deployed configuration, according to the principles of the present disclosure;

FIG. 38 is a partial bottom plan view of the drag reducing apparatus of FIG. 37;

FIG. 39 is a perspective view of the drag reducing apparatus of FIG. 37, illustrated in a transitional configuration;

FIG. 40 is an enlarged portion of FIG. 39;

FIG. 41 is an enlarged portion of FIG. 39;

FIG. 42 is the perspective view of FIG. 37, but with the drag reducing apparatus illustrated in a transitional configuration that is farther from the deployed configuration of FIG. 37 than the transitional configuration of FIG. 39;

FIG. 43 is the partial bottom plan view of FIG. 38, but with the drag reducing apparatus illustrated in the transitional configuration of FIG. 42;

FIG. 44 is the perspective view of FIG. 37, but with the drag reducing apparatus illustrated in a stowed configuration;

FIG. 45 is the bottom plan view of FIG. 38, but with the drag reducing apparatus illustrated in the stowed configuration of FIG. 44;

FIG. 46 is the perspective view of FIG. 44, but with a handle of an actuator of the drag reducing apparatus folded up;

FIG. 47 is the bottom plan view of FIG. 45, but with the handle of the actuator of FIG. 46 folded up;

FIG. 48 is a perspective view of a third example embodiment of a drag reducing apparatus adapted for use with the vehicle of FIG. 1, illustrated in a deployed configuration with a side panel shown in phantom outline, according to the principles of the present disclosure;

FIG. 49 is an enlarged portion of FIG. 48;

FIG. 50 is an enlarged portion of FIG. 48;

FIG. 51 is a partial cross-sectional bottom plan view of the drag reducing apparatus of FIG. 48, illustrated in a transitional configuration with a bottom panel and a side-bottom connecting panel shown in phantom outline;

FIG. 52 is the enlarged view of FIG. 50, but with a handle of an actuator of the drag reducing apparatus unhooked from a hook;

FIG. 53 is the enlarged view of FIG. 52, but with the handle of the actuator of FIG. 52 rotated thereby releasing a torsional deploying load of the actuator;

FIG. 54 is the perspective view of FIG. 48, but with the drag reducing apparatus illustrated in a transitional configuration with the handle of the actuator of FIG. 52 further rotated;

FIG. 55 is an enlarged portion of FIG. 54;

FIG. 56 is an enlarged portion of FIG. 54;

FIG. 57 is the perspective view of FIG. 48, but with the drag reducing apparatus illustrated in a stowed configuration and the handle of the actuator of FIG. 52 further rotated;

FIG. 58 is an enlarged portion of FIG. 57;

FIG. 59 is the enlarged portion of FIG. 58, but with the handle of the actuator of FIG. 52 further rotated thereby applying a torsional stowing load of the actuator;

FIG. 60 is a perspective view of the drag reducing apparatus of FIG. 48 illustrated in the stowed configuration;

FIG. 61 is an enlarged portion of FIG. 60 illustrating the handle of the actuator of FIG. 52 hooked within another hook;

FIG. 62 is the enlarged portion of FIG. 59, but with the handle of the actuator of FIG. 52 hooked in the hook of FIG. 61;

FIG. 65 is the perspective view of FIG. 63, but with the drag reducing apparatus illustrated in a transitional configuration;

FIG. 66 is the perspective view of FIG. 64, but with the drag reducing apparatus illustrated in the transitional configuration of FIG. 65;

FIG. 67 is the perspective view of FIG. 63, but with the drag reducing apparatus illustrated in a stowed configuration;

FIG. 68 is the perspective view of FIG. 64, but with the drag reducing apparatus illustrated in the stowed configuration of FIG. 67;

FIG. 71 is a perspective view of a fifth example embodiment of a drag reducing apparatus adapted for use with the vehicle of FIG. 1, illustrated in a stowed configuration, according to the principles of the present disclosure;

FIG. 72 is an enlarged portion of FIG. 71;

FIG. 73 is an enlarged portion of FIG. 71;

FIG. 74 is the perspective view of FIG. 71, but with the door of the vehicle shown in phantom outline;

FIG. 75 is an enlarged portion of FIG. 74;

FIG. 76 is an enlarged portion of FIG. 74;

FIG. 77 is the perspective view of FIG. 74, but with a latch system of the drag reducing apparatus released and a bumping actuator of the drag reducing apparatus activated;

FIG. 78 is an enlarged portion of FIG. 77;

FIG. 79 is an enlarged portion of FIG. 77;

FIG. 80 is a perspective view of the drag reducing apparatus of FIG. 71 illustrated in a deployed configuration;

FIG. 81 is an enlarged portion of FIG. 80;

FIG. 82 is an enlarged portion of FIG. 80;

FIG. 83 is an enlarged portion of FIG. 80;

FIG. 84 is the perspective view of FIG. 80, but with a cutaway taken through a center-line of an actuator shaft and a center-line of an actuator handle;

FIG. 85 is an enlarged portion of FIG. 84;

FIG. 86 is an enlarged portion of FIG. 84;

FIG. 91 is a perspective view of a sixth example embodiment of a drag reducing apparatus adapted for use with the vehicle of FIG. 1, illustrated in a deployed configuration, according to the principles of the present disclosure;

FIG. 92 is another perspective view of the drag reducing apparatus of FIG. 91, illustrated in the deployed configuration;

FIG. 93 is the perspective view of FIG. 91, but with the drag reducing apparatus illustrated in a transitional configuration;

FIG. 94 is the perspective view of FIG. 92, but with the drag reducing apparatus illustrated in the transitional configuration of FIG. 93;

FIG. 95 is the perspective view of FIG. 93, but with the drag reducing apparatus illustrated in a transitional configuration that is farther from the deployed configuration of FIG. 91 than the transitional configuration of FIG. 93;

FIG. 96 is the perspective view of FIG. 94, but with the drag reducing apparatus illustrated in the transitional configuration of FIG. 95;

FIG. 97 is a perspective view of a seventh example embodiment of a drag reducing apparatus adapted for use with the vehicle of FIG. 1, illustrated in a deployed configuration, according to the principles of the present disclosure;

FIG. 98 is another perspective view of the drag reducing apparatus of FIG. 97, illustrated in the deployed configuration;

FIG. 99 is still another perspective view of the drag reducing apparatus of FIG. 97, illustrated in the deployed configuration with a top panel of the drag reducing apparatus shown in phantom outline;

FIG. 100 is an enlarged portion of FIG. 99;

FIG. 101 is an enlarged portion of FIG. 99;

FIG. 102 is a perspective view of the drag reducing apparatus of FIG. 97, illustrated in a transitional configuration;

FIG. 103 is an enlarged portion of FIG. 102;

FIG. 104 is an enlarged portion of FIG. 102;

FIG. 105 is a perspective view of the drag reducing apparatus of FIG. 97, illustrated in a transitional configuration that is farther from the deployed configuration of FIG. 97 than the transitional configuration of FIG. 102;

FIG. 106 is an enlarged portion of FIG. 105;

FIG. 107 is an enlarged portion of FIG. 105;

FIG. 108 is a perspective view of the drag reducing apparatus of FIG. 97, illustrated in a transitional configuration that is still farther from the deployed configuration of FIG. 97 than the transitional configuration of FIG. 105;

FIG. 109 is an enlarged portion of FIG. 108;

FIG. 110 is a cross-sectional bottom plan view of the drag reducing apparatus of FIG. 97, illustrated in a stowed configuration;

FIG. 111 is a perspective view of the drag reducing apparatus of FIG. 97, illustrated in the stowed configuration with a cutaway taken through the drag reducing apparatus;

FIG. 113 is a partial perspective view of the drag reducing apparatus of FIG. 112 and a portion of the vehicle of FIG.

Figure 112:
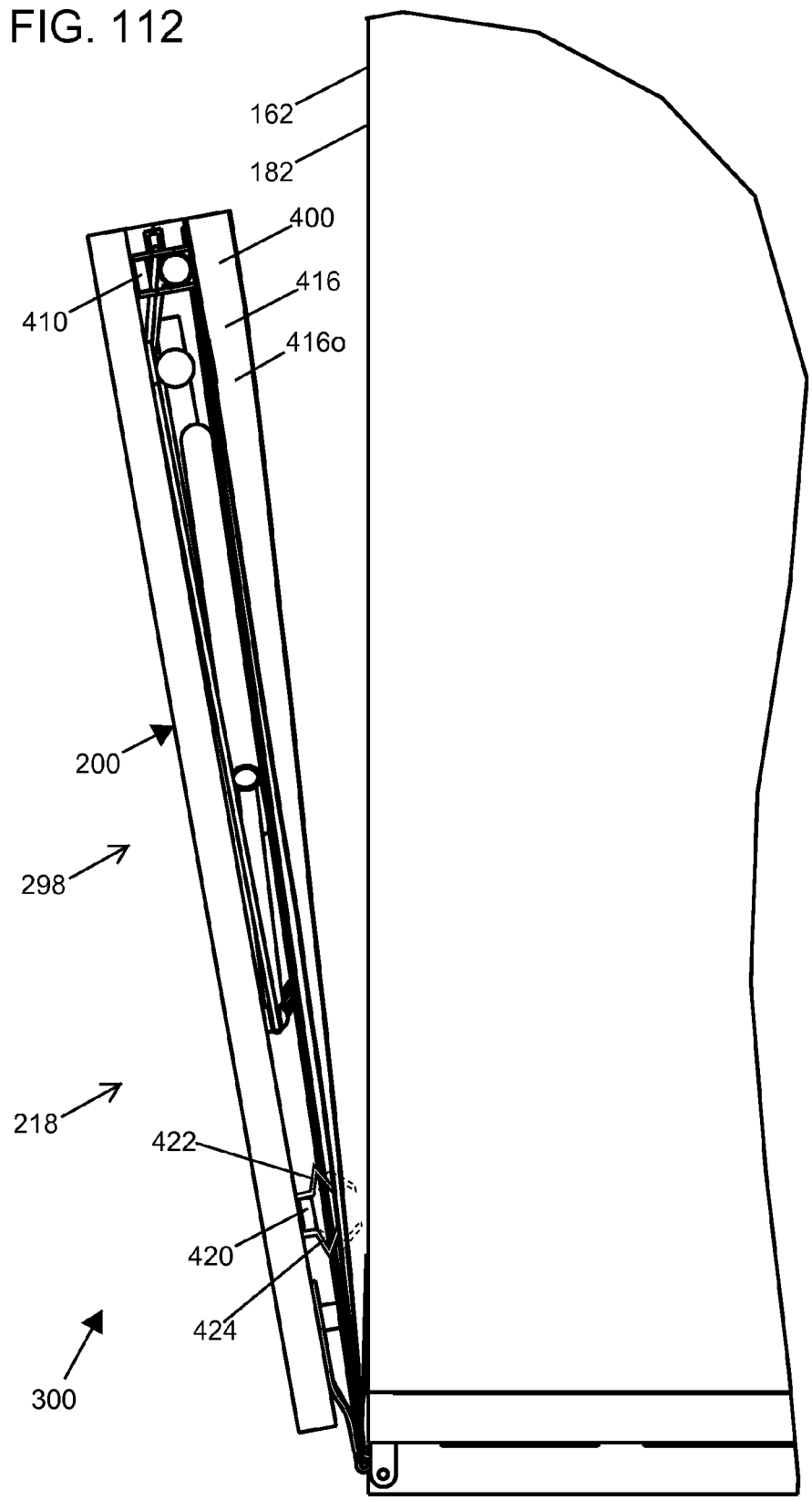
FIG. 112 is a partial top plan view of a drag reducing apparatus and a portion of the vehicle of FIG. 1, illustrated with the door of the vehicle open and positioned against a side of the vehicle and with the drag reducing apparatus in a stowed and deformed configuration, according to the principles of the present disclosure.
Figures 121, 122:
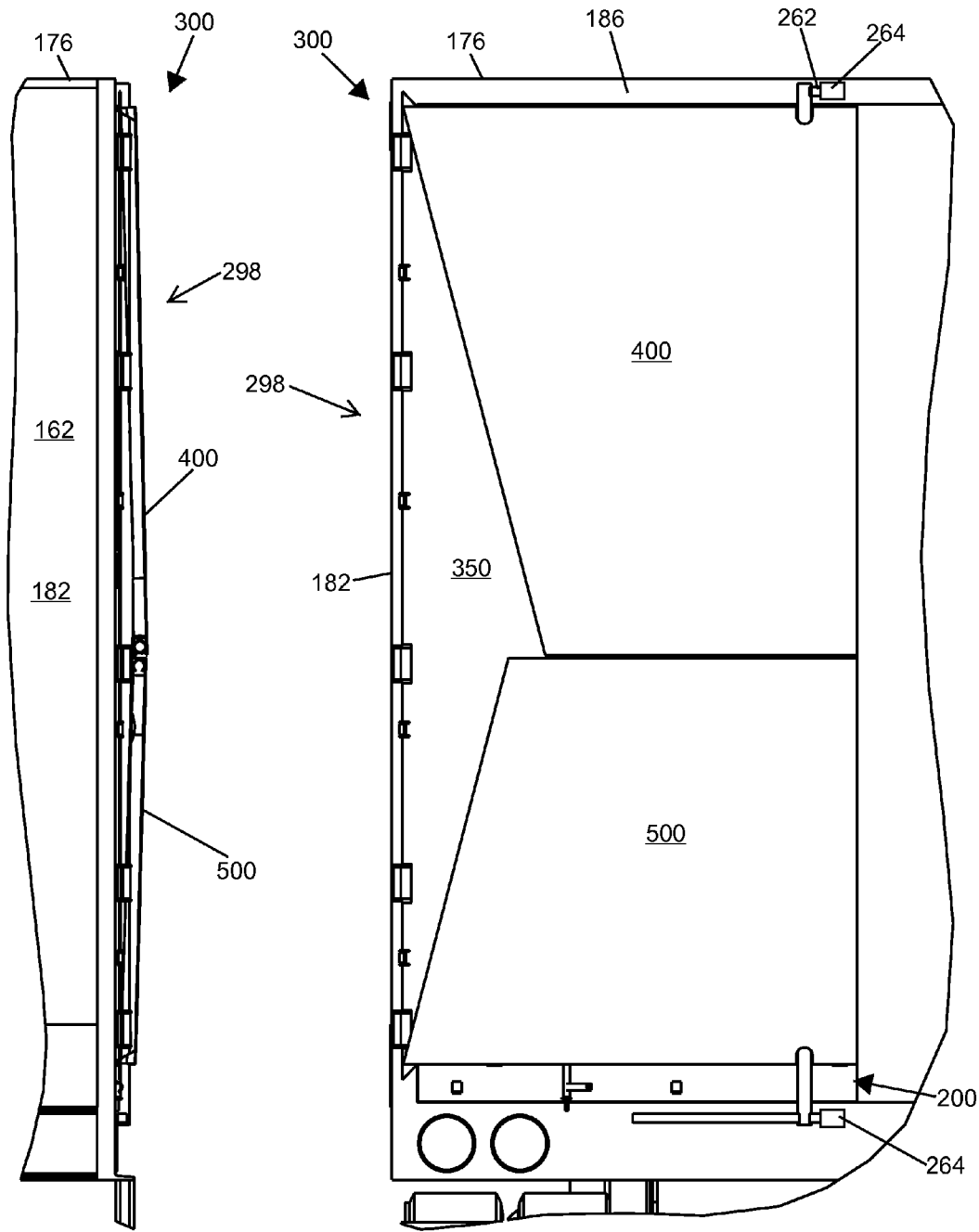
Figure 127:
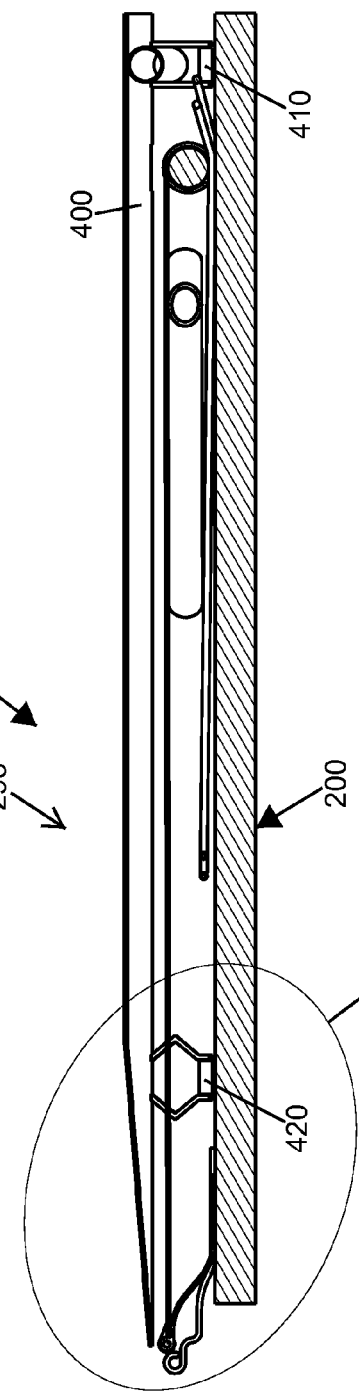
Figure 128:
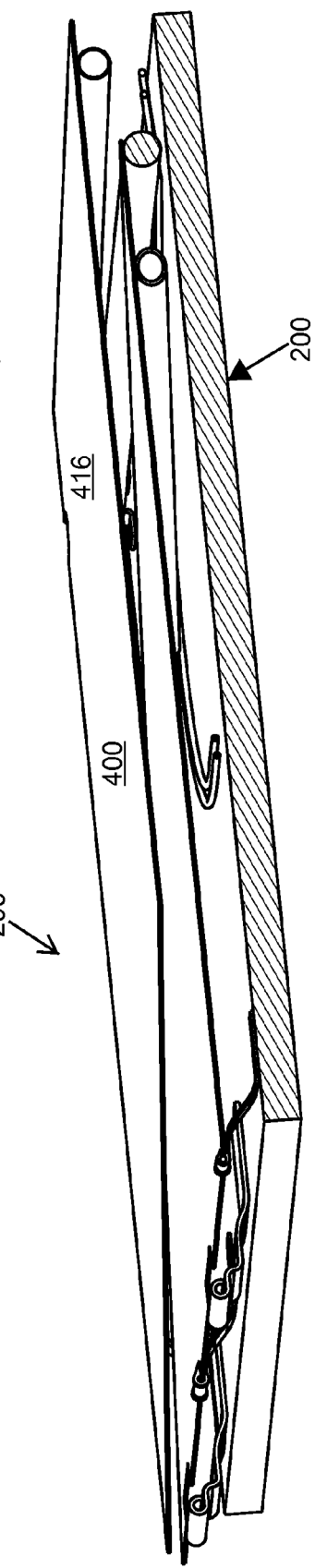
Figure 131:
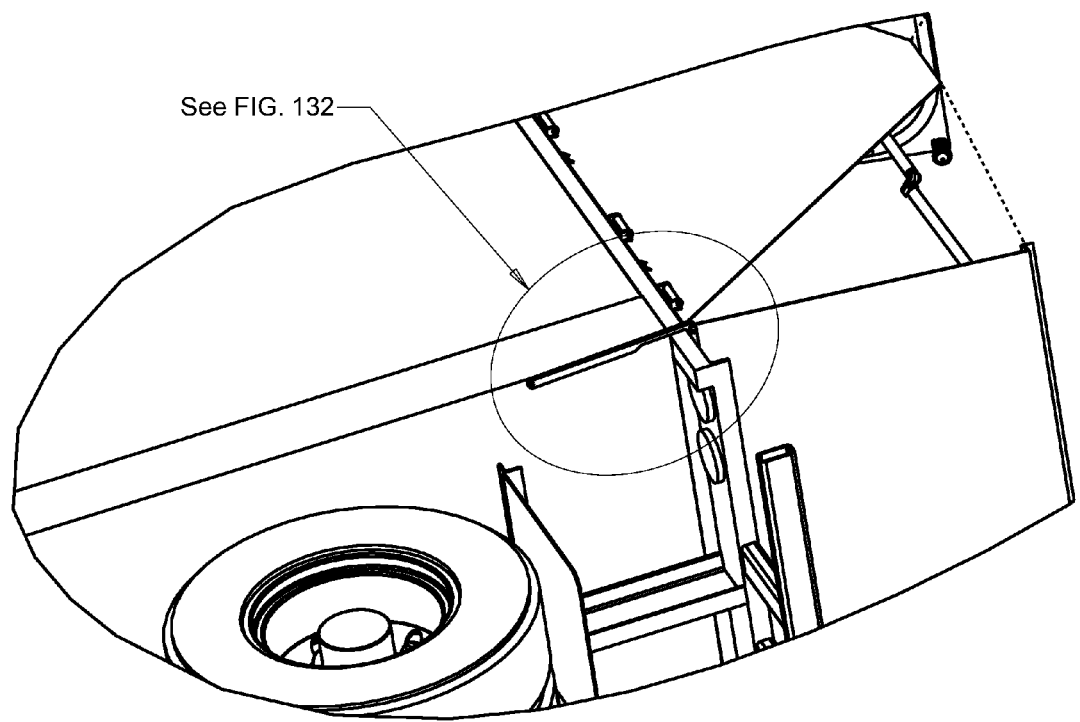
Figure 132:
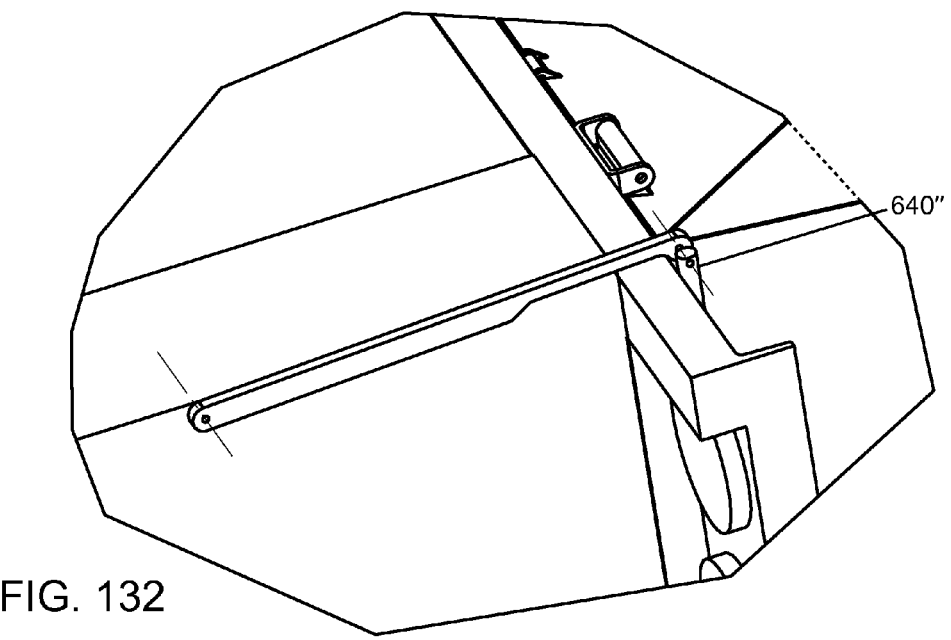
Figure 133:
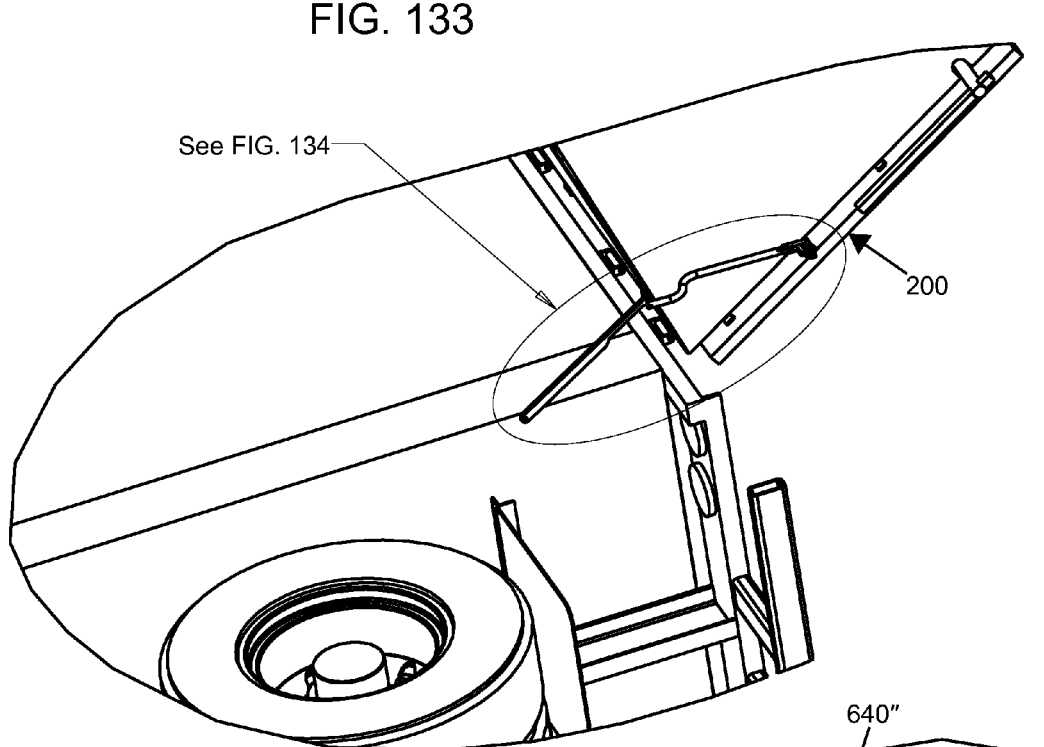
Figure 134:
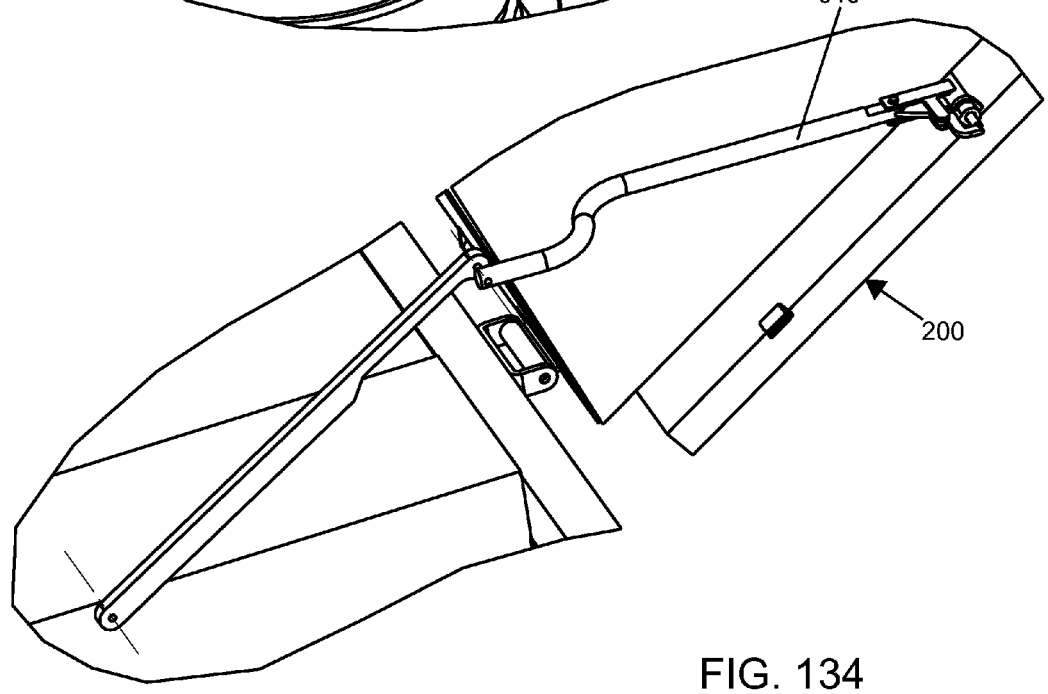
Figure 135:
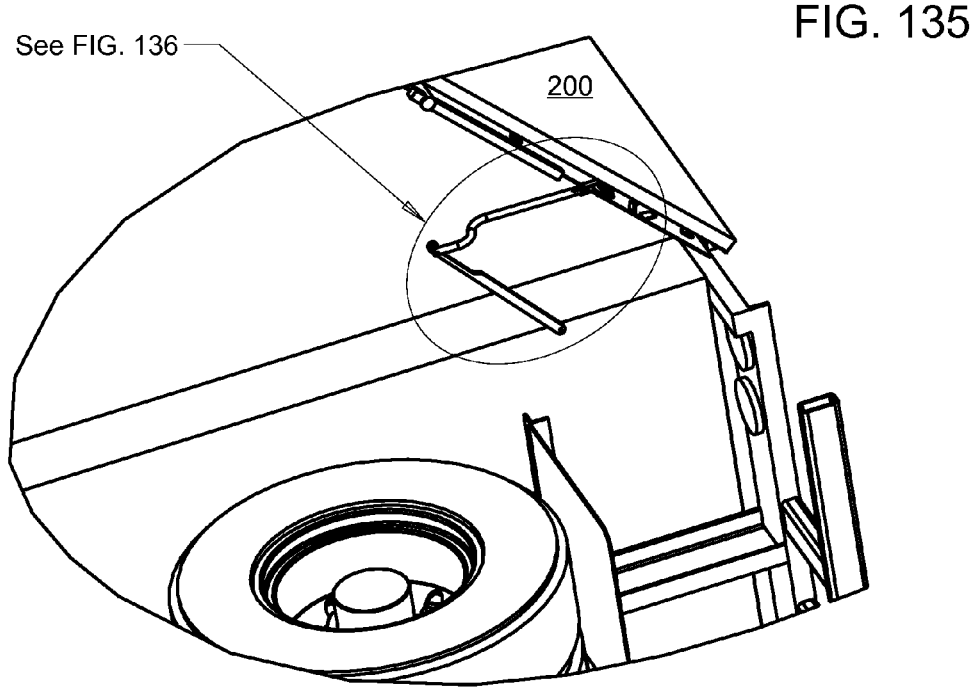
Figure 136:
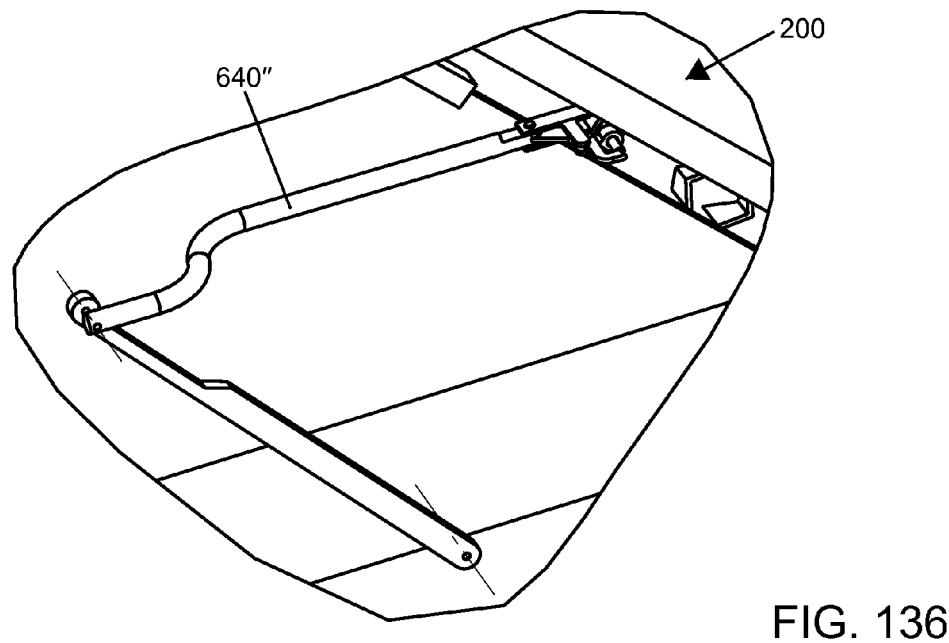
Figure 137:
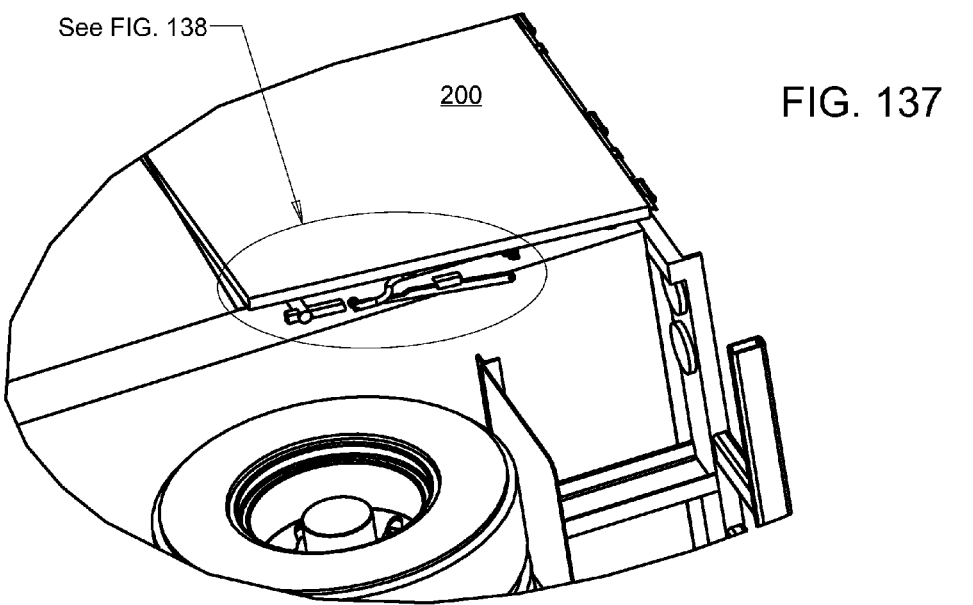
Figure 138:
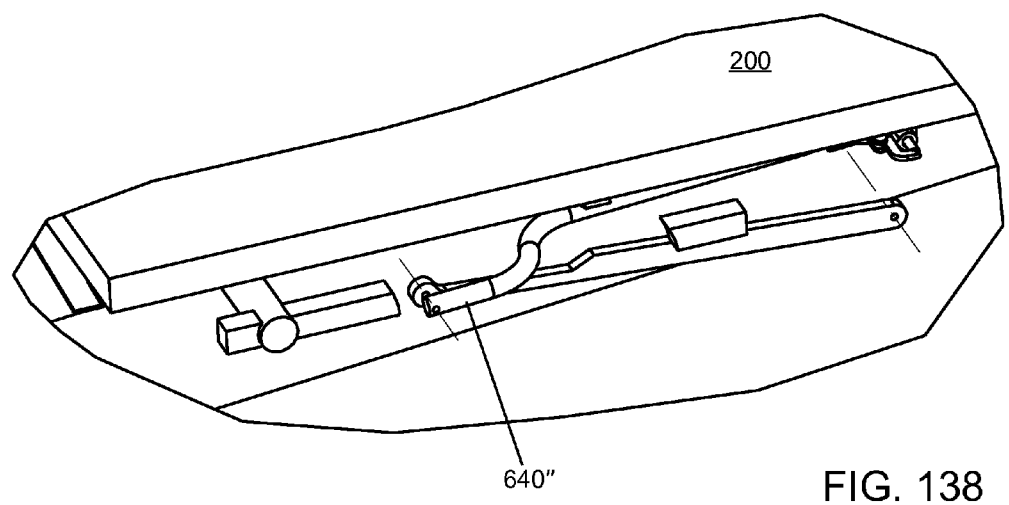

1, illustrated with the door of the vehicle open and positioned against the side of the vehicle and with the drag reducing apparatus in the stowed and deformed configuration of FIG. 112;

FIG. 114 is an enlarged portion of FIG. 113;

FIG. 115 is a partial perspective view of a side panel and a top panel of a drag reducing apparatus that are both illustrated hingedly mounted to the door in a deployed configuration with the door closed against a door frame of the vehicle of FIG. 1, according to the principles of the present disclosure;

FIG. 116 is an enlarged portion of FIG. 115;

FIG. 117 is an enlarged portion of FIG. 115;

FIG. 118 is a partial perspective view of the side panel and the top panel of FIG. 115, illustrated in a transitional configuration with the door illustrated closed against the door frame of FIG. 115;

FIG. 119 is an enlarged portion of FIG. 118;

FIG. 120 is a partial bottom cross-sectional plan view of the side panel, the top panel, the door, and the vehicle of FIG. 115, the side panel and the top panel illustrated in a stowed configuration;

FIG. 121 is a partial rear elevation view of the vehicle of FIG. 1 with an example drag reducing apparatus mounted on a rear end of the vehicle and illustrated in a stowed configuration and with the door illustrated in a closed configuration, according to the principles of the present disclosure;

FIG. 122 is a left side elevation view of the vehicle of FIG. 121 with the drag reducing apparatus illustrated in the stowed configuration and with the door illustrated in the closed configuration;

FIG. 123 is a partial perspective view of the drag reducing apparatus and the vehicle of FIG. 121 with a cutaway taken thereby revealing contact between a top panel and a side of the vehicle with the door of the vehicle in an open position against the side of the vehicle and with the drag reducing apparatus in a stowed and deformed configuration;

FIG. 124 is a partial bottom cross-sectional plan view of the vehicle and the drag reducing apparatus of FIG. 121 illustrated with the door of the vehicle in the open position against the side of the vehicle thereby deforming a deformable hinge that mounts the top panel of FIG. 123;

FIG. 125 is a bottom cross-sectional plan view of an upper panel and a side panel mounted to the door of the vehicle of FIG. 1, according to the principles of the present disclosure;

FIG. 126 is a perspective view of the door, the upper panel, and the side panel of FIG. 125 with a cutaway taken;

FIG. 127 is the bottom cross-sectional plan view of FIG. 125, but with a spring-mounted hinge that mounts the side panel to the door illustrated in an unsprung position;

FIG. 128 is the perspective view of FIG. 126, but with the spring-mounted hinge of FIG. 127 illustrated in the unsprung position of FIG. 127;

FIG. 129 is an enlarged portion of FIG. 125;

FIG. 130 is an enlarged portion of FIG. 127;

FIG. 131 is a partial perspective view of an example drag reducing apparatus mounted on a left door of the rear end of the vehicle of FIG. 1 with a linkage arrangement adapted to stow the drag reducing apparatus as the left door of the vehicle is opened and further adapted to deploy the drag reducing apparatus as the left door of the vehicle is closed, the door illustrated in a closed configuration and the drag reducing apparatus thereby illustrated in a deployed configuration, according to the principles of the present disclosure;

FIG. 132 is an enlarged portion of FIG. 131;

FIG. 133 is the perspective view of FIG. 131, but with the door illustrated in a first open configuration and with the linkage arrangement configured to start stowing the drag reducing apparatus if the door is being opened or having finished deploying the drag reducing apparatus if the door is being closed;

FIG. 134 is an enlarged portion of FIG. 133;

FIG. 135 is the perspective view of FIG. 131, but with the door illustrated in a second open configuration and with the linkage arrangement configured to start deploying the drag reducing apparatus if the door is being closed or having finished stowing the drag reducing apparatus if the door is being opened;

FIG. 136 is an enlarged portion of FIG. 135;

FIG. 137 is the perspective view of FIG. 131, but with the door illustrated in a third wide-open configuration and the drag reducing apparatus thereby illustrated in a stowed configuration, a handle of a look rod of the door being cut-away for illustration; and FIG. 138 is an enlarged portion of FIG. 137.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

This application relates to U.S. Provisional Patent Application Ser. No. 60/741,155, filed on 1 Dec. 2005, and to U.S. Pat. Nos. 7,374,230; 7,618,086; 7,850,224; 8,272,680; and 8,480,162, which are all hereby incorporated by reference in their entireties.

The present disclosure generally relates to rear mounted aerodynamic devices for use with vehicles. In certain embodiments, the vehicles have a generally vertical rear end. The generally vertical rear end typically results in airflow separation and thereby produces aerodynamic drag especially when the vehicle is traveling at highway speeds. In certain embodiments, the vehicle may include a powertrain, an operator cab, and/or other features generally associated with van-type trucks. In other embodiments, the vehicle may be a bus, a passenger van, a cargo van, a motorhome, etc. In still other embodiments, the vehicle may be a trailer that is towed behind a tractor. In still other embodiments, the vehicle may be a fifth wheel trailer towed behind a truck. In certain embodiments, the vehicle may include rear opening doors. In certain embodiments, the rear opening doors may access a cargo holding area of the vehicle. In certain embodiments, the vehicle may have a generally rectangular cross-section perpendicular to a longitudinal axis A1 of the vehicle (see FIG. 5).

Turning now to FIGS. 1-12, an example vehicle 150 is illustrated with an example aerodynamic arrangement 280. As depicted, the vehicle 150 extends from a front end 152 to a rear end 154. As depicted, the aerodynamic arrangement 280 is mounted to the rear end 154 of the vehicle 150. The vehicle 150 further extends between a top 156 and a bottom 158. The vehicle 150 further extends between a right side 160 and a left side 162. As depicted, the vehicle 150 includes a set of wheels 164. The wheels 164 generally are positioned at the bottom 158 of the vehicle 150. The vehicle 150 includes a frame 166 that generally extends between the front end 152 and the rear end 154 and attaches to the wheels 164 via a suspension system 168. As depicted, the vehicle 150 includes a body 170. The body 170 is generally supported by the frame 166. The body 170 extends between a front end 172 and a rear end 174. As depicted, the front end 172 is generally coincident with the front end 152 of the vehicle 150, and the rear end 174 is generally coincident with the rear end 154 of the vehicle 150. The body 170 further extends between a top 176 and a bottom 178. As depicted, the top 176 is generally coincident with the top 156 of the vehicle 150, and the bottom 178 is generally adjacent the frame 166. The body 170 further extends between a right side 180 and a left side 182. As depicted, the right side 180 is generally coincident with the right side 160 of the vehicle 150, and the left side 182 is generally coincident with the left side 162 of the vehicle 150. An interior 171 of the body 170 defines a cargo hold 184. In the depicted embodiment, the cargo hold 184 is accessed via an opening 188 positioned at the rear end 174 of the body 170. A doorframe 186 generally surrounds the opening 188.

As depicted, the front end 172 and the rear end 174 are generally orthogonal to the top 176 and the bottom 178. The front end 172 and the rear end 174 are also generally orthogonal to the right side 180 and the left side 182. The top 176 and the bottom 178 are generally orthogonal to the right side 180 and the left side 182. The body 170 is generally extended in a longitudinal direction 189 that runs between the front end 172 and the rear end 174 parallel to the longitudinal axis A1 of the vehicle 150. Relative airflow generally flows along the longitudinal direction 189 from the front end 172 to the rear end 174 when the vehicle 150 is traveling.

Figure 12:
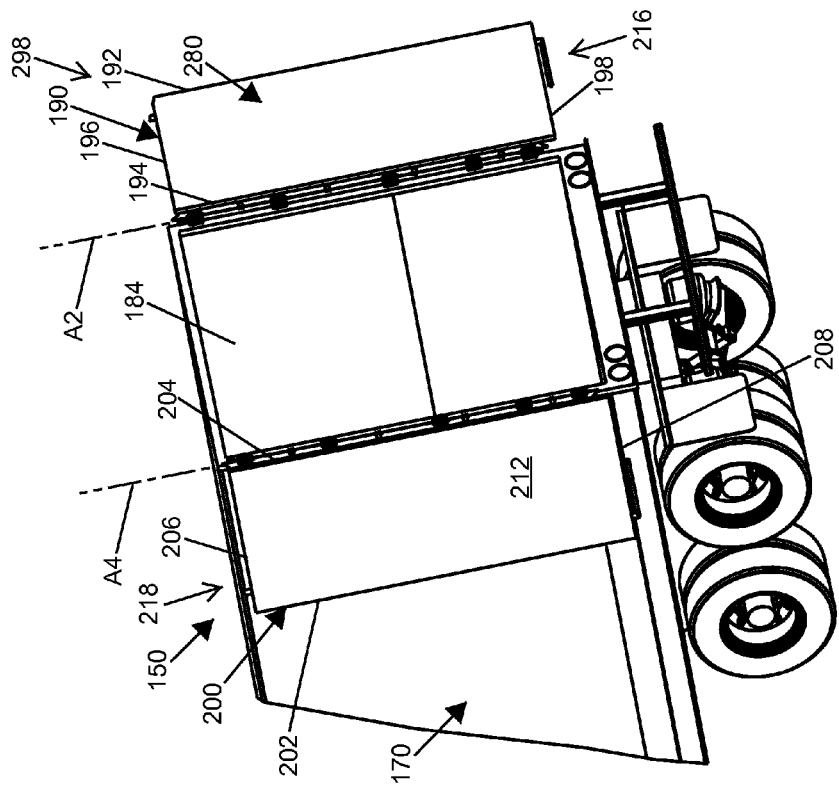
FIG. 12 is the partial perspective view of FIG. 4, but with the aerodynamic drag reducing apparatus illustrated in the stowed configuration and the doors of the vehicle open.
Figure 11:
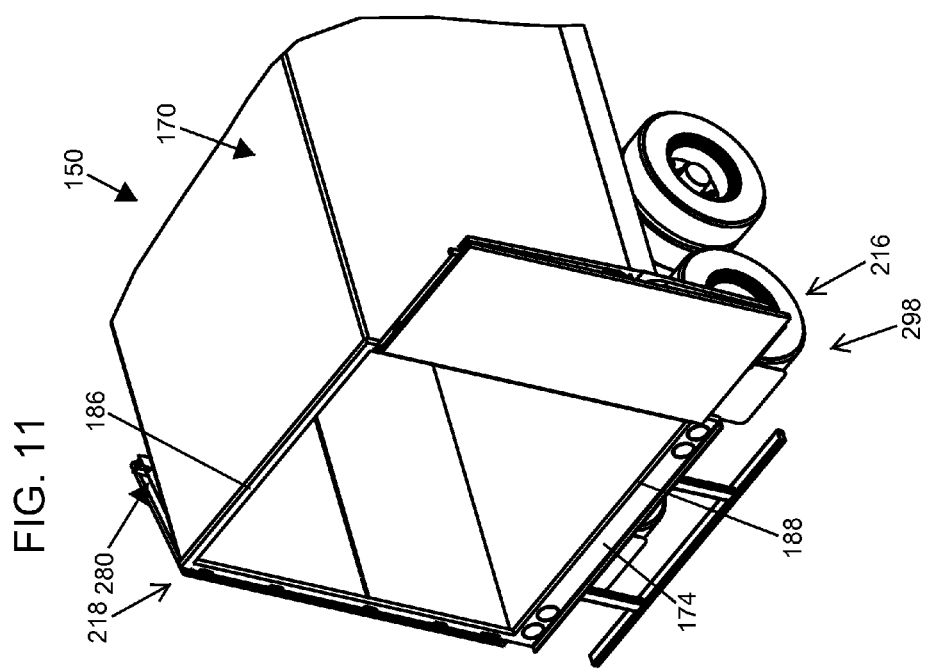
FIG. 11 is an enlarged portion of FIG. 9.
Figure 22:
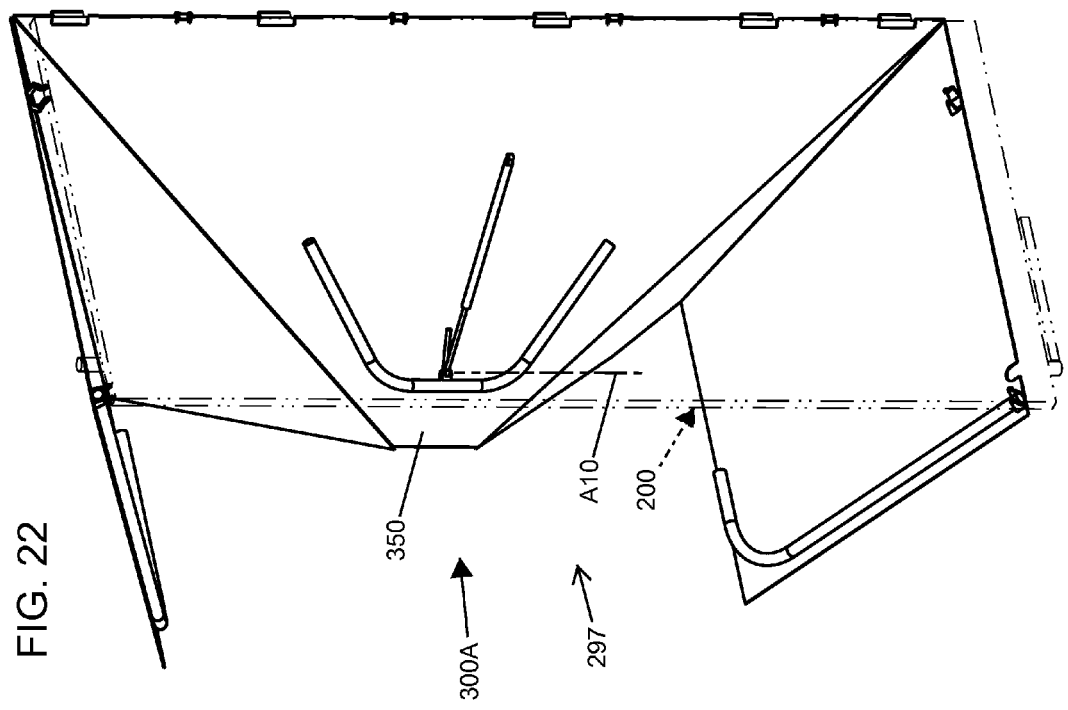
FIG. 22 is the perspective view of FIG. 16, but with the drag reducing apparatus illustrated in the transitional configuration of FIG. 19.
Figure 21:
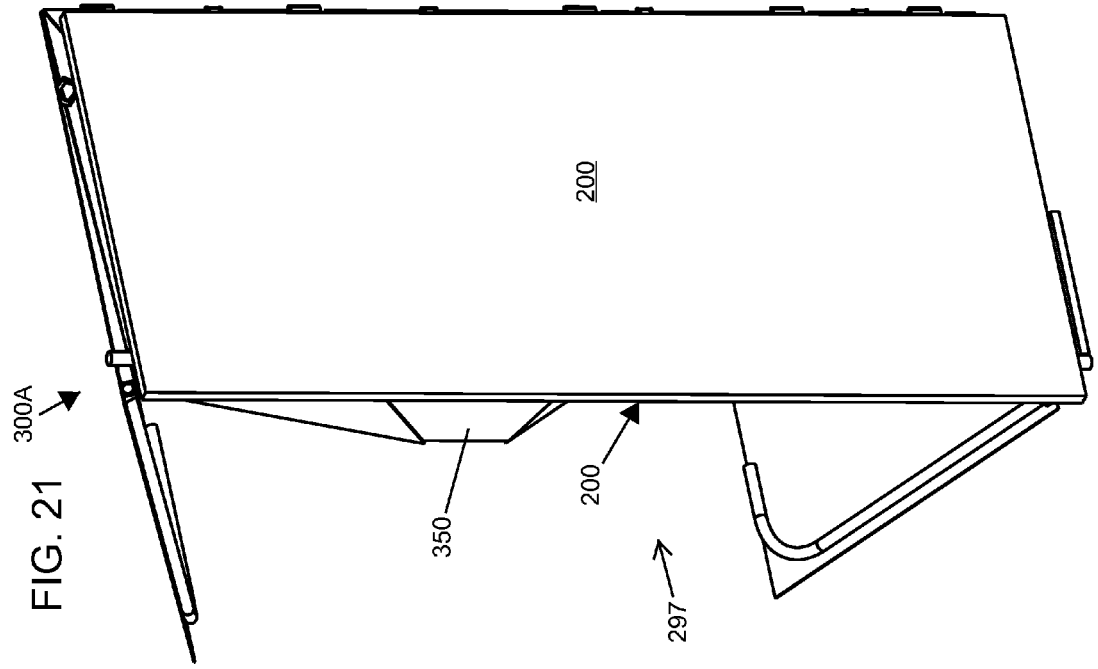
FIG. 21 is the perspective view of FIG. 15, but with the drag reducing apparatus illustrated in the transitional configuration of FIG. 19.

In the depicted embodiment, the aerodynamic arrangement 280 is mounted at the rear end 174 of the body 170. In particular, as depicted, a right door 190 and a left door 200 are positioned at the rear end 174 of the body 170. As depicted, the right door 190 and the left door 200 are positioned within the doorframe 186. When closed, the right door 190 and the left door 200 substantially fill the opening 188 (see FIGS. 1-8). When opened, the right door 190 and/or the left door 200 provide access to the cargo hold 184 of the body 170 through the opening 188. When both the right door 190 and the left door 200 are open, the opening 188 is substantially fully open and substantially defines the rear end 174 of the body 170 (see FIGS. 9-12). As illustrated at FIGS. 11 and 12, the wide-open left door 200 is positioned substantially adjacent the left side 182 of the body 170, and the open right door 190 is illustrated positioned substantially perpendicular to the right side 180 of the vehicle 150. Both the right door 190 and the left door 200 may swing between a closed configuration 214 (see FIGS. 1-8) and a wide-open configuration 218 adjacent their respective sides 180, 182 of the body 170. With the doors 190, 200 in the wide-open configuration 218, the vehicle 150 may be parked at a loading dock relatively close to other vehicles along the sides 160, 162 with the doors 190, 200 wide-opened and occupying a relatively small space near the sides 180, 182 of the body 170 compared with an open configuration 216 (see FIGS. 9-12).

The right door 190 extends from an inboard edge 192 to an outboard edge 194. The right door 190 further extends between a top 196 and a bottom 198. As depicted, the left door 200 similarly extends between an inboard edge 202 and an outboard edge 204. The left door 200 also further extends between a top edge 206 and a bottom edge 208. As depicted, the right door 190 and the left door 200 are substantially mirror images of each other. In other embodiments, substantial differences may exist between the right door 190 and the left door 200. In still other embodiments, a single door may be used instead of a right door 190 and a left door 200. In yet other embodiments, a rollup door may be used instead of the right door 190 and the left door 200. In the embodiments depicted in the present disclosure, the left door 200 will be illustrated with the understanding that, unless otherwise indicated, the same or similar features may generally apply to the right door 190.

As illustrated at FIGS. 1-4, the aerodynamic arrangement 280 may be configured in a deployed configuration 296 (e.g., an extended configuration). The aerodynamic arrangement 280 may also be configured in a retracted configuration 298 (e.g., a stowed configuration), as illustrated at FIGS. 5-12. As further described and illustrated hereinafter, the aerodynamic arrangement 280 may be positioned in a transitioning configuration 297. The transitioning configuration 297 may be any of a series of configurations that the aerodynamic arrangement 280 passes through as it is moved between the deployed configuration 296 and the retracted configuration 298. When in the deployed configuration 296, the aerodynamic arrangement 280 generally defines a top 282. As depicted at FIG. 3, the top 282 defines an angle δ with respect to the top 176 of the body 170. The angle δ is typically selected to reduce aerodynamic drag of the vehicle 150. In certain embodiments, the aerodynamic arrangement 280 generally defines a bottom 284 when in the deployed configuration 296. In certain embodiments, the bottom 284 may define an angle ε with respect to the bottom 178 of the body 170 (see FIG. 18). The angle ε may also be selected to reduce aerodynamic drag of the vehicle 150. As illustrated, the bottom 284 is shown as a solid bottom. In other embodiments, the bottom 284 may be non-solid and/or include substantial openings. In other embodiments, the bottom 284 may be omitted. As depicted, the aerodynamic arrangement 280 defines a right side 286 and a left side 288 when in the deployed configuration 296. In certain embodiments, the sides 286, 288 may each define an angle φ with respect to the sides 180, 182 of the body 170, respectively (see FIGS. 3 and 4). The angle φ may also be selected to reduce aerodynamic drag of the vehicle 150.

With the aerodynamic arrangement 280 in the deployed configuration 296, a cavity 290 may be formed between the top 282, the bottom 284, the right side 286, and the left side 288 (see FIG. 3). As depicted, the cavity 290 may be open toward a rearward direction. In other embodiments, the cavity 290 may be substantially enclosed. As depicted, the aerodynamic arrangement 280 includes a mounted end 292 and an extendable end 294. The mounted end 292 is generally attached to the rear end 154 of the vehicle 150 and/or the rear end 174 of the body 170. As depicted, the mounted end 292 is attached to the right and left doors 190, 200 and moves with the doors 190, 200. When in the retracted configuration 298, the extendable end 294 is relatively close to the rear end 154 of the vehicle 150 and/or the rear end 174 of the body 170 (e.g., when the doors 190, 200 are in the closed configuration 214). When the aerodynamic arrangement 280 is in the deployed configuration 296, the extended end 294 extends away from the rear end 154 of the vehicle 150 and/or the rear end 174 of the body 170 (e.g., when the doors 190, 200 are in the closed configuration 214).

As depicted, the aerodynamic arrangement 280 includes a pair of aerodynamic assemblies 300. In other embodiments, the aerodynamic arrangement 280 may include a single aerodynamic assembly 300. In still other embodiments, the aerodynamic arrangement 280 may include more than two aerodynamic assemblies. In certain embodiments, the aerodynamic assemblies 300 may be positioned at the deployed configuration 296, the transitioning configuration 297, and/or the retracted configuration 298 independently from each other.

Turning now to FIG. 4, the aerodynamic arrangement 280 is shown with a right aerodynamic assembly 300R and a left aerodynamic assembly 300L. The right and left aerodynamic assemblies 300R and 300L form a pair of opposite aerodynamic assemblies 300. As depicted, the aerodynamic assemblies 300R and 300L are generally mirror images of each other. Hereinafter, the left aerodynamic assembly 300, 300L will be described in detail. It will be appreciated that the right aerodynamic assembly 300, 300R may be generally symmetric with the left aerodynamic assembly 300L. Features described and/or illustrated with respect to the left aerodynamic assembly 300L thereby also may apply to the right aerodynamic assembly 300R, unless otherwise indicated.

Turning now to FIG. 12, a hinge axis A2 may be defined between the right door 190 and the body 170. Likewise, a hinge axis A4 may be defined between the left door 200 and the body 170. As illustrated at FIG. 114, a door hinge 220 may define the axis A2, A4. In certain embodiments, a plurality of the door hinges 220 may define the axis A2, A4. The door hinge 220 typically includes a base portion 222 that is mounted to the body 170 of the vehicle 150. As depicted, the base portion 222 is mounted to the doorframe 186. The door hinge 220 may further include a swing portion 224. The swing portion 224 is typically mounted to a respective one of the doors 190, 200. The door hinge 220 may further include a pivot joint 226 that is defined between and connects the base portion 222 with the swing portion 224. A hinge pin (not shown) may be included in the pivot joint 226. Although the door hinge 220 is illustrated as a simple hinge, other hinges may likewise be used. The various hinges that may be used include barrel hinges, pivot hinges, double-acting hinges, case hinges, continuous hinges (i.e., piano hinges), concealed hinges, butterfly hinges, articulating hinges, etc.

Figure 34:
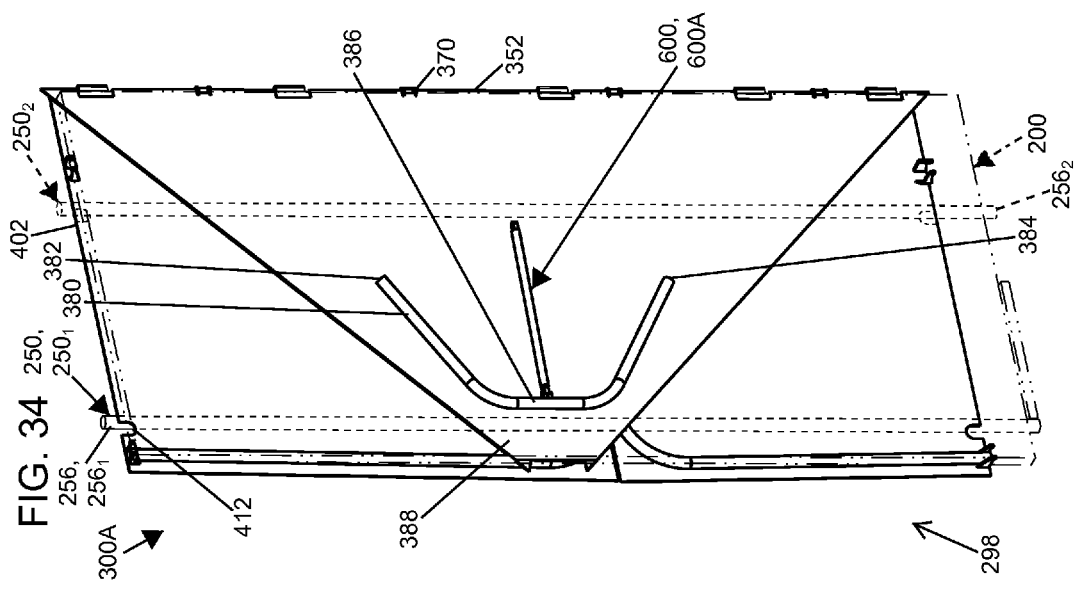
FIG. 34 is the perspective view of FIG. 16, but with the aerodynamic drag reducing apparatus illustrated in the stowed configuration of FIG. 31 and with the door of the vehicle including a second lock rod.
Figure 33:
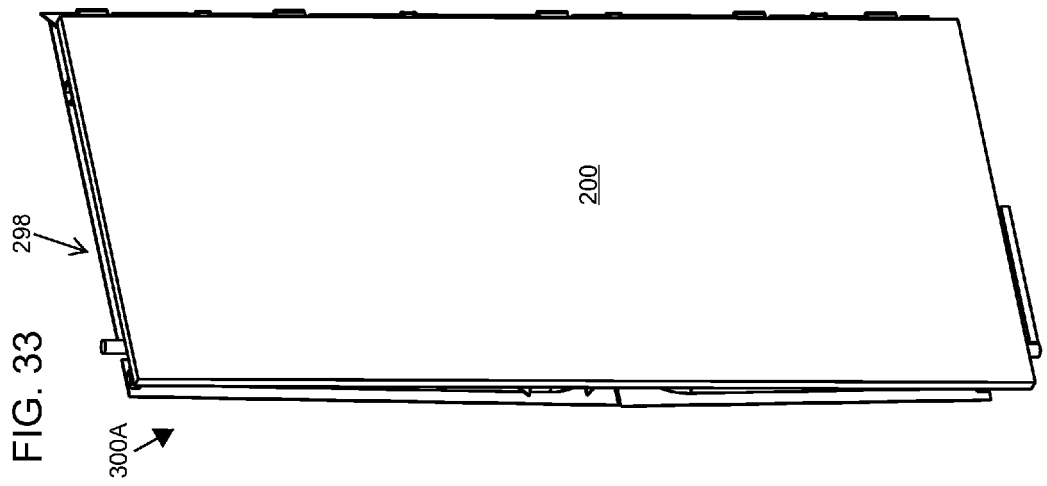
FIG. 33 is the perspective view of FIG. 15, but with the aerodynamic drag reducing apparatus illustrated in the stowed configuration of FIG. 31.
Figure 64:
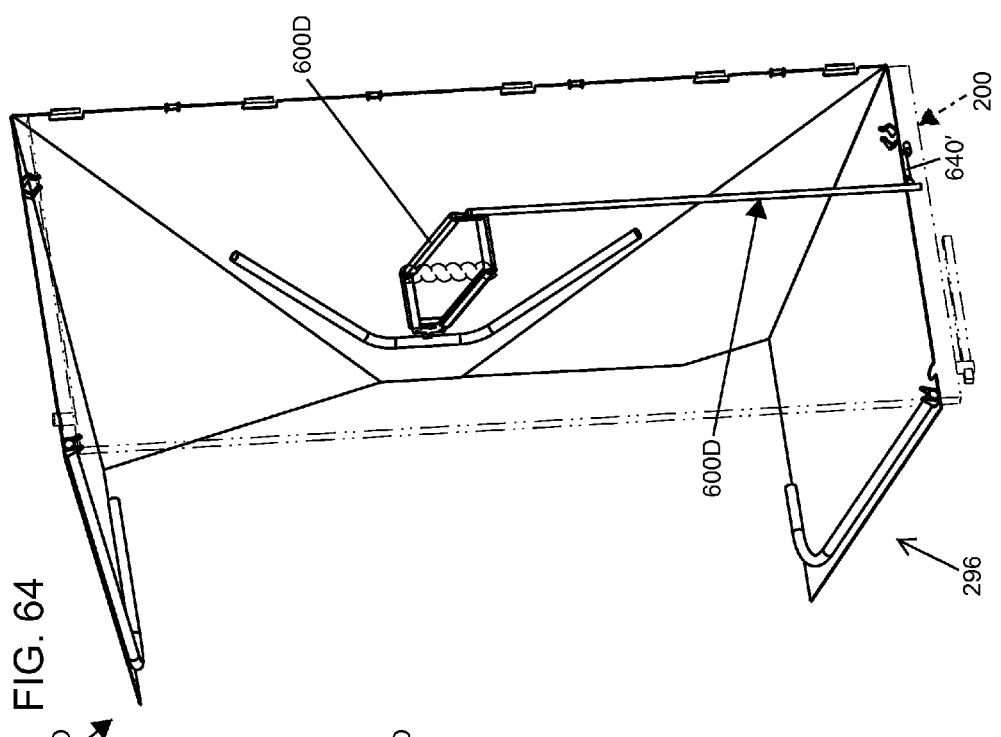
FIG. 64 is another perspective view of the drag reducing apparatus of FIG. 63, illustrated in the deployed configuration with the door of the vehicle shown in phantom outline.
Figure 63:
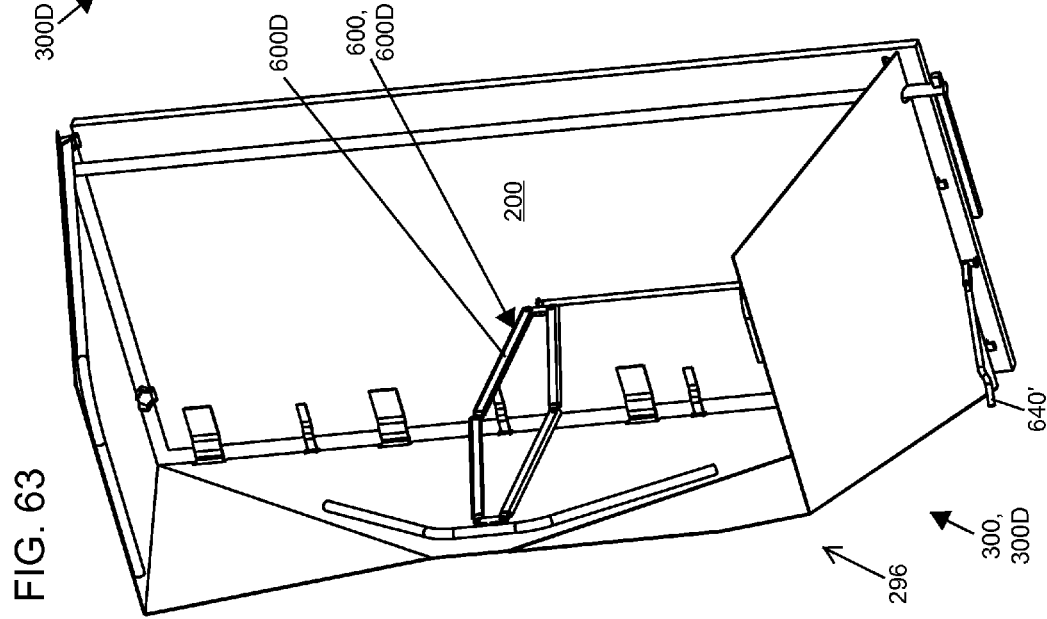
FIG. 63 is a perspective view of a fourth example embodiment of a drag reducing apparatus adapted for use with the vehicle of FIG. 1, illustrated in a deployed configuration, according to the principles of the present disclosure.

As illustrated at FIGS. 34 and 115, the doors 190, 200 may each include one or more lock rod assemblies 250. The lock rod assemblies 250 may serve to latch and/or lock the doors 190, 200 in the closed configuration 214. The lock rod assemblies 250 may further serve to stabilize the doorframe 186 and thereby add rigidity, strength, and/or stiffness to the rear end 174 of the body 170. The lock rod assembly 250 extends between a top end 252 and a bottom end 254 (see FIGS. 113 and 115). Typically, a lock rod 256 of the lock rod assembly 250 extends between the top end 252 and the bottom end 254. The lock rod 256 typically extends in a vertical direction parallel to an outside surface 210 of the respective door 190, 200. A mount 258 may rotatably hold the lock rod 256 and rotatably mount the lock rod 256 to the outside 210 of the respective door 190, 200. One or more of the mounts 258 may thereby define a lock rod pivot axis A20. The lock rod 256 may be manually rotated by a handle 260. As illustrated at FIG. 115, the lock rod assembly 250 typically includes latches 262 that are actuated by rotation of the lock rod 256 by the handle 260. Typically, one of the latches 262 is positioned at or near the top end 252, and another of the latches 262 is positioned at or near the bottom end 254. As illustrated at FIG. 121, a pair of latch receivers 264 may be positioned at the doorframe 186 and thereby receive the pair of the latches 262, respectively, when the lock rod assembly 250 is in a latched configuration. One of the latch receivers 264 may be positioned on the doorframe 186 adjacent the top 176 of the body 170, and another of the latch receivers 264 may be positioned at the doorframe 186 adjacent the bottom 178 of the body 170.

As illustrated at FIGS. 3, 4, and 115-117, an interface perimeter 270 is generally defined between the rear end 154 of the vehicle 150 and the mounted end 292 of the aerodynamic arrangement 280. As depicted, the interface perimeter 270 includes a top 272, a bottom 274, a right side 276, and a left side 278. The interface perimeter 270 may include a step discontinuity 273 between the top 282 of the aerodynamic arrangement 280 and the top 176 of the body 170. Likewise, the interface perimeter 270 may include a step discontinuity 277 between the right side 286 of the aerodynamic arrangement 280 and the right side 180 of the body 170. Likewise, the interface perimeter 270 may include a step discontinuity 279 between the left side 288 of the aerodynamic arrangement 280 and the left side 282 of the body 170. It may be generally desired to reduce the step discontinuities 273, 277, and/or 279 to a minimal size when the aerodynamic arrangement 280 is in the deployed configuration 296. However, considerations such as lighting fixtures and/or functional geometry of the body 170, the doors 190, 200, and/or the aerodynamic arrangement 280 may result in selection of the step discontinuities 273, 277, and/or 279 with a non-minimal size that is relatively small, yet meets various other requirements.

As depicted at FIGS. 1-4, the top 282 and the right and left sides 286, 288 meet at a common edge 281, 283, respectively. In other embodiments, the top 282 may extend beyond the right and/or the left sides 286, 288. Likewise, the right and/or the left sides 286, 288 may extend beyond the top 282. As depicted at FIGS. 1-4, the bottom 284 and the right and left sides 286, 288 meet at a common edge 285, 287, respectively. As illustrated at FIGS. 48, 50, 52-54, and 56-62, in other embodiments, the bottom 284 may extend beyond the right and/or the left sides 286, 288, and/or the right and/or the left sides 286, 288 may extend beyond the bottom 284.

As depicted, the aerodynamic arrangement 280 includes a pair of panels at the top 282 and another pair of panels at the bottom 284 and further includes a set of three panels at the right side 286 and another set of three panels at the left side 288. In other embodiments, the pair of the panels at the top 282 may be combined. Likewise, the pair of the panels at the bottom 284 may be combined. In certain embodiments, the right side 286 and/or the left side 288 may be split about in half. In certain embodiments, an overall orientation of the aerodynamic arrangement 280 may be rotated 90 degrees about the longitudinal axis A1 of the vehicle 150 thereby positioning the top 282 and the bottom 284 at new sides of an aerodynamic arrangement and further positioning the right side 286 and the left side 288 at a new top and a new bottom of the aerodynamic arrangement. For additional information on such rearrangements, see U.S. Provisional Patent Application Ser. No. 60/741,155 and U.S. Pat. Nos. 7,374,230; 7,618,086; 7,850,224; 8,272,680; and 8,480,162, that were incorporated by reference above.

Turning now to FIGS. 13-36, a first example aerodynamic assembly 300A is illustrated according to the principles of the present disclosure. The aerodynamic assembly 300A is illustrated as a left-hand aerodynamic assembly 300L. It will be appreciated that the aerodynamic assembly 300A may be mirrored into a right-hand aerodynamic assembly 300R. Generically, the left-hand aerodynamic assembly 300L and the right-hand aerodynamic assembly 300R may be referred to as an aerodynamic assembly 300. The aerodynamic assembly 300A includes a panel 350 (e.g., a side panel), a panel 400 (e.g., a top panel), a panel 450 (e.g., a side-top connecting panel), a panel 500 (e.g., a bottom panel), and a panel 550 (e.g., a side-bottom connecting panel). The panels 350, 400, 450, 500, 550 may be interconnected into a folding arrangement (e.g., an origami folding arrangement). In certain embodiments, the folding arrangement may allow the panels 350, 400, 450, 500, 550 to be moved between a deployed configuration 296 and a retracted configuration 298 with a single movement (i.e., a single degree-of-freedom). Thus, the aerodynamic assembly 300A may be moved between the deployed configuration 296 and the retracted configuration 298 by moving any one of the panels 350, 400, 450, 500, 550 which, in turn, urges the aerodynamic assembly 300A to move. For additional information on such movement, see U.S. Provisional Patent Application Ser. No. 60/741,155 and U.S. Pat. Nos. 7,374,230; 7,618,086; 7,850,224; 8,272,680; and 8,480,162, that were incorporated by reference above.

As the aerodynamic assembly 300, 300A may be operated with a single degree-of-freedom, a single actuator may be used to transform the aerodynamic assembly 300A between the deployed configuration 296 and the retracted configuration 298. As depicted, the aerodynamic assembly 300A includes an actuator 600A. As depicted, the actuator 600A is a single actuator connected between the vehicle 150 and the panel 350. In the depicted embodiment, the actuator 600A is connected between the door 200 of the vehicle 150 and the panel 350. The actuator 600A may be a pneumatic cylinder, a hydraulic cylinder, a spring loaded cylinder, a screw actuator, and/or various other types of linear and/or rotary actuators.

As depicted, the actuator 600A extends between a first end 602 and a second end 604 (see FIGS. 16 and 41). In particular, the first end 602 of the actuator 600A is rotatably attached to the door 200, and the second end 604 is rotatably attached to the panel 350. An axis A6 may be defined at the connection between the first end 602 of the actuator 600A and the door 200 (see FIGS. 13, 40, 41, and 51). Likewise, an axis A10 may be defined between the second end 604 of the actuator 600A and the panel 350 (see also FIG. 22). As depicted, the actuator 600, 600A extends and retracts along an actuator extension axis A8 (see FIGS. 41 and 51).

In the depicted embodiment, the actuator 600A includes a cylinder portion 610 and a rod portion 620 (see FIGS. 16 and 41). The cylinder portion 610 extends between a first end 612 and a second end 614. As depicted, the first end 612 of the cylinder portion 610 is generally adjacent the first end 602 of the actuator 600A. The rod portion 620 extends between a first end 622 and a second end 624. The second end 624 of the rod portion 620 is generally adjacent the second end 604 of the actuator 600A. The first end 622 of the rod portion 620 is positioned through the second end 614 of the cylinder portion 610. The rod portion 620 may slide within the cylinder portion 610 along the actuator extension axis A8 and thereby define a linear joint. In certain embodiments, the rod portion 620 may further rotate with respect to the cylinder portion 610 about the actuator extension axis A8. In other embodiments, the rod portion 620 may be constrained from rotating with respect to the cylinder portion 610. As depicted, the cylinder portion 610 may define an attachment lug 616 adjacent the end 612. Likewise, the rod portion 620 may define an attachment lug 626 adjacent the end 624. The attachment lug 616 may be adapted to rotate about the axis A6 with respect to the door 200. Likewise, the attachment lug 626 may be adapted to rotate about the axis A10 with respect to the panel 350.

As depicted, the actuator 600A provides a higher mechanical advantage when the aerodynamic assembly 300A is at or near the deployed configuration 296 in comparison to when the aerodynamic assembly 300A is at or near the retracted configuration 298. In embodiments where the actuator 600, 600A is an extension-retraction based actuator, the actuator 600A provides higher holding power to the panel 350 when the panel 350 is at the deployed configuration 296 in comparison to opening power provided to the panel 350 when the panel 350 is at the retracted configuration 298. Similar to the illustration at FIG. 110, the axis A6 may be positioned closer to the door 200 than the axis A10 when the aerodynamic assembly 300A is at the retracted configuration 298. In this way, the actuator 600A does not become over-centered, and extension of the actuator 600A urges the aerodynamic assembly 300A toward the deployed configuration 296.

In other embodiments, the actuator 600A may become over-centered and thereby be used to hold the aerodynamic assembly 300A in the retracted configuration 298 when at or near the retracted configuration 298 and further be used to hold the aerodynamic assembly 300A in the deployed configuration 296 when the aerodynamic assembly 300A is at or near the deployed configuration 296.

As depicted at FIGS. 16 and 41, the panel 350 may include a pocket 360 that allows at least a portion of the attachment lug 626 and/or the rod portion 620 to penetrate a portion of the panel 350. The pocket 360 may extend completely through the panel 350 and thereby become a slot, a hole, etc. A similar pocket to the pocket 360 may be provided on the door 200. The pocket(s) 360 may thereby allow the actuator 600, 600A to have additional mechanical advantage, especially when the aerodynamic assembly 300, 300A is at the retracted configuration 298.

In the depicted embodiments, the actuator 600, 600A is attached to the panel 350. In other embodiments, the actuator 600, 600A may be attached to the panel 400 and/or the panel 500. In the depicted embodiments, a single actuator 600 is used. In other embodiments, multiple actuators may be used and may attach to multiple panels 350, 400, 450, 500, and/or 550. The actuator 600, 600A may be remotely controlled by a control system and the aerodynamic assembly 300, 300A may thereby be opened and closed remotely (e.g., from within a cab of the vehicle 150).

Figure 70:
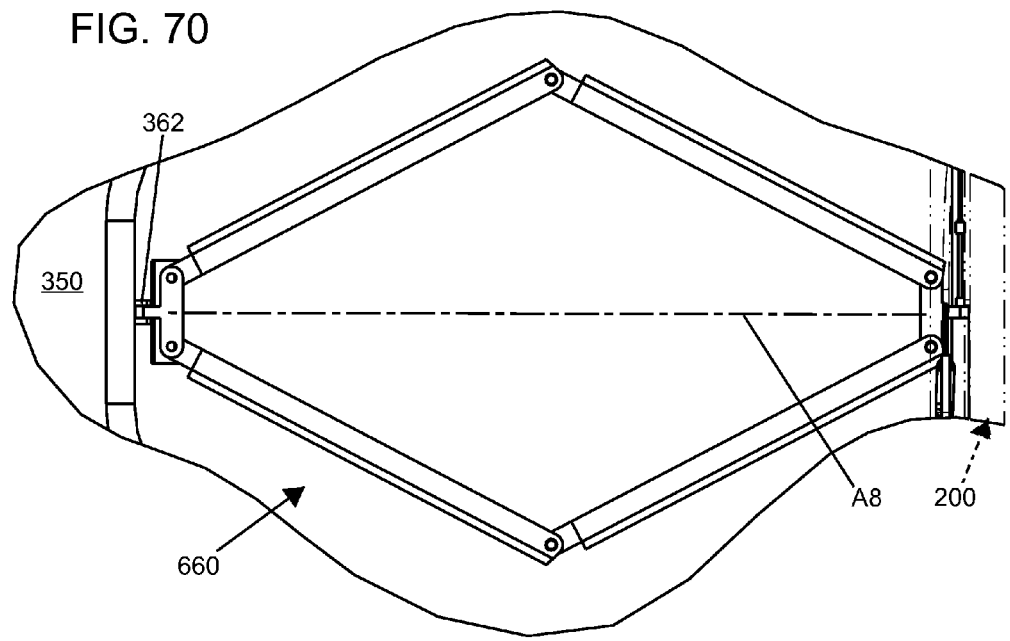
FIG. 70 is an enlarged partial elevation view of the actuator of FIG. 69.

As depicted at FIGS. 13, 55, 56, 73, 82, and 83, an actuator mount 230 may be provided on the door 200. In particular, the actuator mount 230, 230a, illustrated at FIG. 13, includes a pair of mounting flanges 232 that define the axis A6. A joint is thereby formed between the door 200 and the attachment lug 616 (see FIGS. 28 and 41) of the actuator 600A. Likewise, an actuator mount 362 may be provided on the panel 350 (see FIGS. 28 and 70). The actuator mount 362 may define the axis A10 (see FIG. 22) and thereby define a joint between the attachment lug 626 of the actuator 600, 600A and the panel 350.

Turning now to FIG. 17, boundaries of the example panel 350 will be described in detail. The panel 350 extends between a first edge 352 and a second edge 354. As depicted, the first edge 352 is positioned forward of the second edge 354 when the panel 350 is at the deployed configuration 296. The panel 350 further extends between a third edge 356 and a fourth edge 358. As depicted, the third edge 356 is positioned above the fourth edge 358. As depicted, the second edge 354 may be substantially shorter than the first edge 352. The panel 350 may thereby form a generally trapezoidal shape. The first edge 352 may include hinge reliefs 364 (see FIGS. 14, 17, and 92) that may provide clearance between the panel 350 and the door hinges 220. The other edges 354, 356, and/or 358 may also include hinge reliefs.

The door 200 may include a set of panel hinge mounts 240. As illustrated at FIG. 13, the panel hinge mounts 240 may include one or more side panel hinge mounts 242. As illustrated at FIGS. 51, 92, 129, and 130, the side panel hinge mount(s) 242 may define an axis A22 about which the panel 350 may rotate. As illustrated at FIGS. 129 and 130, the axis A22 may be defined beyond a perimeter of the door 200. By defining the axis A22 beyond the outboard edge 204 of the door 200, the step discontinuity 279 (see FIG. 116) of the interface perimeter 270 may be selected as desired or no step discontinuity may be selected. The step discontinuity 279 may be selected between an outside surface 366o of the panel material 366 and the side 160, 162 of the vehicle 150 (e.g., the side 182 of the body 170). The panel 350 may further include hinge portions 370 as illustrated at FIGS. 109 and 119. The hinge portions 370 may define the axis A22 and thereby form a hinge with the side panel hinge mount 242. In this way, the panel 350 may be hingedly mounted to the door 200 or other portion of the vehicle 150.

As illustrated at FIGS. 18 and 34, the panel 350 may further include a frame member 380. The other panels 400, 450, 500, and/or 550 may include similar frame members. As depicted, the frame member 380 extends between a first end 382 and a second end 384. In the depicted embodiment, the frame member 380 terminates at the first and second ends 382, 384 within an interior of the panel 350. In other embodiments, the frame member 380 may extend to the hinge portions 370. In certain embodiments, the frame member 380 may extend to the second edge 354 of the panel 350. As depicted, the frame member 380 includes a medial portion 386. As depicted at FIGS. 34 and 120, the medial portion 386 of the frame member 380 may extend farthest from the first edge 352 of the panel 350, and the first and second ends 382 and/or 384 may extend nearest to the first edge 352.

The medial portion 386 may be positioned outboard of the lock rod 256 when the panel 350 is at the retracted configuration 298 for doors 200 with a single lock rod 256. For doors 200 with a first lock rod $265_1$ and a second lock rod $265_2$ of respective first and second lock rod assemblies $250_1$ and $250_2$, the frame member 380 may be positioned between the first and second lock rods $256_1$ and $256_2$. In this way, the frame member 380 does not occupy additional longitudinal space beyond what the lock rod 256 occupies. The panel 350 may include an overhanging portion 388 that extends beyond the medial portion 386 of the frame member 380 and lies over the lock rod 256 when the panel 350 is at the retracted configuration 298. In this way, required strength and/or stiffness may be provided to the panel 350 without occupying significant additional longitudinal space when the aerodynamic assembly 300A is at the retracted configuration 298.

As illustrated at FIGS. 129 and 130, the side panel hinge mount 242 may include a resilient structure. The axis A22 may thereby be positioned at various distances Dh from the outside 210 of the door 200 and/or positioned at various distances Dh with respect to the door 200. This resilient hinge mount 242 may be employed when opening the door 200 against the sides 180, 182 of the body 170 of the vehicle 150. For example, the side panel hinge mount 242 may be positioned as shown at FIG. 130 when the door 200 is not positioned against the side 180, 182 of the vehicle 150. As the door 200 is further opened, the side panel hinge mount 242 may compress as shown at FIG. 129 and thereby deform against the side 180, 182 of the body 170 and/or the side 160, 162 of the vehicle 150. The door 200 may thereby be opened farther than otherwise possible (e.g., if the side panel hinge mounts 242 were substantially rigid). In certain embodiments, the resilient structure may allow resilient displacement of the axis A22 over distances of up to about 0.25 inch. In certain embodiments, the resilient structure may allow resilient displacement of the axis A22 over distances of up to about 0.5 inch. In certain embodiments, the resilient structure may allow resilient displacement of the axis A22 over distances of up to about 1 inch. In certain embodiments, the resilient structure may allow resilient displacement of the axis A22 over distances of over 1 inch.

As illustrated, the side panel hinge mounts 242 are male and the hinge portions 370 of the panel 350 are female. In other embodiments, some or all of the hinge portions 370 may be male and some or all of the side panel hinge mounts 242 may be female. As depicted at FIGS. 129 and 130, the side panel hinge mount 240 is resilient. In other embodiments, the side panel hinge mount 242 may be substantially rigid. In certain embodiments, the side panel hinge mount 242 may include a leaf spring. In certain embodiments, the hinge portions 370 of the panel 350 are resilient.

In embodiments where the frame member 380 is terminated within the interior of the panel 350, resistance to damage of the panel 350 when encountering an obstruction may thereby be accommodated. For example, the vehicle 150 may be inadvertently backed into a loading dock with the aerodynamic assembly 300, 300A extended. The panel 350 may be constructed of a panel material 366 that is substantially flexible (e.g., plastic sheet, composite sheet, etc.). The frame member 380 may be substantially more rigid than the panel material 366. Upon the second edge 354 or other portion of the panel 350 being compressed by the obstruction, the panel material 366 may buckle and/or otherwise deform, but without permanent damage and/or permanent deformation. The frame member 380 may remain substantially rigid and/or more rigid as the panel material 366 buckles and yet not be damaged by the obstruction. Upon removal of the obstruction, the panel material 366 may resiliently return to its pre-collision configuration or near to its pre-collision configuration.

Alternatively, the frame member 380 may include substantially deformable material. In certain embodiments, the frame member 380 may be made of plastic tubing. In certain embodiments, the frame member 380 may include composite tubing. In certain embodiments, the frame member 380 may be made of a wire-form material. The wire-form material may include spring material (e.g., spring steel, high strength aluminum, etc.). In certain embodiments, the frame member 380 may include pressurized plastic tubing. In such embodiments, internal pressure within the tubing may rigidize the frame member 380. Likewise, other non-plastic tubing of the frame member 380 may be pressurized.

As illustrated at FIG. 51, the axes A6, A10, and A22 form vertexes of a triangle when viewed parallel to the axes A6, A10, A22 (e.g., from a bottom plan view or a top plan view of the aerodynamic assembly 300. A portion of the door 200 between the axes A6 and A22 forms a first leg of the triangle. A portion of the side panel 350 between the axes A10 and A22 forms a second leg of the triangle. And, a portion of the actuator 600, 600A between the axes A6 and A10 forms a third leg of the triangle. As depicted, the first leg and the second leg are substantially fixed in length. As illustrated, the third leg of the triangle varies in length as the actuator 600, 600A is actuated. The triangular configuration of the actuator 600, 600A, the door 200, and the panel 350 provide a stable configuration when the aerodynamic assembly 300 is at the deployed configuration 296. The triangular configuration further allows the panel 350 to be swung from the deployed configuration 296 toward the retracted configuration 298 and thereby position the aerodynamic assembly 300 between the deployed configuration 296 and the retracted configuration 298.

As illustrated at FIG. 51, the panel 350 defines an angle α with the door 200 (e.g., with the outside surface 210 of the door 200). In the depicted embodiment, the angle α is at or about 75 degrees when the panel 350 is at the deployed configuration 296. In other embodiments, the angle α may be at or about 78 degrees, in a range from 75 to 78 degrees, in a range from 85 to 65 degrees, and/or in a range from 70 degrees to 80 degrees when the panel 350 is at the deployed configuration 296. In the depicted embodiment, the angle α is about 1 degree when the panel 350 is at the retracted configuration 298. In other embodiments, the angle α may be at or about 2 degrees, may be in a range of 0.5 degree to 2 degrees, may be in a range from 1 degree to about 5 degrees, and/or may be in a range from about −5 degrees to about 5 degrees, when the panel 350 is at the retracted configuration 298. The panel 350 may swing about the axis A22 about an angle of 74 degrees, a range of 65 to 85 degrees, or a range of about 70 to 80 degrees as the panel 350 swings between the deployed configuration 296 and the retracted configuration 298.

In coordination with the panel 350 swinging about the angle α, the actuator 600 (e.g., the actuator extension axis A8) may swing about the axis A6 about an angle β. As depicted, the angle β is at or about 100.6 degrees when the panel 350 is at the deployed configuration 296. In other embodiments, the angle β may be at a range of about 90 degrees to about 110 degrees when the panel 350 is at the deployed configuration 296. As depicted, the angle β is at about 3 degrees when the panel 350 is at the retracted configuration 298. In other embodiments, the angle β is in a range from about 0 degrees to about 6 degrees when the panel 350 is at the retracted configuration 298. As depicted, the actuator 600, 600A (e.g., the actuator extension axis A8) may swing about an angle of 97.6 degrees about the axis A6 as the panel 350 is moved between the deployed configuration 296 and the retracted configuration 298. In the depicted embodiments, the actuator 600, 600A swings about a greater angle than an angle that the panel 350 swings about.

As illustrated at FIGS. 13 and 34, the geometry of the actuator 600A is selected such that the rod portion 620 may be substantially located within the cylinder portion 610 when the panel 350 is at the retracted configuration 298. The actuator 600A may define stops (e.g., a piston of the rod portion 620 bottoming out at ends of the cylinder portion 610) that limit the movement of the panel 350 between the deployed configuration 296 and the retracted configuration 298. The actuator 600A may further include a damping mechanism (e.g., an orifice that restricts fluid flow) that limits extension and/or retraction speeds of the actuator 600A. The geometry of the actuator 600A may be chosen such that the end 614 of the cylinder portion 610 lies between the ends 622 and 624 of the rod portion 620. Likewise, the end 622 of the rod portion 620 may lay between the ends 612 and 614 of the cylinder portion 610. The rod portion 620 and the cylinder portion 610 may thereby continuously overlap each other as the actuator 600A is moved between the fully retracted and the fully extended configurations 298, 296. As will be described in detail hereinafter, the overlapping of the cylinder portion 610 and the rod portion 620 allows a moment to be applied about the axis A6 and thereby swing the actuator 600A about the angle β. Thus, the actuator 600A may be actuated by either a linear force along the actuator extension axis A8 and/or by a moment (i.e., a torque) applied at or along the actuator axis A6.

Turning now to FIGS. 25 and 28, the panel 400 (e.g., the top panel) will be described in detail. As depicted, the panel 400 extends between a first edge 402 and a second edge 404. The first edge 402 may be a front edge when the panel 400 and/or the aerodynamic assembly 300, 300A are at the deployed configuration 296. The first edge 402 may include a lock rod notch or notches 412, as depicted at FIG. 34. Likewise, the second edge 404 may be a rear edge when the panel 400 is at the deployed configuration 296. The panel 400 further extends between a third edge 406 and a fourth edge 408. The third edge 406 is illustrated as an outer edge (i.e., an outboard edge), and the fourth edge 408 is illustrated as an inner edge (i.e., an inboard edge).

As depicted, the second edge 404 of the panel 400 may be positioned about five feet behind the outside 210 of the door 200 when the aerodynamic assembly 300 is at the deployed configuration 296. Current U.S. highway regulations allow for aerodynamic devices behind certain vehicles to extend up to five feet behind the vehicle. The configuration of the aerodynamic assembly 300 allows certain panels (e.g., the panel 400) to extend the full five feet behind the vehicle 150. The aerodynamic assembly 300 thereby facilitates extension behind the vehicle 150 to a maximum extent permitted by current U.S. regulation to achieve maximum drag reduction under the extension limits of the current U.S. regulations. Furthermore, the extension of the aerodynamic assembly 300 behind the vehicle 150 is done with a panel (e.g., the panel 400) about an axis A24 (see FIGS. 117, 129, and 130) adjacent the door 200. The aerodynamic assembly 300 may thereby achieve the maximum legal extension behind the vehicle 150 with the use of simple hinging panels (e.g., the panel 400) with single hinge lines connected to the rear end 154 of the vehicle 150 (e.g., the door 200 of the body 170). As will be described hereinafter, the five foot rearward extension may be achieved, at least in part, by overlapping the panels 350, 400, 450, 500, and/or 550. Other conventional designs currently available only achieve about a four foot rearward extension using simply swinging panels. Still other designs may achieve five feet of rearward extension or greater than five feet of rearward extension but use compound (e.g., bi-fold) configurations of panels. Such bi-fold panels may fold and unfold at a hinge line that is substantially spaced away from the door 200 when deployed.

As illustrated at FIG. 117, the panel 400 may include one or more hinges 410, 420 that define the axis A24. Likewise, the door 200 may include one or more panel hinge mounts 244 that define the axis A24. The panel hinge mount 244 may be one of the panel hinge mounts 240. As depicted, the axis A24 runs in a generally horizontal direction generally parallel with the outside 210 of the door 200. In other embodiments, the axis A24 may deviate from being horizontal and/or deviated from being parallel with the outside 210 of the door 200.

As depicted, the hinges 410 and 420 are offset from panel material 416 of the panel 400. By offsetting the axis A24 from the panel material 416, the first edge 402 may be substantially outside a perimeter of the door 200 (e.g., outside beyond the top edge 206) when the panel 400 is at the deployed configuration 296. By offsetting the axis A24 from the panel material 416, the top 272 of the interface perimeter 270 may be selected to give a desired step or no step between an outside surface 416o of the panel material 416 and the top 156 of the vehicle 150 (e.g., the top 176 of the body 170). The top 282 of the aerodynamic arrangement 280 may thereby include the step discontinuity 273 between the top 156 of the vehicle 150, in certain embodiments. In other embodiments, there may be substantially no step between the top 282 of the aerodynamic arrangement 280 and the top 156 of the vehicle 150 when the aerodynamic arrangement 280 is deployed.

As illustrated at FIGS. 112-114, 123, and 124, when the door 200 is positioned in the wide-open configuration 218, adjacent one of the sides 160, 162 of the vehicle 150 (e.g., one of the sides 180, 182 of the body 170), space may be constrained at or near the hinge axes A2 and/or A4 of the doors 190 and/or 200. To allow the doors 190, 200 to fully open to the wide-open configuration 218, the hinges 410 and/or 420 may be compressible hinges and/or compressibly mounted hinges. In particular, the hinge 420 is illustrated with a first flexure 422 and a second flexure 424 in the depicted example embodiment. As illustrated at FIGS. 112-114, 123, and 124, the flexures 422, 424 are compressed as the outside surface 416o of the panel material 416 of the panel 400 contacts the side 162 of the vehicle 150. In certain embodiments, the panel material 416 is a deformable panel material and thereby is able to bend upon making contact with the side 162 of the vehicle 150. In certain embodiments, the compliance of the panel material 416 to the side 162 of the vehicle 150 is further accommodated by the flexing of the flexures 422 and/or 424. As illustrated at FIG. 112, a non-deformed configuration of the flexures 422 and 424 are illustrated in dashed-line. In certain embodiments, both the deformation of the panel material 416 and the deformation of the flexures 422, 424 may accommodate opening the door 200 to its wide-open configuration 218. In certain embodiments, the flexure structure may allow resilient displacement over distances of up to about 0.25 inch. In certain embodiments, the flexure structure may allow resilient displacement over distances of up to about 0.5 inch. In certain embodiments, the flexure structure may allow resilient displacement over distances of up to about 1 inch. In certain embodiments, the flexure structure may allow resilient displacement over distances of over 1 inch.

As depicted, the deformable portions (e.g., the flexures 422, 424) of the hinge 420 are located at the hinge portion 420 of the panel 400. In other embodiments, the top panel hinge mount 244 may further include deformable material. In particular, the top panel hinge mount 244 may include a configuration similar to the side panel hinge mount 242 (see FIGS. 129 and 130). In certain embodiments, the deformable material is at a door side of the hinge. In other embodiments, the deformable material is at a panel side of the hinge. In still other embodiments, both the panel side and the door side of the hinge include compliant material.

The flexures 422, 424 and/or the side panel hinge mount 242, as illustrated, may be generally limber in a direction generally perpendicular to the outside 210 of the door 200 when the aerodynamic assembly 300 is at the retracted configuration 298. By being compliant in the direction perpendicular to the door 200, the mounts of the aerodynamic assembly 300 may be compliant when the door 200 is open to the wide-open configuration 218. The flexures 422, 424 and/or the side panel hinge mount 242 may be substantially stiff in other directions and thereby position and hold the aerodynamic assembly 300 at the various desired configurations when in the deployed configuration 296, the transitioning configuration 297, and the retracted configuration 298.

In other embodiments, other components may further provide compliance (e.g., may provide one or more resilient structures) and thereby accommodate the opening of the door 200 to the wide-open configuration 218 with the added thickness resulting from the mounting of the aerodynamic assembly 300 to the outside 210 of the door 200. For example, the door hinge 220 and, in particular, the swing portion 224 of the door hinge 220 may provide such a compliant structure. In other embodiments, the aerodynamic assembly 300 may be recessed within the door 200 and thereby avoid interference with the sides 160, 162 of the vehicle 150. In still other embodiments, articulating hinges (e.g., on the door 200) may be used to avoid interference between the aerodynamic assembly 300 and the side 160, 162 of the vehicle 150. The articulating hinges may replace the door hinges 220 that are illustrated.

Turning now to FIG. 129, an alternate arrangement of the hinge 420 is illustrated. In particular, a hinge portion 420' includes a linkage 420L with a first link 422a, a second link 422b, a third link 424a, and a fourth link 424b. The first link 422a may be rotatably connected to the panel 400 at a first axis A122. The first link 422a and the second link 422b may be rotatably connected at a second axis A124. The link 422b and a rotatable joint portion 426 of the hinge portion 420' may be rotatably connected at a third axis A126. As depicted, the links 424a and 424b may be substantially mirrored versions of the links 422a, 422b. In particular, the link 424a may be rotatably connected to the panel 400 at a first axis A132. The links 424a and 424b may be rotatably connected to each other at a second axis A134. And, the second link 424b and the rotatable joint portion 426 of the hinge portion 420' may be connected at a third axis A136. One or more or all of the axes A122, A124, A126, A132, A134, and/or A136 may be spring loaded and thereby bias the hinge portion 420' to extend outwardly away from the outside 210 of the door 200 when the aerodynamic assembly 300 is at the retracted configuration 298 (see FIG. 129). A spring member 428 may be connected between the axis A124 and the axis A134 and thereby urge the hinge portion 420' to extend. The linkages of the hinge portion 420' may include stops that limit the extension of the linkages. In certain embodiments, the linkage structure may allow resilient displacement over distances of up to about 0.25 inch. In certain embodiments, the linkage structure may allow resilient displacement over distances of up to about 0.5 inch. In certain embodiments, the linkage structure may allow resilient displacement over distances of up to about 1 inch. In certain embodiments, the linkage structure may allow resilient displacement over distances of over 1 inch.

Turning now to FIGS. 17 and 18, the panel 450 (e.g., the side-top connecting panel) will be described in detail. As depicted, the panel 450 is generally triangular in shape. The panel 450 includes a first edge 452, a second edge 454, and a third edge 456 in the depicted embodiment. In other embodiments, additional edges may be included. The first edge 452 of the panel 450 is generally adjacent to the panel 350. The second edge 454 of the panel 450 is generally adjacent to the panel 400. And, the third edge 456 of the panel 450 is generally adjacent to the extended end 294 of the aerodynamic arrangement 280 when the aerodynamic arrangement 280 is in the deployed configuration 296. In certain embodiments, the panel 450 may be made of panel material 466. The panel material 466 may be a plastic material, a composite material, or other panel-like material.

As illustrated at FIG. 13, the panel 450 may define a first axis A12 and a second axis A16. The panel 350 may also define the axis A12 and thereby be connected to the panel 450. Likewise, the panel 400 may also define the axis A16 and thereby be connected to the panel 450. As the panels 350, 400, and 450 include certain offsets from each other, the panel 350 and the panel 450 may both rotate and translate along the axis A12 to accommodate movement of the aerodynamic assembly 300 from the deployed configuration 296 to the transitioning configuration 297 and further to the retracted configuration 298. The panels 350 and/or 450 may further translate and rotate with respect to each other along the axis A12 as the aerodynamic assembly 300 is moved from the retracted configuration 298 to the transitioning configuration 297 and further to the deployed configuration 296. In a similar manner, the panel 400 and the panel 450 may both rotate and translate with respect to each other along the axis A16.

To further accommodate the offsets between the panels 350, 400, and 450, the hinge portions 420, 420', 242, 244, and/or 370 may deform and thereby accommodate movement in addition to the translational and rotational movement about the axes A12 and A16. Relative linear movement may occur between components connected across the axes A22 and/or A24 and thereby accommodate movement in addition to the translational and rotational movement about the axes A12 and A16. Deformation of the hinge portions 420, 420', 242, 244, and/or 370 and relative linear movement across the axes A22 and/or A24 may accommodate movement in addition to the translational and rotational movement about the axes A12 and A16.

As depicted, when the aerodynamic assembly 300 is at the deployed configuration 296, the panel 450 is generally parallel with the panel 350. When the aerodynamic assembly 300 is in the retracted configuration 298 the panel 350 and the panel 400 generally sandwich the panel 450 (see FIGS. 42 and 44). The panel 450 is a connecting panel in that relative movements of the panel 350 are communicated into relative movements of the panel 400. In addition, the panel 450 may communicate relative movements from the panel 400 to the panel 350. In certain embodiments, the panel 450 may be fabric-like and substantially flexible in all but a tensile direction. The joints defining the axis A12 between the panel 350 and the panel 450 may be embodied in one or more simple hinges, live hinges, piano hinges, etc. The joints defining the axis A16 between the panel 400 and the panel 450 may be embodied in one or more simple hinges, live hinges, piano hinges, etc.

Turning now to FIG. 25, the panel 500 (e.g., the bottom panel) will be described in detail. The panel 500 and the panel 400 include certain similarities. In certain embodiments, the panel 500 may be a mirror image of the panel 400. The panel 500 extends between a first edge 502 and a second edge 504. As depicted, the first edge 502 is a front edge when the aerodynamic assembly 300 is in the deployed configuration 296. The second edge 504 may be a rear edge when the panel 500 is in the deployed configuration 296. The panel 500 further extends between a third edge 506 (e.g., an outer edge) and a fourth edge 508 (e.g., an inner edge). As depicted, the panel 500 includes panel material 516 with an outside surface 516o. In the depicted embodiment, the panel material 516 is a solid panel material. In other embodiments, the panel material 516 may include substantial holes and/or voids to allow snow, rain, dirt, and/or other foreign material to drop out of the cavity 290 of the aerodynamic arrangement 280.

As with the panel 400, the depicted panel 500 includes a hinge 510 and a hinge 520 (see FIG. 43). The hinge 510 may be substantially similar to the hinge 410, and the hinge 520 may be substantially similar to the hinge 420. In this way, the panel 500 may accommodate the door 200 opening to the wide-open configuration 218 with the outside surface 516o of the panel material 516 pressed against the side 160, 162 of the vehicle 150 thereby causing deformations similar to those of the panel 400, as discussed above.

As depicted, the panel 500 may be shorter in length (e.g., from the edge 502 to the edge 504) than the panel 400. In the depicted embodiment of FIG. 31, the second edge 504 of the panel 500 is substantially adjacent to the second edge 404 of the panel 400 when the aerodynamic assembly 300, 300A is at the retracted configuration 298. In other embodiments, for example as illustrated at FIG. 109, a portion 530 of the panel 500 extends upwardly beyond the second edge 404 of the panel 400 when the aerodynamic assembly 300 is in the retracted configuration 298. The panel 500 may thereby overlap the panel 400 when the aerodynamic assembly 300 is at the retracted configuration 298.

In the embodiment depicted at FIG. 109, the overlapping portion 530 of the panel 500 is configured to tuck behind the panel 400. An overlapping edge 504' of the panel 500 thereby extends past the second edge 404 of the panel 400. In the embodiment depicted at FIG. 109, the overlapping portion 530 is offset and thereby allows the second edge 404 of the panel 400 to be in close proximity to the edge 504 of the panel 500 when the aerodynamic assembly 300 is at the retracted configuration 298.

In other embodiments, the overlapping portion 530 may be a continuation of the panel material 516 and thereby cause at least a portion of the panel 400 to be positioned behind the overlapping portion 530 of the panel 500 when the aerodynamic assembly 300 is at the retracted configuration 298. In still other embodiments, the panel 500 may overlap and be positioned rearward of the panel 400 when the aerodynamic assembly 300 is at the retracted configuration 298.

By overlapping the panels 400 and 500, the panels 400 and 500 may each be five feet long or longer in length and thereby extend to the maximum legal extension of five feet longitudinally behind, for example, the outside 210 of the door 200 when the aerodynamic assembly 300 is at the deployed configuration 296. In certain embodiments, such overlapping portions 530 may include only panel material 416, 516 and thereby contribute to the overall longitudinal thickness of the aerodynamic assembly 300, when in the retracted configuration 298, by a thickness of the panel material 416, 516. The panel material 366, 416, 516 may range in thickness from about three millimeters to about seven millimeters, in certain example embodiments.

Similar to the overlapping of the panels 400 and 500, the panel 350 of the right aerodynamic assembly 300R may overlap with the panel 350 of the left aerodynamic assembly 300L. In this way, the panel 350 may also extend the maximum legal length of five feet longitudinally, for example, behind the outside 210 of the door 200.

Turning now to FIG. 18, the panel 550 (e.g., the side-bottom connecting panel) will be described in detail. As depicted, the panel 550 includes a generally triangular shape. The panel 550 is illustrated with one of three sides of the generally triangular shape including two edges. The panel 550 thereby defines a four-sided shape. In particular, the panel 550 extends between a first edge 552 and a second edge 554. The panel 550 further includes a third edge 556 and a fourth edge 558. The first edge 552 is generally adjacent the side panel 350. The second edge 554 is generally adjacent the bottom panel 500. As depicted, the third edge 556 extends generally co-linearly with the second edge 354 of the panel 350 when the aerodynamic assembly 300 is at the deployed configuration 296.

As illustrated at FIG. 14, an axis A14 is defined by both the panel 350 and the panel 550. The panels 350 and 550 are thereby connected at the axis A14 in a manner similar to the connection between the panels 350 and 450 at the axis A12. The panels 500 and 550 define an axis A18. The panels 500 and 550 are connected along the axis A18 in a manner similar to the connection between the panel 400 and the panel 450 at the axis A16. As mentioned above, the panels include certain offsets from each other. The offsets between the panels 350, 500, and 550 may require that the panels 350 and 550 both rotate and translate (i.e., slide) relative to each other along the axis A14 and that the panels 500 and 550 both rotate and translate with respect to each other about the axis A18. In addition, deformable hinges and the like may be used to accommodate offsets between the panels 350, 500, and/or 550. The panel 550 may function in a similar manner to the panel 450, described above.

As depicted at FIG. 32, the third edge 556 of the panel 550 may tuck underneath a portion of the panel 400 when the aerodynamic assembly 300 is at the retracted configuration 298. In this way, the panel 550 and the panel 500 may be held in the retracted configuration 298 by the panel 400 and may thereby not necessarily require a separate latch and/or holding mechanism. The overlapping of panels 400 and 500 (see FIG. 109) may achieve similar results.

Turning now to FIGS. 37-47, a second example aerodynamic assembly 300B is illustrated according to the principles of the present disclosure. The aerodynamic assembly 300B is similar to the aerodynamic assembly 300A but includes an actuator 600B to move the aerodynamic assembly 300B between the deployed configuration 296 and the retracted configuration 298. Generically, the aerodynamic assembly 300B may be referred to as an aerodynamic assembly 300. The actuator 600B is similar to the actuator 600A, described above. However, the actuator 600B further includes a torsion rod 630. The torsion rod 630 may be used to apply torsion to the cylinder portion 610 (e.g., a first portion) of the actuator 600B. As mentioned above, applying the torsion to the cylinder portion 610 (e.g., to the attachment lug 616) causes the actuator 600B to swing about the axis A6. By swinging the actuator 600B about the axis A6, the aerodynamic assembly 300, 300B may be moved between the deployed configuration 296 and the retracted configuration 298. For convenience of an operator, the torsion rod 630 extends downward and below the panel 500. As depicted, the torsion rod 630 extends between a first end 632 and a second end 634 (see FIGS. 40 and 41). The first end 632 may be attached to the attachment lug 616 of the cylinder portion 610. The second end 634 of the torsion rod 630 may extend below the panel 500. A handle 640 may be attached to the second end 634 of the torsion rod 630. By moving the handle 640 between a first position 640d, illustrated at FIGS. 37 and 38, and a second position 640s, illustrated at FIGS. 44 and 45, the angle β of the actuator 600, 600B about the axis A6 may be manipulated and thereby move the aerodynamic assembly 300, 300B between the deployed configuration 296 and the retracted configuration 298.

The handle 640 may be rotatably connected to the second end 634 of the torsion rod 630 at an axis A30 (see FIGS. 40 and 86). By swinging the handle 640 about the axis A30, the handle 640 may be stowed (i.e., moved to a stowed position 640f), as illustrated at FIGS. 46 and 47. For example, when the aerodynamic assembly 300, 300B is at the retracted configuration 298, the handle 640 may be rotated upwardly adjacent the panel 500 and thereby be positioned out of the way (see FIGS. 46 and 47). The handle 640 may be maintained in the stowed position 640f by a detent, a catch, and/or various other holding devices.

To move the aerodynamic assembly 300, 300B from the deployed configuration 296 to the retracted configuration 298, the steps illustrated from FIGS. 37-47 may be implemented. In particular, the operator may grab the handle 640 from underneath the panel 500 and/or from adjacent the side 160, 162 of the vehicle 150. As the handle 640 is rotated away from the outside 210 of the door 200 about the axis A6, the aerodynamic assembly 300, 300B enters the transitioning configuration 297, as illustrated at FIGS. 39-41. Further rotation of the handle 640 results in moving the aerodynamic assembly 300, 300B further toward the retracted configuration 298, as illustrated at FIGS. 42 and 43. Still further rotation of the handle 640 results in the aerodynamic assembly 300, 300B reaching the retracted configuration 298 (see FIGS. 44 and 45). As illustrated at FIGS. 40, 46, and 47, the handle 640 may be rotated upwardly about the axis A30 and thereby be stowed (i.e., moved to the stowed position 640f). To move the aerodynamic assembly 300, 300B from the retracted configuration 298 to the deployed configuration 296, the above steps may generally be performed in reverse.

Turning now to FIGS. 48-62, a third example aerodynamic assembly 300C is illustrated according to the principles of the present disclosure. The aerodynamic assembly 300C is similar to the aerodynamic assembly 300B but includes provisions for 180 degrees of rotation of a handle 640' about the axis A6. Generically, the aerodynamic assembly 300C may be referred to as an aerodynamic assembly 300. The handle 640' is similar to the handle 640, but is illustrated with an offset handhold portion 646 (see FIG. 59). An actuator 600C includes a torsion rod 630' (i.e., a torsion member) in addition to or in place of the torsion rod 630.

The torsion rod 630' is adapted to undergo a substantial torsional deformation and thereby apply a torsional spring load. In certain embodiments, the torsion rod 630' may be made of a spring-like material (e.g., spring steel, high tensile strength aluminum, etc.). In other embodiments, the torsion rod 630' may include a coil spring that is adapted to allow the torsion rod 630' and/or the handle 640' to rotate as the coil spring rotationally deforms. In certain embodiments, such a torsion spring may be positioned between an end 632' of the torsion rod 630' adjacent the attachment lug 616. In certain embodiments, such a torsion spring may be positioned at an end 634' of the torsion rod 630' adjacent the handle 640'. In certain embodiments, such a torsion spring may be positioned elsewhere (e.g., along the torsion rod 630'). In the depicted embodiment, the torsion rod 630' is adapted to undergo substantial torsional deformation and thereby serve as a torsional spring.

As illustrated at FIG. 51, the actuator 600, 600C and/or the actuator extension axis A8 swings about the axis A6 and thereby changes the angle β. In the illustrated embodiments, the range of the swing angle β is substantially less than 180 degrees. As mentioned above, the swing angle β of the actuator extension axis A8 may be about 97.6 degrees along the axis A6. As illustrated at FIG. 51, the handle 640' may define an angle γ with respect to the outside 210 of the door 200. In the illustrated embodiment, the angle γ of the handle 640 may be varied from about zero degrees to about 180 degrees along the axis A6. As the actuator extension axis A8 swings substantially less than 180 degrees, the handle 640' is attached to the torsion rod 630' and the torsion rod 630' is attached to the attachment lug 616 such that the excess rotational travel (e.g., about 180 degrees less the range of the swing angle β) of the handle 640' is split into a portion occurring when the aerodynamic assembly 300, 300C is at the deployed configuration 296 and a portion occurring when the aerodynamic assembly 300, 300C is at the retracted configuration 298. As depicted, the split results in the portions being approximately equal. In other embodiments, the excess rotational travel may be increased at either the deployed configuration 296 or the retracted configuration 298 and result in a smaller excess angle portion remaining at the retracted configuration 298 or the deployed configuration 296, respectively.

The movement of the aerodynamic assembly 300C between the deployed configuration 296 and the retracted configuration 298 will now be described in detail. FIGS. 48-50 illustrate the actuator 600C in an aerodynamic apparatus deployed—handle stowed configuration. When the actuator 600C is in this configuration, the aerodynamic assembly 300C is at the deployed configuration 296. At this configuration, torsion in the torsion rod 630' urges the handle 640' away from the outside 210 of the door 200. However, a hook 650a prevents the handle 640' from rotating about the axis A6. The torsion present in the torsion rod 630' in this configuration further urges the attachment lug 616 to rotate about the axis A6 and thereby urge the panel 350 to further open about the axis A22. A constraint, such as a stop or a travel limiting cable, may keep the panel 350 from rotating beyond the deployed configuration 296, as shown at FIG. 48. The torsion rod 630' thereby urges the panel 350 toward the deployed configuration 296 and thereby urges the aerodynamic assembly 300C toward the deployed configuration 296. However, as the torsion rod 630' is made of a resilient material, a collision between the aerodynamic assembly 300C and a foreign object may result in the torsion rod 630' allowing the aerodynamic assembly 300C to move toward the transitioning configuration 297 and/or the retracted configuration 298.

FIG. 52 illustrates the handle 640' being released from the hook 650a. To release the handle 640' from the hook 650a, the handle 640' may be rotated a slight amount toward the outside 210 of the door 200 and thereby be released from the hook 650a and be free to rotate downward about the axis A30. In other embodiments, the hook 650a is made of a resilient material and the handle 640' may be rotated downward about the axis A30 with the hook 650a resiliently allowing the handle 640' to pass. Once the handle 640' is free of the hook 650a, the handle 640' may begin rotating outwardly away from the outside 210 of the door 200 about the axis A6. As the handle 640' is rotating in this direction, the extending torsional load 360' is relaxed and diminishes the extending load of the actuator 600C on the panel 350. As illustrated in the configuration at FIG. 53, no torsional load remains in the torsion rod 630' and the aerodynamic assembly 300C remains in the deployed configuration 296. As the handle 640' is further rotated beyond the position illustrated at FIG. 53, the aerodynamic assembly 300C moves from the deployed configuration 296 to the transitioning configuration 297. As illustrated at FIGS. 54-56, the aerodynamic assembly 300C is at a transitioning configuration 297. Upon further rotation of the handle 640', the aerodynamic assembly 300C reaches the retracted configuration 298, as illustrated at FIGS. 57 and 58. FIG. 59 illustrates the handle 640' further rotated toward a hook 650b. As the handle 640' is rotated beyond the position illustrated at FIGS. 57 and 58, a retracting torsional load is developed in the torsion rod 630'. The retracting torsional load acts to urge the aerodynamic assembly 300C toward the retracted configuration 298. The torsion rod 630' may thereby serve to keep and urge the aerodynamic assembly 300C toward the retracted configuration 298. The handle 640' may be captured by the hook 650b by lifting the handle 640' up from the position shown at FIG. 59 to the position shown at FIG. 62. The hook 560b may be similar to the hook 650a. The handle 640' may be engaged with the hook 650b in a manner similar to the engagement with the hook 650a. In particular, the hook 650b may be a resilient hook. The handle 640' may be spring-loaded against the hook 650b in the configuration illustrated at FIG. 62.

The method of moving the aerodynamic assembly 300C from the retracted configuration 298 toward the transitioning configuration 297 and toward the deployed configuration 296 is substantially the reverse of the above steps. As the panel 500 is at the retracted configuration 298, as illustrated at FIGS. 60-62, access to the handhold portion 646 of the handle 640' is substantially unobstructed.

Turning now to FIGS. 63-70, a fourth example aerodynamic assembly 300D is illustrated according to the principles of the present disclosure. The aerodynamic assembly 300D is similar to the aerodynamic assembly 300C except that the actuator 600C has been replaced with an actuator 600D. The actuator 600D is similar to the actuator 600C except that the cylinder portion 610 and the rod portion 620 have been replaced by a linkage assembly 660. The linkage assembly 660 includes a first attachment lug 616' that generally replaces the attachment lug 616 of the actuator 600C. The linkage assembly 660 further includes a second attachment lug 626' that generally replaces the attachment lug 626 of the actuator 600C. The attachment lug 616' therefore rotates about the axis A6, and the attachment lug 626' rotates about the axis A10. The attachment lug 616' may be rotated about the axis A6 by the torsion rod 630' in a manner similar to the rotation of the attachment lug 616 of the actuator 600C. However, rather than being connected by the cylinder portion 610 and the rod portion 620, the attachment lug 616' is connected to the attachment lug 626' by a first linkage 670a and a second linkage 670b. The linkages 670a and 670b may be substantially similar to each other. However, as depicted at FIG. 66, the linkage 670a and 670b are opposite each other about a substantially horizontal plane. In certain embodiments, both of the linkages 670a and 670b are used to connect the attachment lug 616' to the attachment lug 626'. In other embodiments, linkages 670a or 670b may be used. As depicted, the linkages 670a and 670b operate in a substantially vertical plane that is swung about the axis A6. In other embodiments, the linkages 670a and/or 670b may operate in other planes and/or may be linkages that are three dimensional linkages rather than planer linkages.

Figure 69:
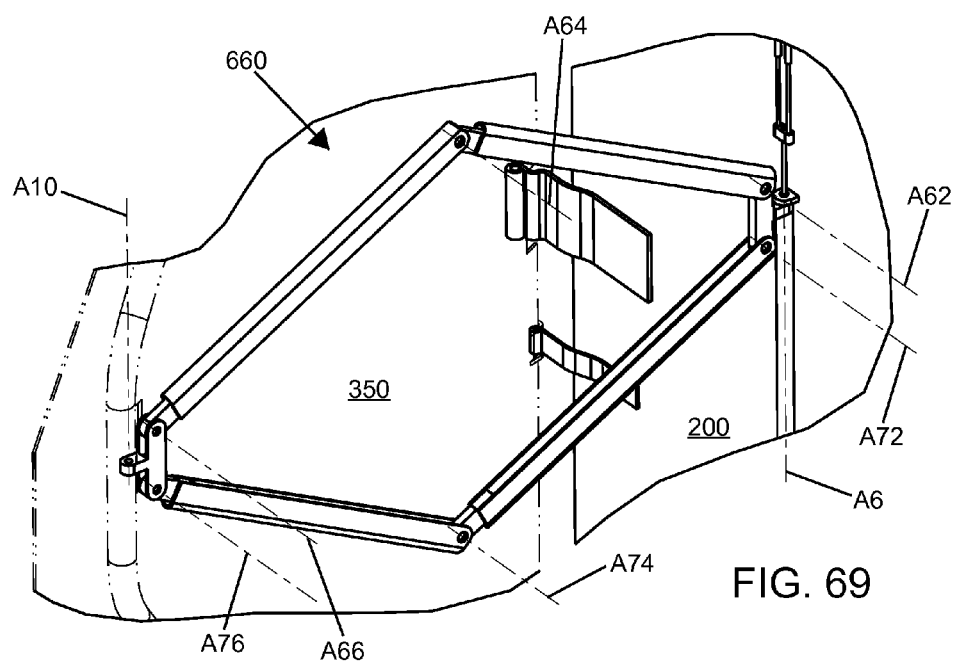
FIG. 69 is an enlarged partial perspective view of an actuator of the drag reducing apparatus of FIG. 63.
Figure 88:
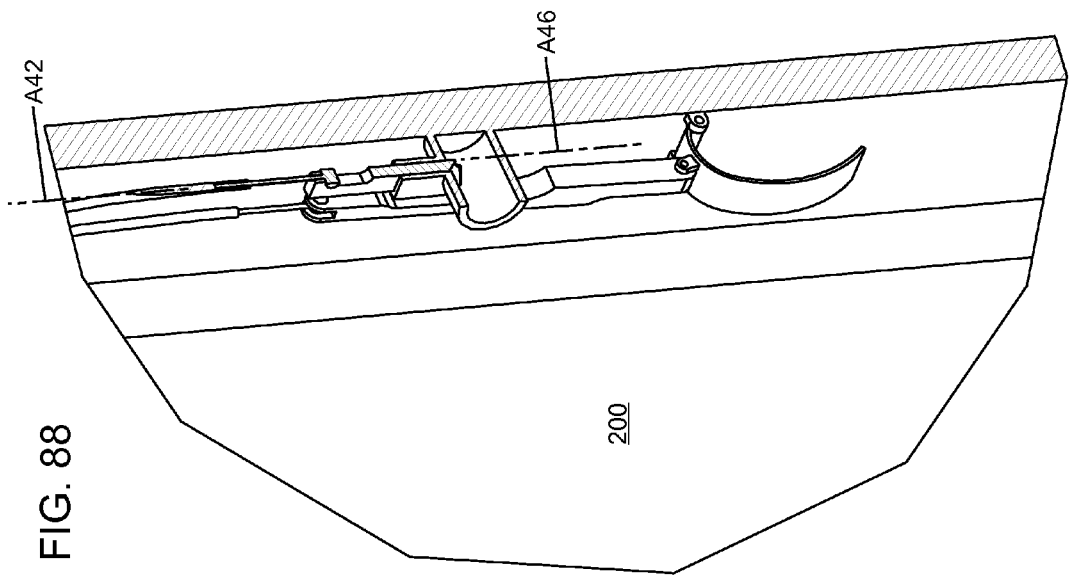
FIG. 88 is an enlarged partial cross-sectional perspective view with a cutaway illustrating the latch system of FIG. 77.

As depicted, each of the linkages 670a, 670b include two links 680. As depicted, the links 680 may be substantially identical to each other. As depicted at FIG. 69, each of the links 680 may extend between a first end 682 and a second end 684. As depicted, the first end 682 may be a female end and the second end 684 may be a male end. The connections of the linkage assembly 660 may include a rotational connection about an axis A62 between a first link 680a and the attachment lug 616'. The first link 680 may be further connected to a second link 680b at an axis A64. The second link 680b may be further connected to the attachment lug 626' at an axis A66. A third link 680c may be connected to the attachment lug 616' at an axis A72. The link 680c may be connected to a link 680d at an axis A74. The link 680d may be connected to the attachment lug 626' at an axis A76. A spring 690 may urge the axes 64 and 74 toward each other and thereby urge the linkage assembly 660 to extend along the actuator extension axis A8. As illustrated at FIG. 69, the first end 682 of the links 680a and 680c may be positioned over the male portions of the attachment lug 616'. The second ends of the links 680b and 680d may be positioned within a female portion of the attachment lug 626'. The second end 684 of the link 680a may be attached to the first end 682 of the link 680b by inserting the male portion of the link 680a into the female portion of the link 680b. Links 680c and 680d follow a similar construction to links 680a and 680b. As illustrated, the links may carry a bending load across the axes A62, A64, A66, A72, A74, A76. A torsional load delivered by the torsion rod 630, 630' may thereby urge the linkage assembly 660 to swing about the axis A6 and thereby urge the axis A10 of the panel 350 to swing about the axis A22. The panel 350 may thereby be swung between the deployed configuration 296 and the retracted configuration 298. In the depicted embodiment, the spring 690 urges the actuator 600D to position the aerodynamic assembly 300D in the deployed configuration 296. In other embodiments, a spring similar to the spring 690 may be connected between the attachment lug 616' and the attachment lug 626' and thereby urge the aerodynamic assembly 300D toward the retracted configuration 298.

Turning now to FIGS. 71-90, a fifth example aerodynamic assembly 300E is illustrated according to the principles of the present disclosure. The aerodynamic assembly 300E is similar to the aerodynamic assembly 300D but further includes two examples of boost actuators to move the aerodynamic assembly 300E away from the retracted configuration 298. In certain embodiments, the mechanical advantage of the actuators 600A, 600B, 600C, 600D may be a low mechanical advantage when the aerodynamic assembly 300 is at the retracted configuration 298. This may be desired as it may allow the aerodynamic assembly 300 to remain stable and/or stationary at the retracted configuration 298 unless actuated. The low mechanical advantage may also result from a thin overall design of the aerodynamic assembly 300 when the aerodynamic assembly 300 is at the retracted configuration 298. A first boost actuator 700 is illustrated attached to the panel 400, and a second boost actuator 750 is illustrated operating on the panel 500 in the depicted embodiment. In other embodiments, one or more boost actuators 700 may be mounted on the panels 350, 400, 450, 500, and/or 550. Likewise one or more boost actuators 750 may operate on the panel 350, 400, 450, 500 and/or 550. The boost actuator 700 and 750 may be used together or separately on the same panel 350, 400, 450, 500, 550. The boost actuator 700, 750 may each operate to move one or more of the panels 350, 400, 450, 500, 550 about a relatively small angular distance along their respective mounting axes (e.g., A22, A24, A26), respectively. Upon moving the relatively small angular distance, the actuator 600A, 600B, 600C, 600D may gain mechanical advantage and thereby continue the movement of the aerodynamic assembly 300 toward the deployed configuration 296. In addition, the axes A22, A24, A26 and/or other axes may include torsional springs that assist in the deployment of the panels 350, 400, 450, 500, 550, respectively. The torsional springs may operate over a partial range of the respective swing movement of the panels 350, 400, 450, 500, 550, or may operate over a full range of the panel 350, 400, 450, 500, 500 movement about the axes (e.g., axes A22, A24, and/or A26), respectively. The torsional springs may provide a greater deploying torque when the aerodynamic assembly 300 is at or near the retracted configuration 298 and a diminished torsional load when the aerodynamic assembly 300 is at or near the deployed configuration 296.

Turning now to FIGS. 72, 75, and 78, the boost actuator 700 is illustrated as including a spring 710, a catch 720, and a latch 730. As illustrated at FIG. 72 the spring 710 has been compressed by the closing action of the panel 400. In certain embodiments, the closing action may be a slamming action similar to the closing of a car hood. In such embodiments, momentum of the swinging panel 400 is arrested and cushioned by the spring 710, and energy from the momentum of the panel 400 is captured by the spring 710. As illustrated at FIG. 75, the catch 720 displaces a latch 730 during the closing action of the panel 400. The spring 710 is thereby trapped in the compressed configuration. However, the spring 710 may be released by triggering the latch 730. FIG. 78 illustrates the latch 730 after triggering and thereby releasing the spring 710 and causing the spring 710 to extend thereby rotating the panel 400 about the axis A24. Shortly after the latch 730 has been triggered, the latch 730 may be returned (e.g., by a return spring) to a ready position (see FIG. 75). And thereby be ready to receive and trap the catch 720 once again.

As illustrated at FIGS. 73, 76, 79, 83, and 86, the latch 730 may be remotely actuated. In the depicted embodiment, the latch 730 is remotely actuated by the handle 640 or 640'. In the depicted embodiment, a remote linkage 800 transfers the latch releasing movement of the handle 640 or 640' to result in movement of the latch 730. In particular, a linkage portion 810 is attached to the handle 640 or 640'. The linkage portion includes a link 816 and a sliding member 820. By rotating the handle 640 or 640' about the axis A30, a connection at an axis A32 between the handle 640 or 640' moves the link 816. The link 816 in turn moves the sliding member 820 along the axis A36. The sliding member 820 may slide along a center of the torsion rod 630 or 630' and thereby transfer the motion to the end 632 or 632' of the torsion rod 630 or 630'. A yolk may relieve torsional stresses on the sliding member 820 as the handle is pivoted about the axis A6. In other embodiments, torsional windup may occur over the length of the sliding member 820. The yolk 824 further transfers the motion into a cable 830a. As shown between FIGS. 88 and 90, motion of the cable 830a moves the latch about an axis A46 and thereby may release the latch 730.

Figure 87:
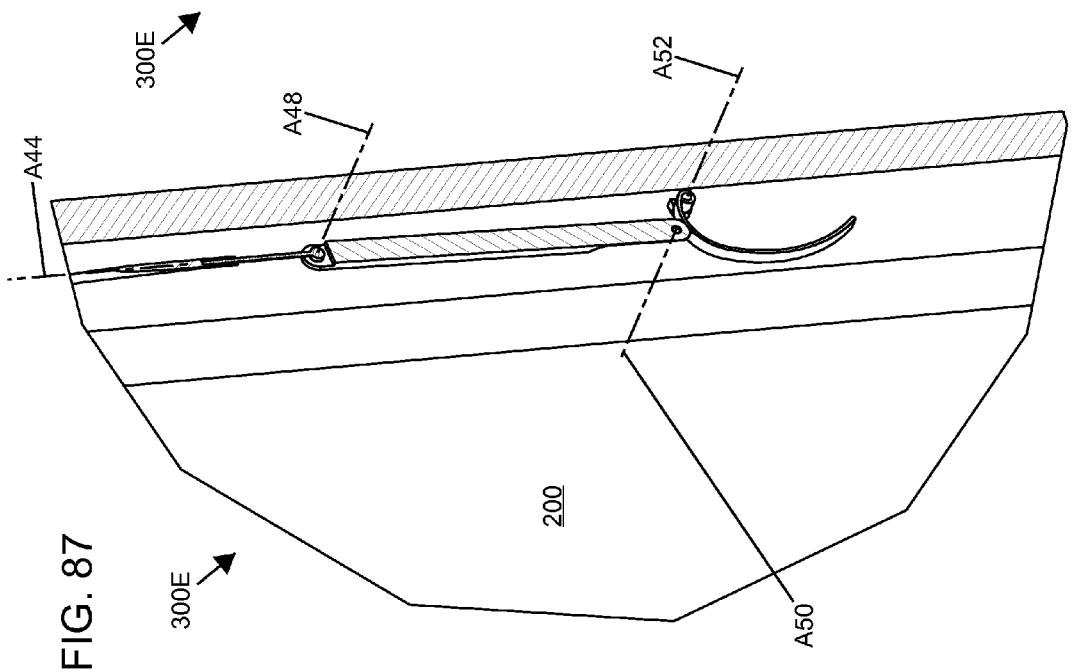
FIG. 87 is an enlarged partial cross-sectional perspective view with a cutaway illustrating the bumping actuator of FIG. 77.
Figure 90:
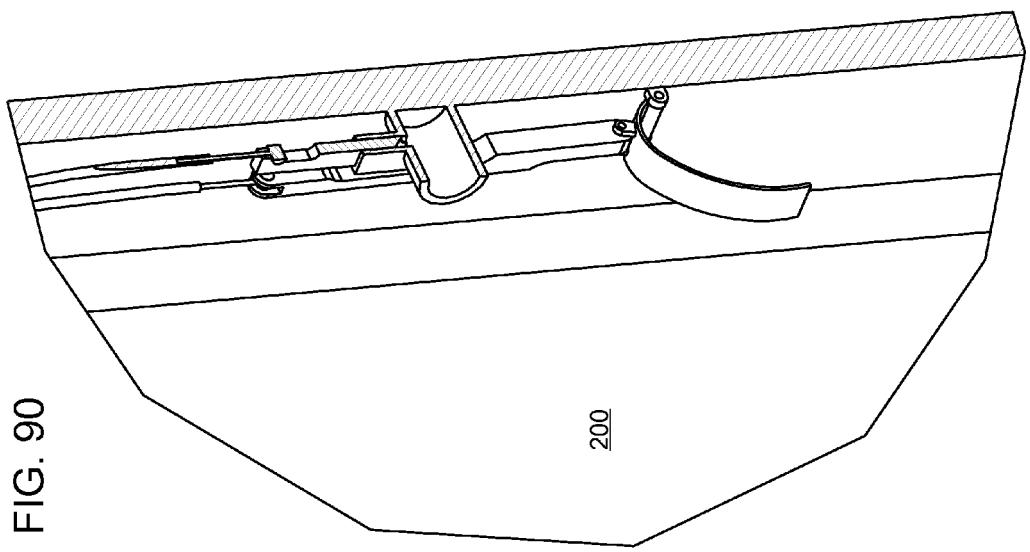
FIG. 90 is the enlarged partial cross-sectional perspective view of FIG. 88, but with the latch system illustrated in a releasing configuration.
Figure 89:
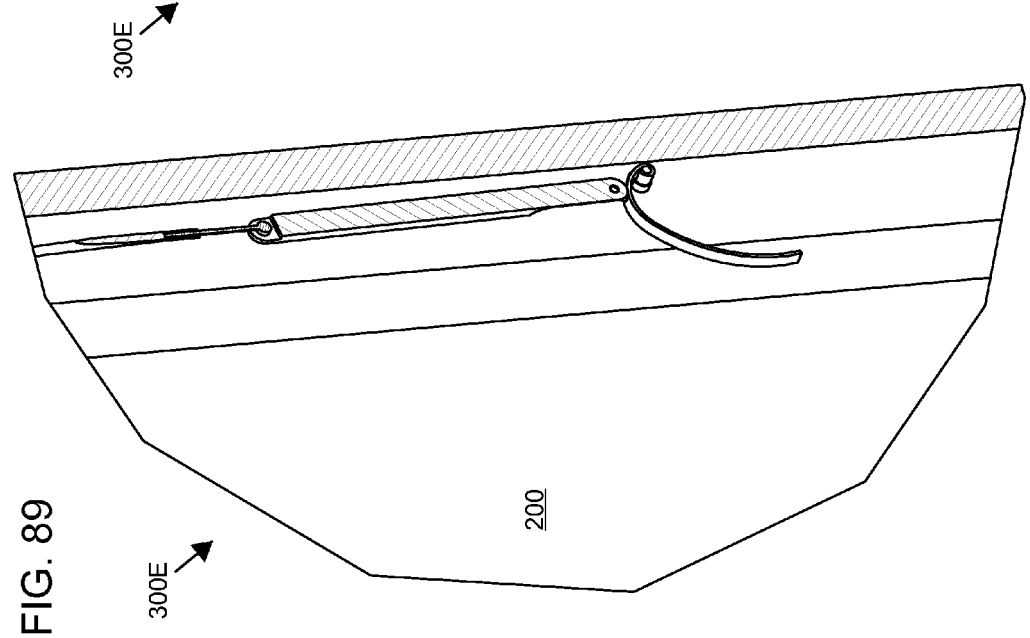
FIG. 89 is the enlarged partial cross-sectional perspective view of FIG. 87, but with the bump actuator activated.

Turning now to FIGS. 87 and 89, the boost actuator 750 will be described in detail. Like the boost actuator 700, the boost actuator 750 may receive movement input from rotation of the handle 640 or 640' (e.g., in a vertical direction). The remote linkage 800 may transfer the movement of the handle through a cable 830b similar to that described above with respect to cable 830a. As illustrated at FIG. 87, movement of the cable 830b results in linear movement along an axis A44. The movement along the axis A44 is transferred to a link 760 that is rotatably connected to an end of the cable 830b about a rotational axis A48. The link 760 is further rotationally attached to a shoe 770 at a rotational axis A50. Movement of the link 760 causes the shoe 770 to rotate about an axis A52 mounted to the door 200. As illustrated in the movement between FIGS. 75 and 78, rotation of the shoe 770 urges the panel 500 to rotate about the axis A26. The shoe 770 may be made of a leaf spring material. The shoe 770 may include a cam shape and thereby have a variable mechanical advantage at various portions of its movement.

Turning now to FIGS. 91-96, a sixth example aerodynamic assembly 300F is illustrated according to the principles of the present disclosure. The aerodynamic assembly 300F is similar to the aerodynamic assembly 300E, but further includes an upper linkage arrangement 850U and lower linkage arrangement 850L. The terms "upper" and "lower" describe the depicted embodiment. Other embodiments may include other orientations.

The linkage arrangement 850U functions in a manner similar to the panel 450 in that it coordinates movement between the panel 350 and the panel 400. The linkage arrangement 850U includes a link 860U that connects the panel 350 to the panel 400. In particular, the link 860U extends between a first end 862U and a second end 864U. A first connection 866U is positioned at or near the end 862U, and a connection 868U is positioned at or near the end 864U. The connection 866U connects the end 862U of the link 860U to the panel 350. Likewise, the connection 886U connects the end 864U of the link 860U to the panel 400. In certain embodiments, the connections 866U and 868U include spherical joints. As the joints of the linkage arrangement 850U are spherical joints rather than joints across an axis, the linkage arrangement 850U avoids problems with binding (e.g., from the various offsets between the panel 350 and the panel 400). As depicted, the connection 866U is made to the frame of the panel 350. Likewise, the connection 868U is made to the frame of the panel 400. As depicted at FIGS. 91-96, the aerodynamic assembly 300F includes a filler 450' between the panel 350 and the panel 400. In certain embodiments, the filler 450' may include panel material and function in a similar manner to the panel 450. In other embodiments, the filler 450' is made of a fabric material and may be attached and secured at or near the edge 356 of the panel 350 and at or near the edge 406 of the panel 400. In certain embodiments, the filler 450' may be made of fabric. Such fabric may include sale cloth, a rubberized tarp material, a cloth material, etc. In certain embodiments, the fabric is substantially rigid in a tensile direction. In other embodiments, the fabric may be stretchable and expandable when pulled on. As illustrated, the linkage arrangement 850U is positioned within the cavity 290 of the aerodynamic arrangement 280, when deployed. In this way, the linkage arrangement 850U is generally out of a flow of air when the vehicle 150 is moving. Linkage arrangement 850L is similar to the linkage arrangement 850U. The linkage arrangement 850L joins the panel 350 to the panel 500. The linkage arrangement 850L functions similar to the panel 550 in that it connects the panel 350 to the panel 500. The linkage arrangement 850L includes a link 860L that extends between a first end 862L and a second end 864L. The linkage arrangement 850L includes a connection 866L between the end 862L of the link 860L and the panel 350. Likewise, the connection 868L connects the end 864L of the link 860L to the panel 500. The aerodynamic assembly 300F may include a filler 550' similar to the filler 450'. The filler 550' may be made of panel material or may be made of fabric similar to the filler 450'. The filler 550' connects to the panel 350 at or near the edge 358 of the panel 350. The filler 550' further connects to the panel 500 at or near the edge 508 of the panel.

Turning now to FIGS. 97-111 a seventh example aerodynamic assembly 300G is illustrated according to the principles of the present disclosure. The aerodynamic assembly 300G is similar to the aerodynamic assembly 300F in that linkages are used to coordinate movement between the panel 350 and the panels 400 and 500. In particular, the aerodynamic assembly 300G includes a linkage arrangement 900U and a linkage arrangement 900L. The linkage arrangement 900U is similar to the linkage arrangement 850U and includes a link 910U that extends between an end 912U and an end 914U. As illustrated, the linkage arrangement 900U includes a connection 916U at or near the end 912U and includes a connection 918U at or near the end 914U. As illustrated at FIGS. 100, 103, and 106, the connections 916U and 918U do not include a spherical joint. The connections 916U and 918U instead include three axes that intersect at a point.

The link 910U includes a link member 920 that extends between a first end 922 and a second end 924. The link member 920 generally defines an axis A80. At the end 922 the link member further defines an axis A86 that perpendicular to the axis A80. A rotatable male member 930 also defines the axis A86 and is rotatable relative to the link member 920 about the axis A86. The rotatable male member 930 further defines an axis A88 that is generally perpendicular to the axis A86. The frame member of the panel 350 defines an axis A90. A rotatable female member 940 also defines the axis A90 and is rotatable relative to the frame member of the panel 350 about the axis A90. The rotatable female member 940 also defines the axis A88. The rotatable male member 930 and the rotatable female member 940 are rotatable with respect to each other at about the axis A88. The connection 916U is thereby defined by the axes A86, A88, and A90. These three axes A86, A88, A90 intersection at a point P1. The connection 916U thereby provides three rotational degrees of freedom between the link 91U and the side panel 350.

The end 924 of the link member 920 is connected to a second rotatable member 930B. The rotatable male member 930B also defines the axis A80 and is rotatably mounted about the axis A80 to the link member 920. The rotatable male member 930 further defines an axis A82. The panel 400 defines an axis A84. A second rotatable female member 940 is rotatably mounted to the panel 400 about the axis A84. In particular, the frame of the top panel 400 defines the axis A84. The second rotatable female member 940b is therefore rotatable with respect to the frame of the panel 400 about the axis A84. The second rotatable female member 940B further defines the axis A82. The second rotatable male member 930B and the second rotatable female member 940B are therefore rotatable relative to each other about the axis A82. The connection 918U is thereby defined by the axes A80, A82, and A84 which intersect with each other at a point P2. The connection 918U thereby provides three rotational degrees of freedom between the link 910U and the panel 400. The link 910L includes a similar construction.

In certain embodiments, one or more of the rotatable joints about one or more of the axes A80, A82, A84, A86, A88, A90 may be locked or may be deleted. For example, in the depicted embodiment, the second male rotatable member 930B is held with respect to the link member 920 and no rotation occurs between the link member 920 and the second rotatable male member 930b. In this way, the link member 920 avoids interfering with the panel 350 as the aerodynamic assembly 300G is moved between the deployed configuration 926 and the retracted configuration 928. As illustrated at FIGS. 100, 103, 106, 109, and 111, the link member 920 rotates and extends over the panel 350 without interference. In particular, an offset is created between the axis A80 and the point P1 that allows the link 910U to be positioned within the cavity 290 of the aerodynamic arrangement 280 when the aerodynamic assembly 300G is in the deployed configuration 296. When the aerodynamic assembly 300G is moved toward the transitioning configuration 297 and the retracted configuration 298, the link 910U becomes positioned around the panel 350 as shown in the sequence of FIGS. 99, 102, 105, and 108. Furthermore, the link 910U occupies a same layer as the frame of the panel 400 and thereby does not add to a thickness of the aerodynamic assembly 300G when the aerodynamic assembly 300G is at the retracted configuration 298. Furthermore, the joints that operate along the various axes A80, A82, A84, A86, A88, A90 may be spring loaded and/or may include rotational stops that produce the desired movement of the linkage arrangement 900U. The spring loading may further assist in deploying and/or retracting the aerodynamic assembly 300G. The construction of the linkage arrangement 900L and linkage arrangement 900U is similar.

In certain embodiments, when the aerodynamic arrangement 280 is configured in the retracted configuration 298, there are only two frame layers of the aerodynamic arrangement 280. The first frame layer is positioned next to the door 190, 200 and is also shared with the lock rod(s) 256. The actuation linkage and/or the actuation cylinder of the actuator 600 may also share the first frame layer. The panel material 366 of the panel 350 may lay on the first frame layer. The panel material 366 may be as thin as 3-6 millimeters.

The second frame layer may include the frames for the upper and lower panels 400, 500. If linkages are used instead of connecting panels 450, 550, then the second frame layer may holds these as well.

A fabric layer, if used, may be positioned between the connecting links and the side panel 350. The fabric layer may stay triangular throughout its range of motion. Thus, the fabric would not bunch. Panels with loose hinge or connections could alternatively be used. These panels may be thicker than the fabric.

The upper and lower panels 400, 500 may also add an outer panel material layer.

The only layers near the hinge may be the side panel material layer and the top/bottom panel outer material layer. Thus, with spring hinges for the top and bottom panels 400, 500 and/or the side panel 350, little thickness (e.g., 6-12 mm) may be taken by the aerodynamic device 280 near the door hinges. The doors 190, 200 may thereby open as far as conventional truck/trailer doors.

A linkage may stow the aerodynamic device 300 as the door 190, 200 is opened and also may deploy the aerodynamic device 300 as the door 190, 200 is closed (see FIGS. 131-138). This linkage may depend on door movement and can be overridden so that the aerodynamic device 300 can be stowed with the door 190, 200 closed.

A frame structure of the aerodynamic device 300 may provide a perimeter that extends between the inboard top panel hinge and the inboard bottom panel hinge when the aerodynamic assembly is deployed. Some of the frame segments could be pressurized plastic tubing. In particular a first segment may belong to the upper panel frame, a second segment may belong to the upper link, a third segment may belong to the side panel frame, a fourth segment may belong to the lower link, and a fifth segment may belong to the lower panel frame. As the side, top, and bottom panels have stiffness and the actuator is pushing outward on them, frames may not necessarily be needed that connect all the way to the outboard spring hinges. Thus, thin material (e.g., 3 mm materiel) may be used.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. An aerodynamic drag reducing apparatus adapted for use adjacent a rear door of a vehicle, the aerodynamic drag reducing apparatus comprising:
    a panel mounting arrangement including a vehicle attachment, a spring element, and a panel attachment; and
    an aerodynamic panel attached to the panel mounting arrangement at the panel attachment and moveable between a deployed position substantially behind a rear of the vehicle and a compact stowed position substantially alongside a side of the vehicle, the panel mounting arrangement configured at a first configuration when the aerodynamic panel is at the deployed position and the panel mounting arrangement configured at a second configuration when the aerodynamic panel is at the compact stowed position;
    wherein a distance between the vehicle attachment and the panel attachment of the panel mounting arrangement is changed by deformation of the spring element when the panel mounting arrangement is reconfigured from the first configuration to the second configuration.

2. The aerodynamic drag reducing apparatus of claim 1, wherein the distance is substantially perpendicular to a rear surface of the rear door.

3. The aerodynamic drag reducing apparatus of claim 2, wherein the spring element includes at least a portion of a leaf spring between the vehicle attachment and the panel attachment.

4. The aerodynamic drag reducing apparatus of claim 3, wherein the panel attachment includes a hinge joint.

5. The aerodynamic drag reducing apparatus of claim 1, wherein the distance is substantially perpendicular to a surface of the aerodynamic panel.

6. The aerodynamic drag reducing apparatus of claim 5, wherein the spring element includes a flexure between the vehicle attachment and the panel attachment.

7. The aerodynamic drag reducing apparatus of claim 5, wherein the panel mounting arrangement includes a collapsing linkage between the vehicle attachment and the panel attachment.

8. The aerodynamic drag reducing apparatus of claim 5, wherein the vehicle attachment includes a hinge joint.

9. The aerodynamic drag reducing apparatus of claim 1, wherein the spring element is adapted to be compressed when the rear door is opened against the side of the vehicle thereby configuring the panel mounting arrangement at the second configuration.

10. The aerodynamic drag reducing apparatus of claim 1, wherein the aerodynamic panel is a side aerodynamic panel, and wherein the vehicle attachment of the panel mounting arrangement is attached to a door frame of the vehicle.

11. The aerodynamic drag reducing apparatus of claim 1, wherein the spring element allows the deformation resilient displacement of up to about 0.5 inch.

12. The aerodynamic drag reducing apparatus of claim 1, wherein the spring element allows the deformation resilient displacement of up to about 1 inch.

13. An aerodynamic drag reducing apparatus adapted for use adjacent a rear door of a vehicle, the aerodynamic drag reducing apparatus comprising:
    a resilient hinge including a vehicle attachment and a panel attachment, the resilient hinge adapted for attachment to the vehicle at the vehicle attachment, and the resilient hinge configurable at a first configuration and a second configuration; and
    an aerodynamic panel attached to the resilient hinge at the panel attachment and moveable between a deployed position substantially behind a rear of the vehicle and a stowed position, the resilient hinge configured at the first configuration when the aerodynamic panel is at the deployed position and the resilient hinge configured at the second configuration when the aerodynamic panel is at the stowed position;

wherein the resilient hinge is adapted to resiliently deform to accommodate reconfiguration of the aerodynamic panel between the deployed configuration and the stowed configuration; and wherein a distance between the vehicle attachment and the panel attachment of the resilient hinge is changed by resilient deformation of the resilient hinge when the resilient hinge is reconfigured from the first configuration to the second configuration.

14. The aerodynamic drag reducing apparatus of claim 13, wherein the stowed position is substantially alongside a side of the vehicle.

15. The aerodynamic drag reducing apparatus of claim 13, wherein the resilient hinge is adapted to allow the resilient deformation of up to about 0.25 inch.

16. The aerodynamic drag reducing apparatus of claim 13, wherein the resilient hinge is adapted to allow the resilient deformation of up to about 0.5 inch.

17. The aerodynamic drag reducing apparatus of claim 13, wherein the resilient hinge is adapted to allow the resilient deformation of up to about 1 inch.

18. An aerodynamic drag reducing apparatus adapted for mounting behind a vehicle, the aerodynamic drag reducing apparatus comprising:

a side panel adapted to move between a deployed position and a stowed position;

a top panel adapted to move between a deployed position and a stowed position; and a bottom panel adapted to move between a deployed position and a stowed position;

wherein the top panel overlaps the bottom panel when the side panel and the bottom panel are at the stowed positions.

19. The aerodynamic drag reducing apparatus of claim 18, wherein the side panel, the top panel, and the bottom panel are interconnected to move together between the stowed positions and the deployed positions, respectively.

20. The aerodynamic drag reducing apparatus of claim 19, further comprising:

a first interconnecting member connected between the side panel and the top panel; and a second interconnecting member connected between the side panel and the bottom panel.

\* \* \* \* \*